US012665899B2

(12) United States Patent
Li et al.

(10) Patent No.: US 12,665,899 B2
(45) Date of Patent: Jun. 23, 2026

(54) AUTHENTICATION METHOD, MEDIUM, AND ELECTRONIC DEVICE

(71) Applicant: Huawei Technologies Co., Ltd., Shenzhen (CN)

(72) Inventors: Zhuofei Li, Beijing (CN); Wei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 17/786,945

(22) PCT Filed: Dec. 16, 2020

(86) PCT No.: PCT/CN2020/136839
§ 371 (c)(1),
(2) Date: Jun. 17, 2022

(87) PCT Pub. No.: WO2021/121273
PCT Pub. Date: Jun. 24, 2021

(65) Prior Publication Data
US 2023/0029683 A1 Feb. 2, 2023

(30) Foreign Application Priority Data
Dec. 20, 2019 (CN) .......................... 201911330707.8

(51) Int. Cl.
*H04L 9/40* (2022.01)
*H04W 12/065* (2021.01)

(52) U.S. Cl.
CPC ............ *H04L 63/0861* (2013.01); *H04L 9/40* (2022.05); *H04W 12/065* (2021.01)

(58) Field of Classification Search
CPC . H04W 12/065; H04W 12/06; H04W 12/122; G07C 2009/00555; H04L 63/0861
See application file for complete search history.

(56) References Cited

U.S. PATENT DOCUMENTS 8,601,568 B2 12/2013 Tanizawa et al.
8,930,045 B2 * 1/2015 Oman ................ G07C 9/00309
340/426.36

(Continued)

FOREIGN PATENT DOCUMENTS

CN 105339989 A 2/2016
CN 105346502 A 2/2016

(Continued)

*Primary Examiner* — Rupal Dharia
*Assistant Examiner* — Raghavender Cholleti
(74) *Attorney, Agent, or Firm* — Slater Matsil, LLP

(57) ABSTRACT

An authentication method and an electronic device. The method includes sending, by a first device, in response to a first device determining that a distance between the first device and a second device reaches a first distance, a first request to the second device, so that the second device determines whether wireless communication between the first and second device is relayed before the first device performs a service, determining, in response to the distance between the first and second device reaching a second distance, whether success ciphertext sent by the second device is received, wherein the success ciphertext is sent in response to the second device determining that wireless communication between the first and second device is not relayed and the second distance being less than the first distance, and performing the service in response to reception and successful verification of the success ciphertext.

17 Claims, 43 Drawing Sheets

Relay data

Vehicle owner  Attacker A  Attacker B

(56)  References Cited

U.S. PATENT DOCUMENTS

| | | | |
|---|---|---|---|
| 9,849,860 | B2 | 12/2017 | Miyazawa |
| 10,217,300 | B2 | 2/2019 | Ziller et al. |
| 10,308,221 | B2 | 6/2019 | Kim et al. |
| 11,164,409 | B2 | 11/2021 | Han et al. |
| 11,175,396 | B2 * | 11/2021 | Reimann ................. G01S 13/84 |
| 11,356,264 | B2 * | 6/2022 | Naiki ................... H04L 9/3271 |
| 11,427,158 | B2 | 8/2022 | Cho |
| 2002/0097145 | A1 | 7/2002 | Tumey et al. |
| 2008/0143500 | A1 * | 6/2008 | Ghabra ................... B60R 25/24 |
| | | | 340/426.36 |
| 2015/0082427 | A1 | 3/2015 | Ivanchykhin et al. |
| 2015/0291129 | A1 | 10/2015 | Saito |
| 2016/0094550 | A1 * | 3/2016 | Bradley ............. H04L 63/0853 |
| | | | 726/7 |
| 2017/0278330 | A1 | 9/2017 | Buttolo et al. |
| 2018/0288092 | A1 * | 10/2018 | Linsky ................ H04L 63/1466 |
| 2020/0276959 | A1 * | 9/2020 | Cho ........................ B60R 25/01 |
| 2021/0258796 | A1 * | 8/2021 | Li ................... G06Q 20/40145 |

FOREIGN PATENT DOCUMENTS

| | | | | | |
|---|---|---|---|---|---|
| CN | 105473392 | A | | 4/2016 | |
| CN | 106507362 | A | | 3/2017 | |
| CN | 106605034 | A | | 4/2017 | |
| CN | 107222456 | A | | 9/2017 | |
| CN | 107968766 | A | | 4/2018 | |
| CN | 108068759 | A | | 5/2018 | |
| CN | 108202695 | A | | 6/2018 | |
| CN | 109753780 | A | * | 5/2019 | |
| CN | 110223425 | A | * | 9/2019 | |
| CN | 110267853 | A | | 9/2019 | |
| CN | 110276865 | A | | 9/2019 | |
| EP | 3300033 | B1 | * | 12/2020 | ......... G07C 9/00309 |
| EP | 3564707 | B1 | * | 3/2021 | ............. G01S 11/02 |
| JP | 2008299588 | A | | 12/2008 | |
| WO | 2013118454 | A1 | | 8/2013 | |
| WO | WO-2013157709 | A1 | * | 10/2013 | ............. B60R 25/10 |
| WO | 2019074135 | A1 | | 4/2019 | |
| WO | WO-2020077234 | A9 | * | 5/2021 | ......... B60R 25/2072 |

* cited by examiner

Relay data

Vehicle owner    Attacker A                    Attacker B

Mobile phone 10

SE
Vehicle key applet 108

TEE
Anti-relay TA 107 — Wallet TA 106

REE
Anti-relay application 104 — Mobile wallet 103

Positioning service 105    BLE agent 101    Vehicle manufacturer app 102

Mobile BLE chip 109

Vehicle 20

Head unit 210

Vehicle lock applet 211

Vehicle lock command engine 212

Vehicle-mounted BLE module 213

1. Establish a
Bluetooth
connection

2. Start
imperceptible
authentication

3. Measure a
distance for
unlocking

4. Notify that
unlocking
succeeds

Vehicle BLE ranging
promotion procedure

Unlock

10

Establish a
connection 35 meters

20

2. Stop flameout
positioning

1. Start flameout
positioning

Vehicle BLE ranging
promotion procedure

Flameout

10

20 meters

20

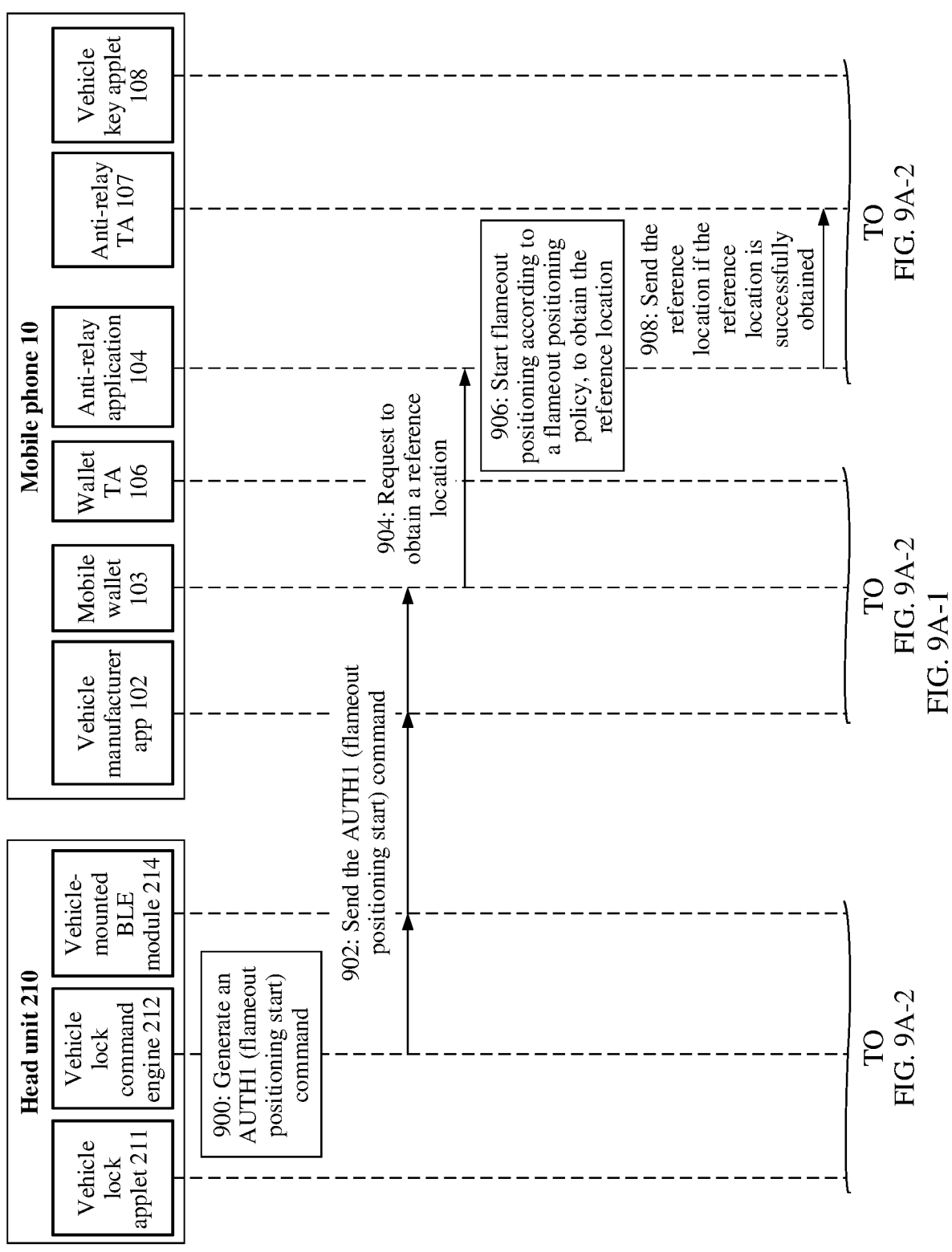

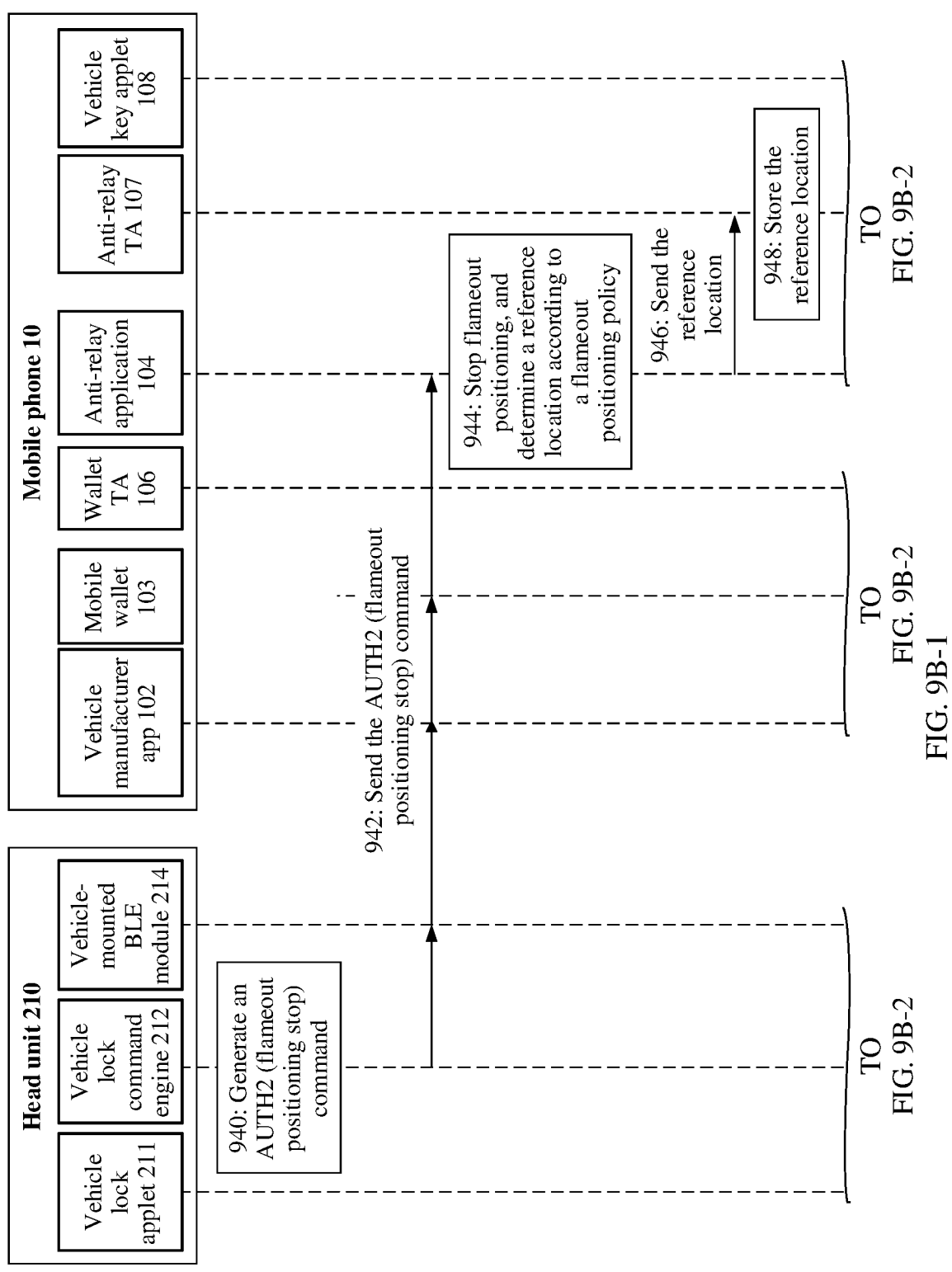

1400

1402

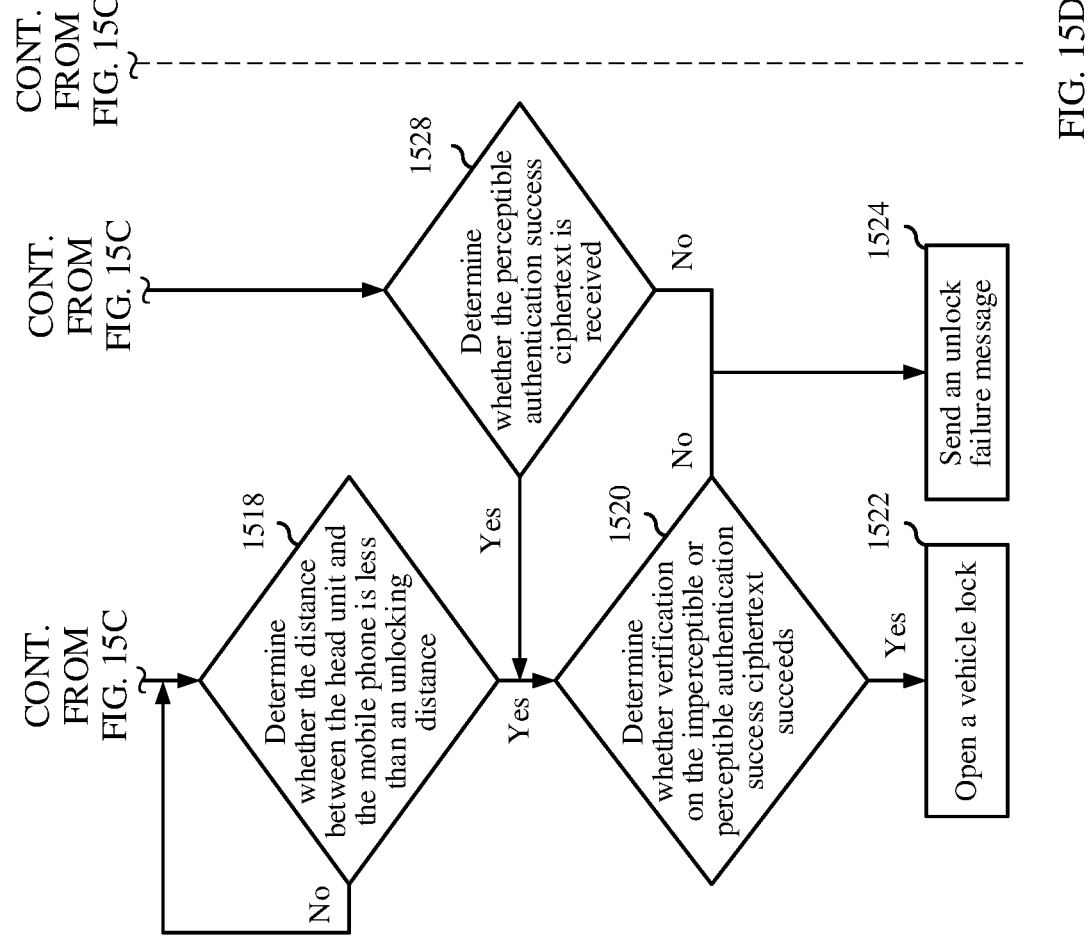

CONT. FROM FIG. 15C

CONT. FROM FIG. 15C

CONT. FROM FIG. 15C

1528 — Determine whether the perceptible authentication success ciphertext is received 1518 — Determine whether the distance between the head unit and the mobile phone is less than an unlocking distance 1520 — Determine whether verification on the imperceptible or perceptible authentication success ciphertext succeeds 1524 — Send an unlock failure message 1522 — Open a vehicle lock No Yes No Yes Yes No

FIG. 15D

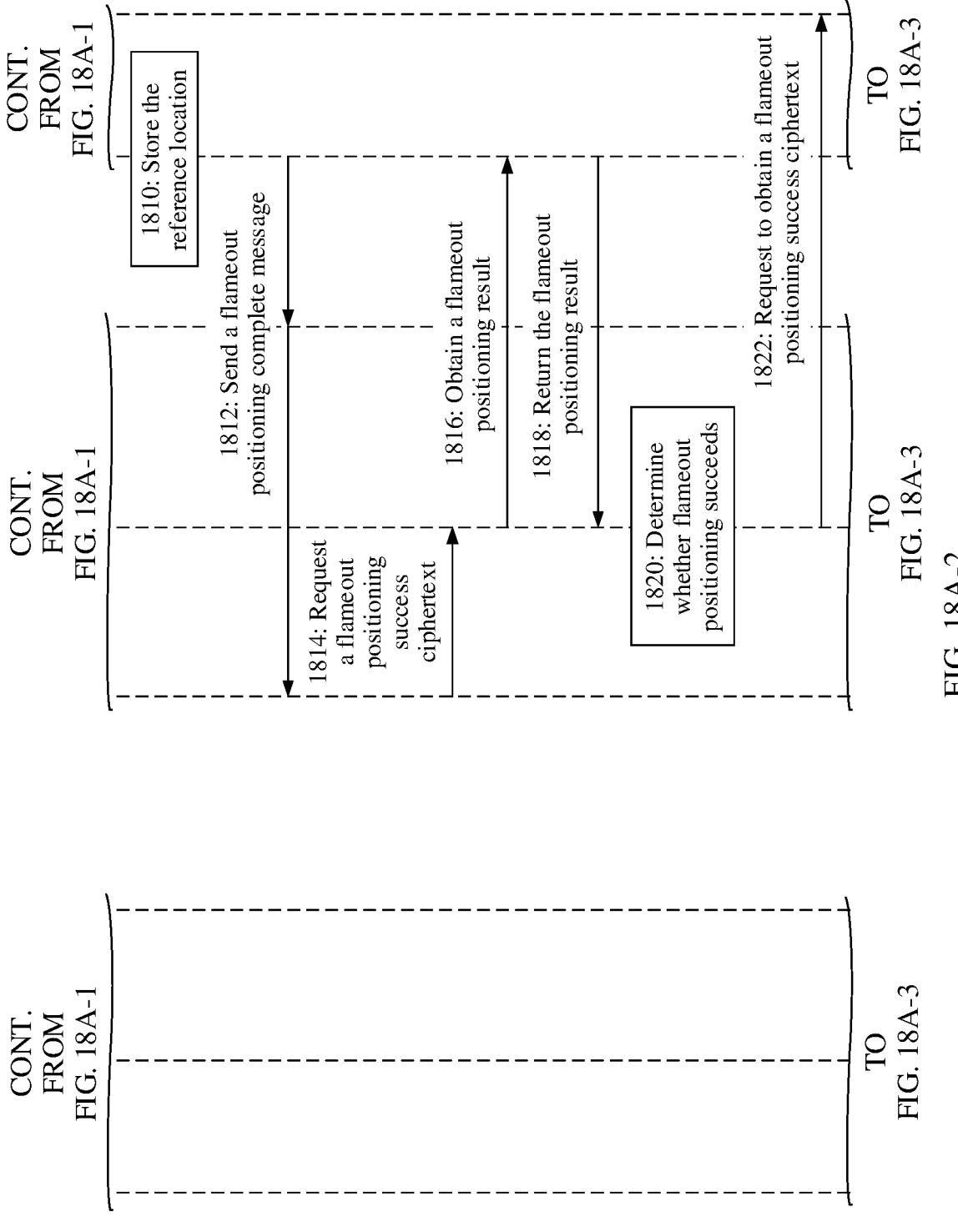

CONT. FROM FIG. 18A-1

TO FIG. 18A-3

1810: Store the reference location

1812: Send a flameout positioning complete message

1816: Obtain a flameout positioning result

1818: Return the flameout positioning result

1822: Request to obtain a flameout positioning success ciphertext

1814: Request a flameout positioning success ciphertext

1820: Determine whether flameout positioning succeeds

CONT. FROM FIG. 18A-1

CONT. FROM FIG. 18A-1

AUTHENTICATION METHOD, MEDIUM, AND ELECTRONIC DEVICE

CROSS REFERENCE TO RELATED APPLICATIONS

This application is a National Stage of International Application No. PCT/CN2020/136839, filed on Dec. 16, 2020, which claims priority to Chinese Patent Application No. 201911330707.8, filed on Dec. 20, 2019. Both of the aforementioned applications are hereby incorporated by reference in their entireties.

TECHNICAL FIELD

This application relates to the communications field, and in particular, to an authentication method, a medium, and an electronic device.

BACKGROUND

With rapid development of wireless transactions, increasingly more services are integrated into a mobile phone, for example, mobile payment, wireless unlocking, and mobile card swiping services. Some of these transactions are imperceptible transactions, that is, can be completed without user intervention, for example, mobile card swiping in a black screen mode, automatic fee deduction in the background, and imperceptible unlocking on a mobile phone. During imperceptible transactions, the transactions may encounter a relay attack from attackers and services may be stolen. For example, as shown in FIG. 1, when a mobile phone is used to perform imperceptible unlocking, in a normal case, the mobile phone approaches a vehicle lock or a door lock to establish a Bluetooth connection, a mobile key and the lock are mutually verified, and the lock is opened when verification succeeds. When a vehicle owner is not near the vehicle lock or the door lock, an attacker A approaches a user, and an attacker B approaches the vehicle lock or the door lock. The attacker A obtains a Bluetooth/NFC (Near Field Communication, Near Field Communication) signal of a mobile key application by using a special device, and remotely transmits the signal as relay data to the attacker B. Then, the attacker B transmits the signal to the vehicle lock or the door lock by using a special device, to open the vehicle lock or the door lock.

SUMMARY

Embodiments of this application provide an authentication method, a medium, and an electronic device, to authenticate, by determining a location relationship between devices that perform an imperceptible service, whether communication between the devices that perform the imperceptible service is relayed, to improve security of the imperceptible service.

According to a first aspect, an embodiment of this application discloses an authentication method, including the following steps:

When a first device determines that a distance between the first device and a second device reaches a first preset distance, the first device sends a first authentication request to the second device, where the first authentication request is used to request the second device to determine whether wireless communication between the first device and the second device is relayed before the first device performs a service agreed on with the second device.

When determining that the distance between the first device and the second device reaches a second preset distance, the first device determines whether a first authentication success ciphertext sent by the second device is received, where the first authentication success ciphertext is sent by the second device after the second device determines that wireless communication between the first device and the second device is not relayed, and the second preset distance is less than the first preset distance.

When the first device determines that the first authentication success ciphertext sent by the second device is received, and verification performed by the first device on the first authentication success ciphertext succeeds, the first device performs the service agreed on with the second device.

In the foregoing solution, the first device controls, by measuring the distance between the first device and the second device, the second device to perform various operations. When the distance between the first device and the second device is the first preset distance, the first device controls the second device to start anti-relay determining, and anti-relay determining needs to be completed between the first preset distance and the second preset distance. When the distance between the first device and the second device reaches the second preset distance, if a result of anti-relay determining is that wireless communication is not relayed, it indicates that the agreed service can be performed. When the distance between the first terminal and the second terminal reaches the second preset distance, if a result of anti-relay determining is not that wireless communication does not encounter a relay attack, it indicates that a condition for performing the agreed service is not met. For example, the first device is a vehicle, the second device is a mobile terminal such as a mobile phone, the first authentication request is an imperceptible authentication initiation command, the first authentication success ciphertext is an imperceptible authentication success ciphertext, and the agreed service is opening a vehicle lock. In this case, in the foregoing solution, the first preset distance may be an imperceptible authentication distance, and the second preset distance is a perceptible authentication distance.

In a possible implementation of the first aspect, the method further includes: When the first device determines that the distance between the first device and the second device reaches the second preset distance, and the first authentication success ciphertext sent by the second device is not received or verification on the received first authentication success ciphertext fails, the first device sends a second authentication request to the second device, where the second authentication request is used to request the second device to perform biometric verification on a user of the second device. When the first device receives a second authentication success ciphertext sent by the second device and verification performed by the first device on the second authentication success ciphertext succeeds, the first device performs the service agreed on with the second device, where the second authentication success ciphertext is sent by the second device after the biometric verification performed by the second device on the user succeeds.

The case in which the first authentication success ciphertext is not received may be a case in which the first device receives a message that is sent by the second device and that indicates that wireless communication between the first device and the second device encounters a relay attack, or may be a case in which the second device does not send any determining result and the first device cannot determine whether wireless communication between the first device and the second device is relayed.

To be specific, in the foregoing solution, if between the first preset distance and the second preset distance, the second device determines that wireless communication between the first device and the second device encounters a relay attack, or cannot determine whether wireless communication between the first device and the second device is relayed, the first device may control, when the distance between the first device and the second device reaches the second preset distance, the second device to perform biometric feature authentication on the user, to determine validity of the user of the second device.

For example, the first device may be a vehicle, the second device may be a mobile terminal such as a mobile phone, the second authentication request is a perceptible authentication initiation command, and the second authentication success ciphertext is a perceptible authentication success ciphertext.

In a possible implementation of the first aspect, before the first device performs the service agreed on with the second device, the method further includes: The first device determines whether the distance between the first device and the second device is less than a third preset distance, where the third preset distance is less than the second preset distance. When the first device determines that the distance between the first device and the second device is less than the third preset distance, the first device performs the service agreed on with the second device.

To be specific, when a result of anti-relay determining performed by the second device is that wireless communication between the first device and the second device does not encounter a relay attack, the first device does not directly perform the agreed service, but determines whether the distance between the first device and the second device is sufficiently short (less than the third preset distance), that is, whether the first device is beside the second device, and performs the agreed service only when determining that the distance between the first device and the second device is sufficiently short.

For example, the first device may be a vehicle, and the second device may be a mobile terminal such as a mobile phone. A trigger apparatus may be disposed on a door handle of a vehicle door of the vehicle. When a user touches the door handle of the vehicle door, a trigger message is sent to the vehicle. In this case, the vehicle monitors whether a distance between the mobile phone and the vehicle is less than the third preset distance (for example, 1 meter), and opens a vehicle lock only when the distance is less than the third preset distance. In addition, no trigger apparatus may be disposed, and whether the distance between the mobile phone and the vehicle is less than the third preset distance (for example, 1 meter) is directly measured. The vehicle lock is opened when the distance is less than the third preset distance.

In a possible implementation of the first aspect, the method further includes: When receiving the first authentication success ciphertext or the second authentication success ciphertext, the first device performs verification on the first authentication success ciphertext or the second authentication success ciphertext. To be specific, the first device performs verification immediately after receiving the first authentication success ciphertext or the second authentication success ciphertext.

In a possible implementation of the first aspect, the method further includes: When the distance between the first device and the second device is less than the second preset distance, and the first device receives the first authentication success ciphertext, the first device performs verification on the first authentication success ciphertext when determining that the distance between the first device and the second device reaches the second preset distance. To be specific, after receiving the first authentication success ciphertext, the first device does not perform verification immediately, but performs verification only when the first preset distance is reached.

In a possible implementation of the first aspect, the method further includes: When the distance between the first device and the second device is less than the third preset distance, and the first device receives the second authentication success ciphertext, the first device performs verification on the second authentication success ciphertext when determining that the distance between the first device and the second device is less than the third preset distance. To be specific, after receiving the second authentication success ciphertext, the first device does not perform verification immediately, but performs verification only when the second preset distance is reached.

In a possible implementation of the first aspect, the agreed service is an unlock service or a payment service.

In a possible implementation of the first aspect, when the agreed service is the unlock service, the second device is a mobile terminal, and the first device is a vehicle or a lock.

In a possible implementation of the first aspect, when the agreed service is the payment service, the second device is a mobile terminal, and the first device is a tolling terminal.

In a possible implementation of the first aspect, the first device is the vehicle, and before the first device sends the first authentication request to the second device, the method further includes the following step:

The first device sends a positioning request to the second device after a last flameout performed before the first authentication request is sent, where the positioning request is used to request the second device to obtain a reference location of the second device through a positioning service, and the reference location can be used by the second device to determine, after the second device receives the first authentication request, whether wireless communication between the second device and the first device is relayed.

To be specific, the reference location is obtained by the second device before the first device performs a current unlock service. Specifically, after a flameout closest to the current unlock service occurs, the first device sends the positioning request (for example, a flameout positioning starting command) to the second device, so that the second device obtains the reference location of the second device near the first device. When performing the current unlock service, the second device may determine, by comparing a positioning location of the second device with the reference location, whether the second device is near the first device. In addition, in another embodiment, a flameout may not be used as a condition for triggering flameout positioning. For example, closing a vehicle door may be used as a trigger condition.

In a possible implementation of the first aspect, after the first device sends the positioning request to the second device, the method further includes: When the distance between the first device and the second device reaches a fourth preset distance, the first device determines whether a flameout positioning success ciphertext sent by the second device is received, where the fourth preset distance is less than or equal to the first preset distance. When determining that the flameout positioning success ciphertext is received and verification performed by the first device on the flameout positioning success ciphertext succeeds, the first device determines that the second device successfully obtains the reference location. When determining that the flameout positioning success ciphertext is not received, the first device sends a positioning stop request to the second device, where the fourth preset distance is less than or equal to the first preset distance.

To be specific, the second device obtains the reference location within a range. If the range exceeds the fourth preset distance, it indicates that the distance between the second device and the first device is excessively long, and security is low during anti-relay determining. Therefore, the first device sends the positioning stop request to the second device, so that the second device obtains the reference location within the fourth preset distance.

In a possible implementation of the first aspect, the positioning request includes a vehicle ID identifying the vehicle and a positioning ID identifying the positioning request.

In a possible implementation of the first aspect, before the first device sends the first authentication request to the second device, the method further includes: The first device continuously sends a wireless communication broadcast. The first device establishes a wireless communication connection to the second device after the second device receives the wireless communication broadcast. The first device sends a data obtaining request to the second device, where the data obtaining request is used to request to obtain data required for authentication from the second device. The first device receives the data required for authentication from the second device, where the data required for authentication includes the first preset distance, the second preset distance, the third preset distance, and the fourth preset distance.

In a possible implementation of the first aspect, the first authentication request includes a device ID identifying the first device and a first authentication ID identifying the first authentication request.

In a possible implementation of the first aspect, the first authentication success ciphertext includes the encrypted device ID and the encrypted first authentication ID.

In a possible implementation of the first aspect, the second authentication request includes a device ID identifying the first device and a second authentication ID identifying the second authentication request.

In a possible implementation of the first aspect, the second authentication success ciphertext includes the encrypted device ID and the encrypted second authentication ID.

In a possible implementation of the first aspect, the second device communicates with the first device through Bluetooth low energy.

According to a second aspect, an embodiment of this application discloses an authentication method, including the following steps:

A second device receives a first authentication request from a first device, where the first authentication request is sent by the first device when a distance between the second device and the first device reaches a first preset distance.

The second device determines, in response to the received first authentication request, whether wireless communication between the second device and the first device is relayed. The second device sends a first authentication success ciphertext to the first device when determining that wireless communication between the second device and the first device is not relayed.

For example, the first device is a vehicle, the second device is a mobile terminal such as a mobile phone, the first authentication request is an imperceptible authentication initiation command, the first authentication success ciphertext is an imperceptible authentication success ciphertext, and an agreed service is opening a vehicle lock. In this case, the first preset distance in the foregoing solution may be an imperceptible authentication distance. The mobile terminal performs anti-relay determining between the first preset distance and a second preset distance, and when a result of anti-relay determining is that wireless communication does not encounter a relay attack, the mobile phone sends the first authentication success ciphertext to the vehicle.

In a possible implementation of the second aspect, after the second device receives the first authentication request from the first device, the method further includes: The second device receives a second authentication request from the first device, where the second authentication request is sent by the first device when the first device determines that the distance between the first device and the second device reaches a second preset distance, and the first authentication success ciphertext sent by the second device is not received or verification performed by the first device on the received first authentication success ciphertext fails, and the second preset distance is less than the first preset distance. The second device performs biometric verification on a user of the second device in response to the received second authentication request. The second device sends a second authentication success ciphertext to the first device when the biometric verification succeeds.

The case in which the first authentication success ciphertext is not received may be a case in which the first device receives a message that is sent by the second device and that indicates that wireless communication between the first device and the second device encounters a relay attack, or may be a case in which the second device does not send any determining result and the first device cannot determine whether wireless communication between the first device and the second device is relayed.

To be specific, in the foregoing solution, if between the first preset distance and the second preset distance, the second device determines that wireless communication between the first device and the second device encounters a relay attack, or cannot determine whether wireless communication between the first device and the second device is relayed, the first device may control the second device to perform biometric feature authentication on the user, to determine validity of the user of the second device.

For example, the first device may be a vehicle, the second device may be a mobile terminal such as a mobile phone, the second authentication request is a perceptible authentication initiation command, and the second authentication success ciphertext is a perceptible authentication success ciphertext.

In a possible implementation of the second aspect, before the second device receives the first authentication request from the first device, the method further includes: The second device receives a wireless communication broadcast sent by the first device. The second device establishes wireless communication with the first device. The second device receives a data obtaining request from the first device. The second device sends, in response to the data obtaining request received from the first device, data required for authentication to the first device, where the data required for authentication includes the first preset distance and the second preset distance.

In a possible implementation of the second aspect, the agreed service is an unlock service or a payment service.

In a possible implementation of the second aspect, when the agreed service is the unlock service, the second device is a mobile terminal, and the first device is a vehicle or a lock.

In a possible implementation of the second aspect, when the agreed service is the payment service, the second device is a mobile terminal, and the first device is a tolling terminal.

In a possible implementation of the second aspect, the first device is the vehicle, and that the second device determines, in response to the received first authentication request, whether wireless communication between the second device and the first device is relayed includes the following steps:

The second device obtains a plurality of positioning locations of the second device through at least one positioning service, and compares the obtained plurality of positioning locations with a reference location, to determine whether a distance difference between at least one of the plurality of positioning locations and the reference location is less than a distance threshold, where the reference location is a location that is of the second device and that is obtained by the second device through one of the at least one positioning service after the first device performs a last flameout before sending the first authentication request.

When determining that the distance difference between the at least one of the plurality of positioning locations and the reference location is less than the distance threshold, the second device determines that wireless communication between the second device and the first device is not relayed.

To be specific, the second device compares a positioning location currently obtained through positioning with the reference location previously obtained near the first device, to determine whether the second device is currently near the first device. For example, the first device is a vehicle, and the second device is a mobile terminal. In this case, before the first device performs a current unlock service, after a flameout closest to the current unlock service occurs, the first device sends a positioning request (for example, a flameout positioning starting command) to the second device, so that the second device obtains the reference location of the second device near the first device.

In a possible implementation of the second aspect, that the second device obtains a plurality of positioning locations of the second device through at least one positioning service, and compares the obtained plurality of positioning locations with a reference location includes the following steps:

The second device obtains a first positioning location and/or a second positioning location of the second device through a first positioning service and/or a second positioning service, where the at least one positioning service includes the first positioning service and the second positioning service. When determining that a positioning service used when the reference location is obtained is the first positioning service, the second device compares the first positioning location with the reference location. When determining that the positioning service used when the reference location is obtained is the second positioning service, the second device compares the second positioning location with the reference location.

To be specific, when performing anti-relay determining, the second device compares only the positioning location and the reference location that use a same positioning service, to improve location comparison accuracy.

In a possible implementation of the second aspect, that the second device determines, in response to the received first authentication request, whether wireless communication between the second device and the first device is relayed further includes the following steps:

When determining that a distance difference between the first positioning location or the second positioning location and the reference location is not less than the distance threshold, the second device determines whether a time period for performing the positioning service exceeds a first time threshold.

When determining that the time period for performing the positioning service does not exceed the first time threshold, the second device re-obtains the first positioning location and/or the second positioning location of the mobile phone through the first positioning service and/or the second positioning service. When determining that the time period for performing the positioning service exceeds the first time threshold, the second device determines that wireless communication between the second device and the first device is relayed, and the second device sends, to the first device, a message indicating that the second device encounters a relay attack.

To be specific, during anti-relay determining, it is specified that positioning and location comparison are completed within the time threshold. If it is not determined, after time expires, that the second device does not encounter a relay attack, it may be determined that the second device is not near the first device, and it is determined that communication between the second device and the first device encounters a relay attack.

In a possible implementation of the second aspect, that the second device determines, in response to the received first authentication request, whether wireless communication between the second device and the first device is relayed further includes the following steps:

The second device determines whether a height difference between a current height of the second device and a reference height that is of the second device and at which the second device obtains the reference location is less than a height threshold.

When determining that the height difference between the current height and the reference height is less than the height threshold, and the distance difference between the at least one of the plurality of positioning locations and the reference location is less than the distance threshold, the second device determines that wireless communication between the second device and the first device is not relayed.

When the second device determines that the height difference between the current height and the reference height is not less than the height threshold, or a distance difference between each of the plurality of positioning locations and the reference location is greater than or equal to the distance threshold, the second device determines that wireless communication between the second device and the first device is relayed, and the second device sends, to the first device, a message indicating that the second device encounters a relay attack.

To be specific, during anti-relay determining, in addition to comparing the determined locations, the second device further determines whether the height difference between the height of the second device and the height at which the reference location is obtained meets a height requirement. If the height difference does not meet the height requirement, the second device determines that wireless communication between the second device and the first device encounters a relay attack.

In a possible implementation of the second aspect, the method further includes the following steps:

The second device receives a positioning request from the first device, where the positioning request is sent by the first device to the second device when the first device performs a last flameout before sending the first authentication request. The second device obtains, in response to the received positioning request, the reference location of the second device through the at least one positioning service.

To be specific, before the first device performs a current unlock service, after a flameout closest to the current unlock service occurs or a vehicle door is closed, the first device sends the positioning request (for example, a flameout positioning starting command) to the second device, so that the second device obtains the reference location of the second device near the first device. When performing the current unlock service, the second device may determine, by comparing a positioning location of the second device with the reference location, whether the second device is near the first device.

In a possible implementation of the second aspect, that the second device obtains, in response to the received positioning request, the reference location of the second device through the at least one positioning service includes the following steps:

The second device positions the second device through a first positioning service and/or a second positioning service, and the second device obtains third positioning locations of the second device through the first positioning service and/or fourth positioning locations of the second device through the second positioning service. The second device determines whether a quantity of times of performing positioning through the first positioning service exceeds a quantity-of-times threshold. When determining that the quantity of times of performing positioning through the first positioning service exceeds the quantity-of-times threshold, the second device uses an average location of the third positioning locations obtained by the second device as the reference location.

The first positioning service may be a positioning service with high security that does not easily encounter a relay attack, for example, a satellite positioning service. Therefore, when the quantity of positioning times of the positioning service with high security exceeds the quantity-of-times threshold, the average location of the positioning locations determined through the positioning service may be directly used as the reference location.

In a possible implementation of the second aspect, that the second device determines whether a quantity of times of performing positioning through the first positioning service exceeds a quantity-of-times threshold further includes the following steps:

When determining that the quantity of times of performing positioning through the first positioning service does not exceed the quantity-of-times threshold, the second device determines whether a time period for performing positioning through the first positioning service exceeds a second time threshold. When determining that the time period for performing positioning through the first positioning service exceeds the second time threshold, the second device uses the average location of the third positioning locations obtained by the second device or an average location of the fourth positioning locations obtained by the second device as the reference location. When determining that the time period for performing positioning through the first positioning service does not exceed the second time threshold, the second device continues to perform positioning through the first positioning service and/or the second positioning service.

To be specific, a positioning time threshold is set. The first positioning service may be a positioning service with high security that does not easily encounter a relay attack, for example, a satellite positioning service. If the quantity of positioning times of the positioning service with high security does not exceed the quantity-of-times threshold but exceeds the time threshold, the average location of the positioning locations determined through the first positioning service or the second positioning service may be directly used as the reference location.

In a possible implementation of the second aspect, that the second device uses the average location of the third positioning locations obtained by the second device or an average location of the fourth positioning locations obtained by the second device as the reference location includes:

when determining that the second device has obtained the third positioning locations, using the average location of the third positioning locations as the reference location; or when determining that the second device has not obtained the third positioning locations but has obtained the fourth positioning locations, using the average location of the fourth positioning locations as the reference location.

To be specific, when security or stability of the first positioning service is higher than that of the second positioning service, the average location of the positioning locations obtained through the first positioning service is preferentially used as the reference location. For example, the first positioning service may be a satellite positioning service.

In a possible implementation of the second aspect, the method further includes the following step:

When successfully obtaining the reference location, the second device sends a flameout positioning success ciphertext to the first device.

In a possible implementation of the second aspect, the method further includes the following steps:

The second device determines whether a positioning stop request sent by the first device is received, where the positioning stop request is sent by the first device when the distance between the second device and the first device is a fourth preset distance, and the first device does not receive, in advance, the flameout positioning success ciphertext that is sent by the second device and that indicates that the reference location is successfully obtained or verification on the flameout positioning success ciphertext received in advance fails, and the fourth preset distance is less than or equal to the first preset distance.

When receiving the positioning stop request, the second device stops positioning the second device, and uses the average location of the obtained positioning locations as the reference location.

To be specific, the second device obtains the reference location within a range. If the range exceeds the fourth preset distance, it indicates that the distance between the second device and the first device is excessively long, and relay determining cannot be performed. Therefore, the first device sends the positioning stop request to the second device, so that the second device obtains the reference location within the fourth preset distance.

In a possible implementation of the second aspect, that the second device uses the average location of the obtained positioning locations as the reference location includes:

when determining that the second device has obtained the third positioning locations, using the average location of the third positioning locations as the reference location; or when determining that the second device has not obtained the third positioning locations but has obtained the fourth positioning locations, using the average location of the fourth positioning locations determined by the second device through the second positioning device as the reference location.

In a possible implementation of the second aspect, the positioning request includes a positioning ID identifying the positioning request and a vehicle ID identifying the first device. The method further includes: The second device determines whether a vehicle ID and a positioning ID that are the same as the vehicle ID and the positioning ID in the positioning request are stored. When determining that the same vehicle ID and the same positioning ID are not stored, the second device stores the obtained reference location and the vehicle ID and the positioning ID in the positioning request. When determining that the same vehicle ID and the same positioning ID are stored, the second device sends a positioning failure message to the first device.

To be specific, the positioning ID is used to indicate the positioning request. If the second device already stores the positioning ID, it indicates that it is very likely that the positioning request is a previous positioning request forwarded by a device that performs a relay attack after the device intercepts the previous positioning request, that is, communication between the first device and the second device may encounter a relay attack. Therefore, the reference location obtained in this case may not be near the second device, and the reference location obtained herein is canceled.

In a possible implementation of the second aspect, the method further includes: The second device stores the obtained reference location in a trusted execution environment or a secure element of the second device.

In a possible implementation of the second aspect, the method further includes: In response to the received positioning request, the second device obtains heights of a plurality of second devices, and uses an average height of the obtained heights of the plurality of second devices as a reference height.

In a possible implementation of the second aspect, the first positioning service is satellite positioning service, and the second positioning service is a network positioning service.

In a possible implementation of the second aspect, the first authentication request includes a device ID identifying the second device and a first authentication ID identifying the first authentication request.

In a possible implementation of the second aspect, the first authentication success ciphertext includes the encrypted device ID and the encrypted first authentication ID.

In a possible implementation of the second aspect, the second authentication request includes a device ID identifying the second device and a second authentication ID identifying the second authentication request.

In a possible implementation of the second aspect, the second authentication success ciphertext includes the encrypted device ID and the encrypted second authentication ID.

In a possible implementation of the second aspect, the second device communicates with the first device through Bluetooth low energy.

According to a third aspect, an embodiment of this application discloses an electronic device. The electronic device has functions of implementing behavior of the first device or the second device in the foregoing authentication method. The functions may be implemented by hardware, or may be implemented by hardware executing corresponding software. The hardware or the software includes one or more modules corresponding to the functions.

According to a fourth aspect, an embodiment of this application discloses a computer-readable medium. The computer-readable medium stores instructions, and when the instructions are executed on a computer, the computer is enabled to perform the authentication method according to the first aspect or the second aspect.

According to a fifth aspect, an embodiment of this application discloses an electronic device, including one or more processors; and a memory, configured to store instructions, where when the instructions are executed by the one or more processors, the electronic device is enabled to perform the authentication method according to the first aspect or the second aspect.

BRIEF DESCRIPTION OF THE DRAWINGS

FIG. 9A-1, FIG. 9A-2, and FIG. 9A-3 and FIG. 9B-1, FIG. 9B-2, and FIG. 9B-3 are respectively schematic flowcharts of performing flameout positioning by a mobile phone 10 before and after the mobile phone 10 receives a flameout positioning stop command in the architecture shown in FIG. 2 according to some embodiments of this application;

FIG. 10A-1 and FIG. 10A-2 and FIG. 10B respectively show flameout positioning policies before and after a flameout positioning stop command is received according to some embodiments of this application;

FIG. 18A-1, FIG. 18A-2, and FIG. 18A-3 and FIG. 18B-1, FIG. 18B-2, and FIG. 18B-3 are respectively schematic flowcharts of performing flameout positioning by a mobile phone 10 before and after the mobile phone 10 receives a flameout positioning stop command in the architecture shown in FIG. 16 according to some embodiments of this application;

DETAILED DESCRIPTION OF ILLUSTRATIVE EMBODIMENTS

Illustrative embodiments of this application include but are not limited to an authentication method, a medium, and an electronic device.

It may be understood that as used in this specification, a term "module" may be or include an application-specific integrated circuit (ASIC), an electronic circuit, a memory and/or a processor (shared, dedicated, or a group) that executes one or more software or firmware programs, combined logic circuits, and/or another appropriate hardware component that provides a described function, or may be a part of these hardware components.

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

Figures 1, 2:
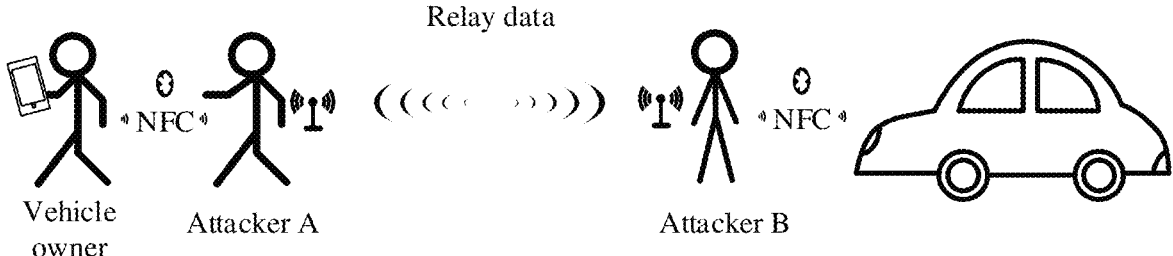
FIG. 1 is a diagram of a scenario in which a relay attack occurs when an imperceptible unlocking technology is used to open a vehicle lock.
FIG. 2 is a diagram of an architecture of a system for implementing an unlock service between a mobile phone and a vehicle according to some embodiments of this application.

FIG. 2 is a diagram of an architecture of a system for implementing an unlock service between a mobile phone and a vehicle according to some embodiments of this application. The system implements the unlock service by using an authentication technology in this application. As shown in FIG. 2, the system includes a mobile phone 10 and a vehicle 20. The mobile phone 10 and the vehicle 20 communicate with each other through BLE (Bluetooth Low Energy, Bluetooth Low Energy). The mobile phone 10 includes a BLE agent (BLE Agent) 101, a vehicle manufacturer app (Application, application) 102, a mobile wallet 103, an anti-relay application 104, a positioning service 105, a wallet TA 106, an anti-relay TA 107, a vehicle key applet 108, and a mobile BLE chip 109. The vehicle 20 includes a head unit 210, and the head unit 210 includes a vehicle lock applet 211, a vehicle lock command engine 212, and a vehicle-mounted BLE module 213.

Specifically, the BLE agent 101 of the mobile phone 10 may register related information of the vehicle 20 when a connection is initially established between the vehicle 20 and the mobile phone 10, and may wake up, after the mobile BLE chip 109 receives a BLE broadcast from the vehicle 20, the vehicle manufacturer app 102 to establish a BLE connection to the vehicle 20. The vehicle manufacturer app 102 may communicate with the vehicle-mounted BLE module 213 of the head unit 210, forward, to the mobile wallet 103, a command sent by the vehicle-mounted BLE module 213, and forward, to the vehicle-mounted BLE module 213, related information generated by the mobile wallet 103.

According to a command received from the vehicle lock command engine 212 of the head unit 210, the mobile wallet 103 may invoke the anti-relay application 104 to perform imperceptible authentication and flameout positioning, or invoke a perceptible authentication service to perform perceptible authentication. The wallet TA 106 may be located in a TEE (Trusted Execution Environment, trusted execution environment) of the mobile phone 10, and is configured to obtain an anti-relay determining result and a flameout positioning result from the anti-relay TA 107, or obtain a perceptible authentication result from a perceptible authentication application in some embodiments. The wallet TA 106 is disposed in the TEE of the mobile phone 10, so that authenticity of authentication results or flameout positioning results of all authentication can be effectively ensured, and security of an unlocking process is improved.

The anti-relay application 104 and the anti-relay TA 107 may complete imperceptible authentication in response to an imperceptible authentication invocation request from the mobile wallet 103, or complete flameout positioning in response to a flameout positioning request from the mobile wallet 103. During flameout positioning, the anti-relay application 104 may be configured to perform a flameout positioning process, and a reference location determined through flameout positioning is stored in the anti-relay TA 107. In an imperceptible authentication phase, the anti-relay TA 107 performs anti-relay determining according to an anti-relay rule. The positioning service 105 is configured to provide a positioning service for the anti-relay application 104.

The vehicle key applet 108 may be configured to: store key information and generate ciphertexts in all phases in an unlocking process, for example, an imperceptible authentication ciphertext, a perceptible authentication ciphertext, and a flameout positioning success ciphertext. The vehicle lock applet 211 may be configured to store key information, and is configured to verify various ciphertexts generated by the vehicle key applet 108. The vehicle lock command engine 212 is configured to generate commands of various tasks that need to be performed by the mobile phone in the unlocking process, for example, an imperceptible authentication command, a perceptible authentication command, and a flameout positioning command. The vehicle-mounted BLE module 213 may be a BLE chip in the head unit 210, and is configured to: forward various commands generated by the vehicle lock command engine 212 to the vehicle manufacturer app 102 on a side of the mobile phone 10, and forward, to the vehicle lock command engine 212, various ciphertexts sent by the vehicle manufacturer app 102, and then the vehicle lock command engine 212 sends the cipher-texts to the vehicle lock applet 211 for verification.

It may be understood that, in the architecture shown in FIG. 2, applications related to unlocking on the mobile phone 10 are separately placed in an REE (Rich Execution Environment, rich execution environment), a TEE, and an SE (Secure Element, secure element). The SE has highest security, and is configured to store core data or a core application in the entire process. For example, a vehicle key applet (vehicle key applet, where an applet is an application in the SE) and a key used for authentication in the unlocking process are placed in the SE. The TEE has higher security than the REE. Therefore, to improve security, some impor-tant functions or data in a mobile wallet and an anti-relay service is placed in the TEE, and other functions or data is placed in the REE. For example, storage of an authentication rule and a reference location in each authentication phase in the anti-relay service is important. Therefore, the informa-tion is placed in an anti-relay TA (TA represents a TEE application (TEE Application)) in the TEE.

Based on the architecture shown in FIG. 2, the following describes in detail the unlocking process between the mobile phone 10 and the vehicle 20.

Registration Process

Figure 3:
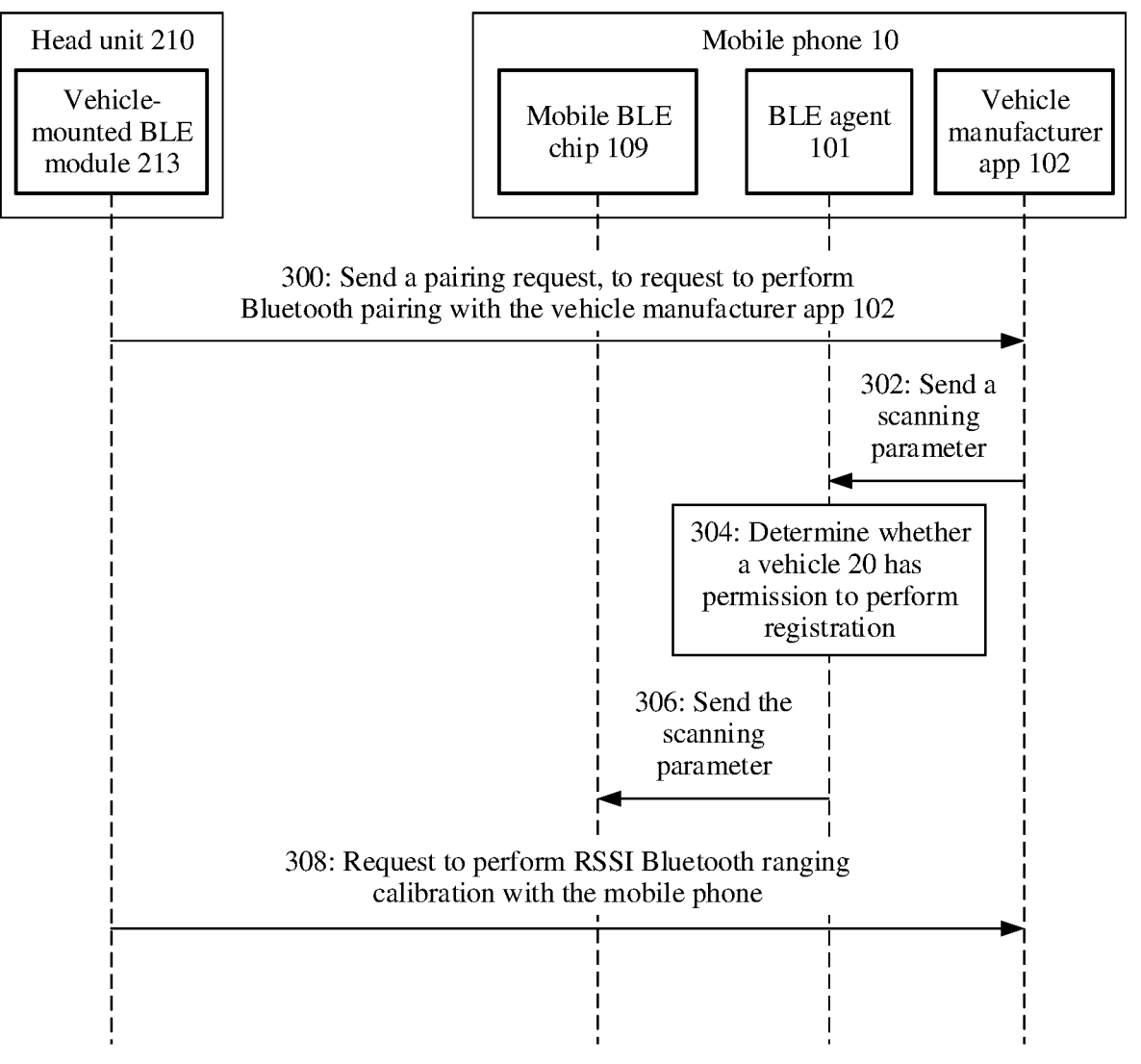
FIG. 3 is a schematic flowchart in which a vehicle 20 registers with a mobile phone 10 and the vehicle 20 and the mobile phone 10 perform Bluetooth ranging calibration in the architecture shown in FIG. 2 according to some embodiments of this application.

When the mobile phone 10 initially establishes a com-munication connection to the head unit 210 of the vehicle 20, registration and Bluetooth ranging calibration need to be performed. FIG. 3 shows a specific process of registration and Bluetooth ranging calibration according to some embodiments. As shown in FIG. 3, the process includes the following steps.

300: After the head unit 210 establishes a BLE connection to the mobile phone 10, the vehicle-mounted BLE module 213 of the head unit 210 sends a pairing request to the vehicle manufacturer app 102 of the mobile phone 10, to request to perform BLE pairing with the vehicle manufacturer app 102.

302: After the vehicle manufacturer app 102 completes pairing with the vehicle-mounted BLE module 213, the vehicle manufacturer app 102 of the mobile phone 10 sends a scanning parameter to the BLE agent 101. For example, the scanning parameter may include a vehicle ID, a UUID (Universally Unique Identifier, universally unique identifier), and custom data of the vehicle 20. The UUID is a Bluetooth ID that can be identified by the vehicle-mounted BLE module 213 of the vehicle 20. The custom data may be understood as a reserved data bit, and is used to place extended data that may be required subsequently.

It may be understood that the vehicle manufacturer app 102 may obtain the scanning parameters from the vehicle 20, or may obtain the scanning parameter from a server. This is not limited herein.

304: After receiving the scanning parameter, the BLE agent 101 performs verification based on the scanning parameter, to determine whether the vehicle 20 has permission to perform registration. For example, the BLE agent 101 stores a list of vehicle manufacturers cooperating with a mobile wallet. After receiving the scanning parameter, the BLE agent 101 may determine, based on a vehicle ID, whether a vehicle manufacturer of the vehicle 20 is in the list. If the vehicle manufac-turer is in the list, it indicates that the vehicle 20 has permission to perform registration.

306: When determining that the vehicle 20 has permission to perform registration, the BLE agent 101 sends the scanning parameter to the mobile BLE chip 109. In this way, registration of the vehicle 20 with the mobile phone 10 is completed.

It may be understood that in some embodiments, vehicles of a same type may have a same UUID, but each vehicle has a separate vehicle ID.

308: After the vehicle 20 completes registration with the mobile phone 10, the vehicle-mounted BLE module 213 sends a request to the vehicle manufacturer app 102, to request to perform RSSI (Received Signal Strength Indication, received signal strength indicator) Bluetooth ranging calibration with the mobile phone. After receiving the request, the vehicle manufacturer app 102 completes RSSI Bluetooth ranging calibration together with the vehicle 20. In an unlocking process between the mobile phone 10 and the vehicle 20, the vehicle 20 needs to perform RSSI Bluetooth ranging on the mobile phone 10, to trigger, at a specific distance, the mobile phone 10 to perform a specific authentica-tion task. Performing RSSI Bluetooth ranging calibra-tion can improve accuracy of RSSI Bluetooth ranging performed by the vehicle 20 on the mobile phone 10.

It may be understood that, in another embodiment, RSSI Bluetooth ranging calibration between the vehicle 20 and the mobile phone 10 may not be performed.

The vehicle 20 and the mobile phone 10 need to complete registration and Bluetooth ranging calibration only when initially establishing a communication connection, and sub-sequently perform an unlock service based on registration information. In addition, before establishing communication with the mobile phone 10, the vehicle 20 always performs a BLE broadcast. Therefore, communication between the vehicle 20 and the mobile phone 10 is implemented through BLE, so that a low power consumption feature of BLE can be fully used, and communication power consumption can be reduced. In addition, BLE has security measures such as frequency modulation and encryption, and is more difficult to be tracked, relayed, and cracked. Security of BLE is significantly higher than that of a mainstream imperceptible key fob (which is a small hard disk device with a built-in verification mechanism and uses a low-frequency RFID signal) on the market.

In addition, it may be understood that, in embodiments of this application, wireless communication between the vehicle 20 and the mobile phone 10 is performed through BLE. However, a manner of communication between the vehicle 20 and the mobile phone 10 may not be limited to BLE mentioned in the foregoing embodiment, and may be another short-range wireless communications technology, for example, including but not limited to BT (Bluetooth, Bluetooth), NFC (Near Field Communication, near field communication), FM (frequency modulation, frequency modulation), and IR (Infrared, infrared) communication.

Figure 4:
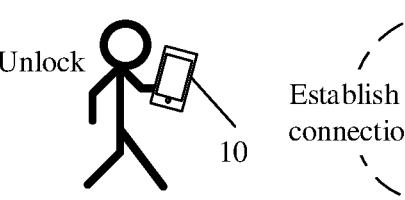
FIG. 4 is a diagram of a scenario in which a mobile phone 10 and a vehicle 20 implement an imperceptible unlock service according to some embodiments of this application.
Figure 4:
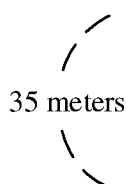
Figure 4:
Figure 4:
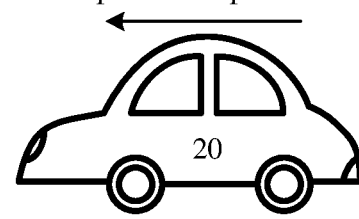

FIG. 4 is a diagram of a scenario in which a mobile phone 10 and a vehicle 20 implement an imperceptible unlock service. As shown in FIG. 4, to start the vehicle 20, the mobile phone 10 needs to sequentially go through four phases: a Bluetooth connection establishment phase, an imperceptible authentication phase, a phase of measuring a distance for unlocking, and a phase of notifying that unlock-ing succeeds. Before the vehicle 20 establishes a Bluetooth connection to the mobile phone 10, the vehicle 20 always performs a BLE broadcast. When a distance between the mobile phone 10 and the vehicle 20 reaches a distance A (for example, 100 meters), the mobile phone 10 may detect a BLE broadcast signal of the vehicle 20, and establish a BLE connection to the vehicle 20. After the BLE connection is established, the vehicle 20 performs BLE ranging on the mobile phone 10, to determine whether the mobile phone 10 enters an imperceptible authentication distance. After measuring that the distance between the mobile phone 10 and the vehicle 20 reaches the imperceptible authentication distance (35 meters shown in FIG. 4), the mobile phone 10 starts imperceptible authentication in response to an AUTH0 (imperceptible authentication initiation) command sent by the vehicle 20. If imperceptible authentication succeeds, when a user opens a vehicle door, the vehicle 20 further needs to measure the distance between the mobile phone 10 and the vehicle 20. A vehicle lock is opened only when it is ensured that the mobile phone 10 is next to the vehicle 20 (for example, the distanced is less than 1 meter).

It may be understood that the trigger distance values in the phases shown in FIG. 4 are merely for illustrative purposes. In embodiments of this application, any other distance value may be set based on a requirement. This is not limited herein.

BLE Connection Establishment Phase

Figure 5:
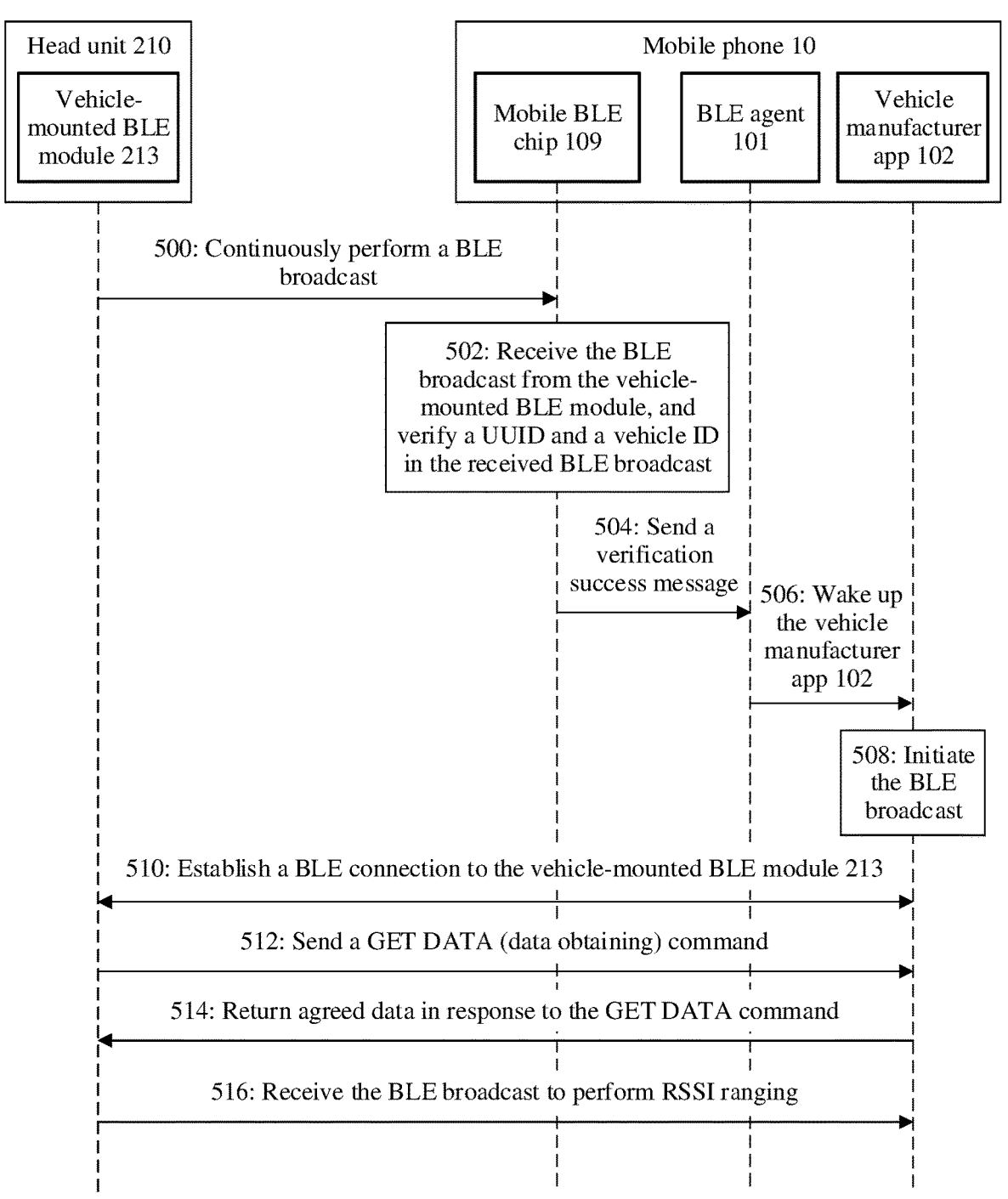
FIG. 5 is a schematic flowchart of establishing a BLE connection between a mobile phone 10 and a vehicle 20 according to some embodiments of this application.

As described above, when the vehicle 20 stops, the head unit 210 continuously sends a BLE broadcast. If the mobile phone 10 can receive, in a process of approaching the vehicle 20, the BLE broadcast sent by the head unit 210, the mobile phone 10 establishes a BLE connection to the head unit 210. FIG. 5 is a schematic flowchart of establishing a BLE connection between a mobile phone 10 and a vehicle 20 according to some embodiments. Specifically, as shown in FIG. 5, a process of establishing the BLE connection between the mobile phone 10 and the vehicle 20 includes the following steps.

500: When the vehicle 20 does not establish a BLE connection to the mobile phone 10, a vehicle-mounted BLE module 213 of the vehicle 20 continuously performs a BLE broadcast, to wait for the mobile phone 10 to enter a range in which the mobile phone 10 can receive the BLE broadcast from the vehicle 20, where the BLE broadcast carries a UUID and a vehicle ID of the vehicle 20.

502: In a process in which the mobile phone 10 approaches the vehicle 20, a mobile BLE chip 109 receives the BLE broadcast from the vehicle-mounted BLE module 213, and verifies the UUID and the vehicle ID in the received BLE broadcast. If the UUID and the vehicle ID in the BLE broadcast match a UUID and a vehicle ID that are stored by the mobile BLE chip 109 during registration, it indicates that verification succeeds. If the UUID and the vehicle ID in the BLE broadcast do not match a UUID and a vehicle ID that are stored by the mobile BLE chip 109 during registration, it indicates that verification fails, and the mobile BLE chip 109 does not make any response.

504: After verification succeeds, the mobile BLE chip 109 sends a verification success message to a BLE agent 101.

506: After receiving the verification success message, the BLE agent 101 wakes up a vehicle manufacturer app 102.

508: After being woken up, the vehicle manufacturer app 102 initiates the BLE broadcast of the mobile BLE chip 109.

510: The vehicle manufacturer app 102 establishes a BLE connection to the vehicle-mounted BLE module 213. It may be understood that in some implementations, after the vehicle manufacturer app 102 establishes the BLE connection to the vehicle-mounted BLE module 213, the vehicle-mounted BLE module 213 may stop the BLE broadcast, to reduce communication power consumption.

512: After establishing the BLE connection to the vehicle manufacturer app 102, the vehicle-mounted BLE module 203 sends a GET DATA (GET DATA) command to the vehicle manufacturer app 102.

It may be understood that although a name of a command for obtaining agreed data this time is GET DATA, in another implementation of this application, the command may also be named in another name. This is not limited herein.

514: The vehicle manufacturer app 102 returns the agreed data in response to the received GET DATA (GET DATA) command, where the agreed data is used for a subsequent unlock service. For example, the agreed data may include a distance configuration table, a key, a serial number of the vehicle manufacturer app, a version number of the vehicle manufacturer app, and the like. The distance configuration table includes a relationship between each authentication phase of the mobile phone 10 and a distance between the mobile phone 10 and the vehicle 20. For example, imperceptible authentication is started at a specific distance between the mobile phone 10 and the vehicle 20, and perceptible authentication is started at a specific distance between the mobile phone 10 and the vehicle 20. The key is used to encrypt information transmitted between the mobile phone 10 and the vehicle 20.

For example, in some embodiments, the GET DATA command may include an identifier of data expected to be obtained. It may be understood that in some embodiments, the identifier of the data expected to be obtained may be a character that can be identified by the vehicle manufacturer app 102. After identifying the character, the vehicle manufacturer app 102 returns data corresponding to the character to the vehicle-mounted BLE module 203. Data included in the GET DATA command is shown in Table 1:

TABLE 1

| GET DATA | Identifier of data expected to be obtained | Configuration data |
|---|---|---|

The data expected to be obtained may include a distance configuration table, a key, a serial number of the vehicle manufacturer app, a version number of the vehicle manufacturer app, and the like. The configuration data may include a vehicle ID that identifies the vehicle 20, a positioning ID, an authentication ID, a vehicle key AID (Application identifier, application identifier), a key ID, and the like. The positioning ID is used to identify flameout positioning that needs to be subsequently performed, the authentication ID is used to identify imperceptible authentication or perceptible authentication that needs to be subsequently performed, the vehicle key AID is used to identify the vehicle manufacturer app, and the key ID is used to identify a vehicle managed by the vehicle manufacturer app 102 (it is assumed that in addition to the vehicle 20, the vehicle manufacturer app 102 further manages another vehicle of a same type or a vehicle delivered by a same vehicle manufacturer).

It may be understood that in another embodiment of this application, the distance configuration table and the key may alternatively be stored in the head unit 210 and periodically updated, and the mobile phone 10 does not need to send the distance configuration table and the key to the head unit 210 of the vehicle 20 each time the BLE connection is established.

It may be understood that the information included in the GET DATA command shown in Table 1 is merely an example but is not limitative. The GET DATA command may further include other information.

It may be understood that, after establishing a communication connection, the mobile phone 10 and the vehicle 20 may also transmit other information to each other, which is not limited to the information mentioned above.

516: After receiving the agreed data, the vehicle-mounted BLE module 203 wakes up a plurality of BLE ranging antennas to receive the BLE broadcast from the mobile BLE chip 109, to perform RSSI ranging on the mobile phone 10.

Imperceptible Authentication Phase

As described above, after establishing a BLE connection to the vehicle manufacturer app, the vehicle-mounted BLE module 213 starts to perform RSSI ranging on the mobile phone 10. Still refer to FIG. 4. When measuring that the distance between the mobile phone 10 and the vehicle 20 reaches the imperceptible authentication distance (35 meters shown in FIG. 4), a vehicle lock command engine 212 of the head unit 210 of the vehicle 20 generates an AUTH0 (imperceptible authentication initiation) command, to command the mobile phone 10 to start to perform imperceptible authentication. In addition, in some embodiments, a distance range for imperceptible authentication may be set. For example, when the distance is less than 35 meters and greater than 3 meters, imperceptible authentication is performed. When imperceptible authentication performed when the distance is less than 3 meters fails, another manner is used to open a vehicle lock, for example, perceptible authentication is performed, and the user is indicated to open the lock by using a biometric recognition feature (for example, a fingerprint).

In the imperceptible authentication phase, the mobile phone 10 compares a current location obtained through a positioning service with a reference location. Before a current unlock service is performed, after a vehicle flameout closest to the current unlock service occurs, the reference location may be a location that is of the mobile phone 10 and that is determined by the mobile phone 10 near the vehicle 20 according to a flameout positioning policy in response to a positioning request sent by the vehicle 20. If the current location of the mobile phone 10 matches the reference location or the current location of the mobile phone 10 is near the reference location, it indicates that the mobile phone 10 is near the vehicle 20, a possibility that the mobile phone 10 encounters a relay attack is low, and imperceptible authentication succeeds. Obtaining the reference location is discussed in detail below.

Figure 6A:
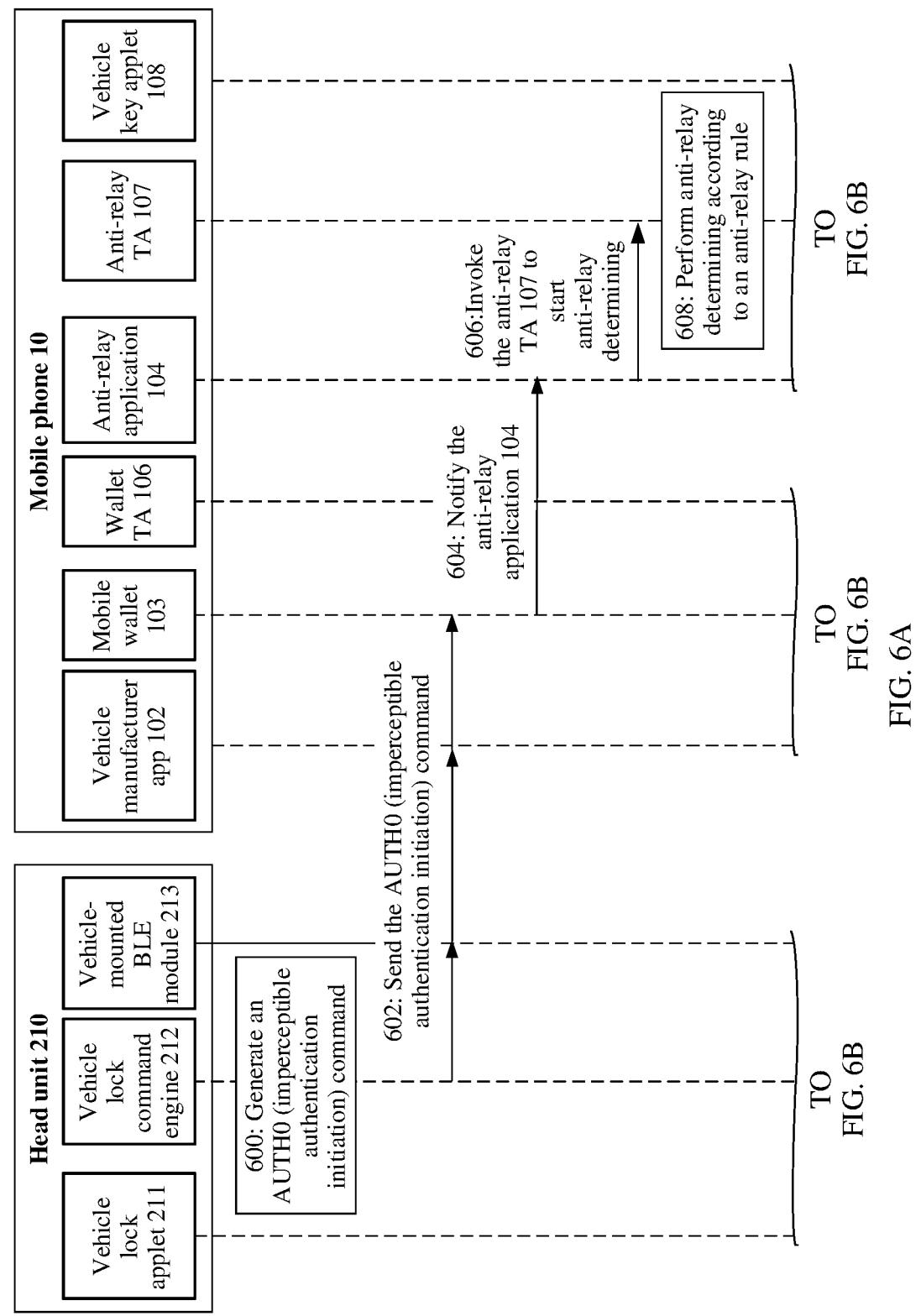
FIG. 6A, FIG. 6B, and FIG. 6C are a schematic flowchart of performing imperceptible authentication by a mobile phone 10 in the architecture shown in FIG. 2 according to some embodiments of this application.
Figure 6B:
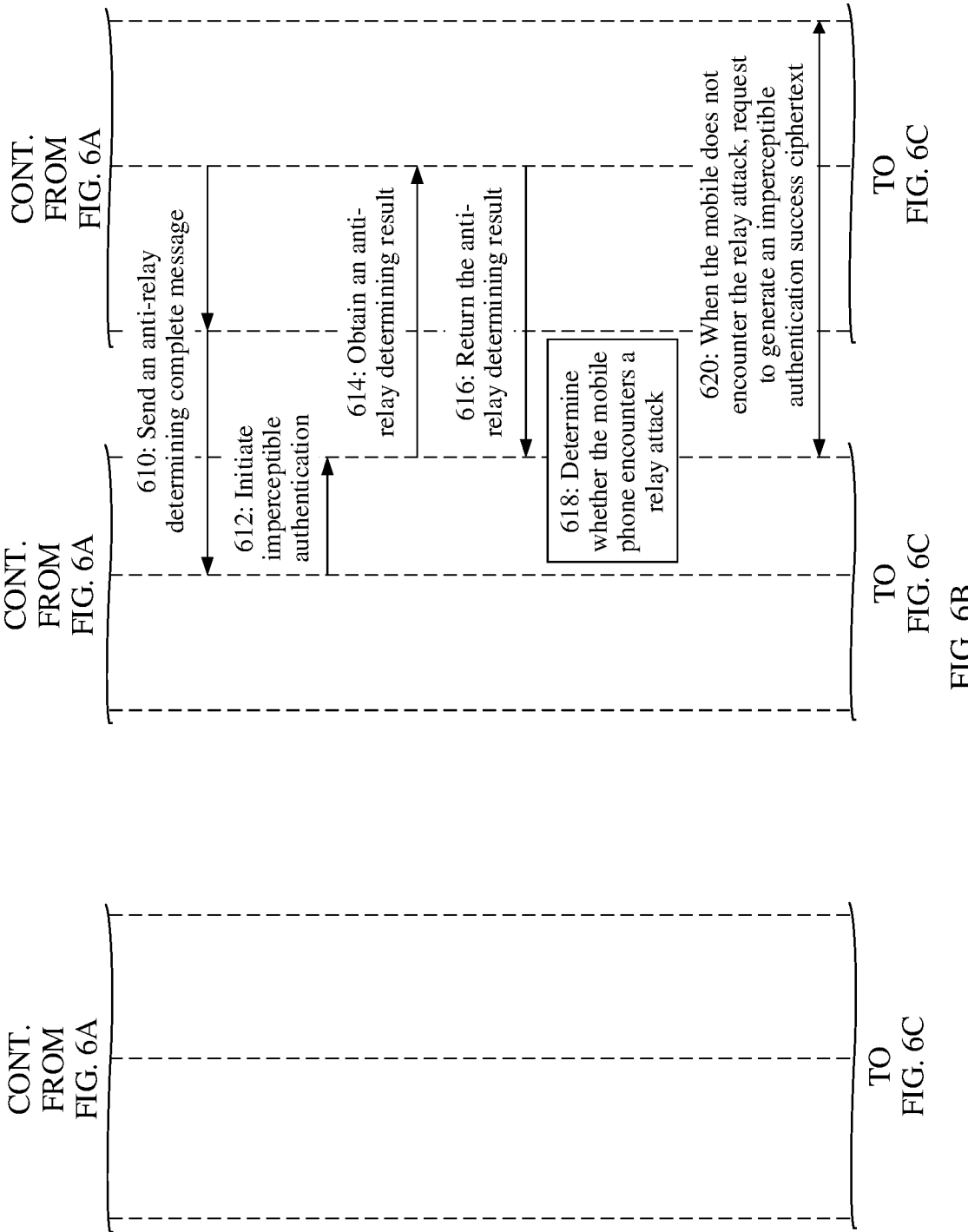
Figure 6C:
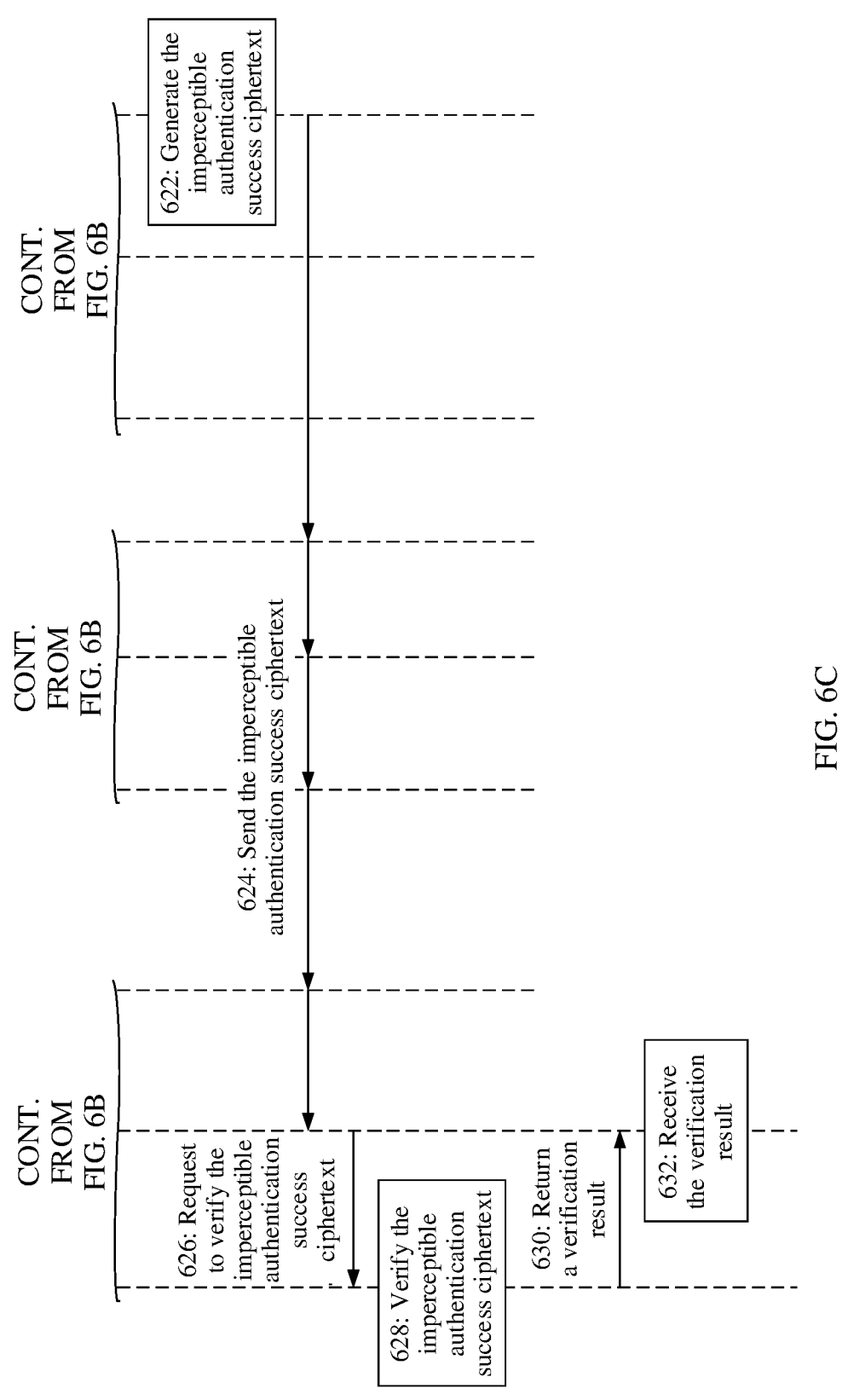

FIG. 6A, FIG. 6B, and FIG. 6C are a schematic flowchart of performing imperceptible authentication by a mobile phone 10 according to some embodiments. Specifically, as shown in FIG. 6A, FIG. 6B, and FIG. 6C, a process of performing imperceptible authentication by the mobile phone 10 includes the following steps.

600: A vehicle lock command engine 212 generates an AUTH0 (imperceptible authentication initiation) command.

As shown in Table 2, in some embodiments, the AUTH0 (imperceptible authentication initiation) command may include a command identifier 1, configuration data 1, and a vehicle random number. The command identifier 1 is used to identify that the AUTH0 command is a command used to initiate imperceptible authentication. The configuration data 1 may include a vehicle ID, a positioning ID, an authentication ID, a vehicle key AID (Application identifier, application identifier), and a key ID. The authentication ID is used to identify current imperceptible authentication, that is, a new authentication ID is generated each time imperceptible authentication is performed. After receiving related information indicating that imperceptible authentication succeeds, the vehicle 20 may perform identification based on the authentication ID, to determine whether the received message indicating that imperceptible authentication succeeds is for previously initiated imperceptible authentication, to improve imperceptible authentication security. The vehicle random number is randomly generated by the vehicle lock command engine 212 of the head unit 210, and is included in the AUTH0 (imperceptible authentication initiation) command. After the vehicle random number is sent to the mobile phone 10, and imperceptible authentication succeeds, the mobile phone 10 may use an imperceptible authentication success ciphertext to include the vehicle random number and send the imperceptible authentication success ciphertext to the vehicle lock command engine 212 of the head unit 210. Then, when verifying the imperceptible authentication success ciphertext in response to a request of the vehicle lock command engine 212, a vehicle lock applet 211 compares the vehicle random number in the imperceptible authentication success ciphertext with a vehicle random number stored in the vehicle lock applet 211. If the two vehicle random numbers are the same, it indicates that the AUTH0 (imperceptible authentication initiation) command received by the mobile phone 10 or the imperceptible authentication success ciphertext sent by the mobile phone 10 is not tampered with. It may be understood that the configuration data 2 may also include other data. This is not limited herein.

TABLE 2

| AUTH0 | Command identifier 1 | Configuration data 1 | Vehicle random number |
|---|---|---|---|

It may be understood that the information included in the imperceptible authentication initiation command shown in Table 2 is merely an example but is not limitative. The imperceptible authentication initiation command may further include other information.

In addition, it may be understood that although a name of the imperceptible authentication initiation command is AUTH0 herein, in another embodiment, the imperceptible authentication initiation command may also be named in another name, and a function is the same as that of AUTH0. This is not limited herein.

602: The vehicle lock command engine 212 sends the AUTH0 (imperceptible authentication initiation) command to a mobile wallet 103 sequentially through a vehicle-mounted BLE module 213 and a vehicle manufacturer app 102.

604: After receiving the AUTH0 (imperceptible authentication initiation) command, the mobile wallet 103 notifies an anti-relay application 104 to start anti-relay determining.

606: After receiving the notification, the anti-relay application 104 invokes an anti-relay TA 107 to start anti-relay determining.

To improve security of an unlock service, an anti-relay rule followed by anti-relay determining is stored in the anti-relay TA 107, and the anti-relay TA 107 can communicate with only the anti-relay application 104 and a wallet TA 106.

608: After receiving the notification, the anti-relay TA 107 performs anti-relay determining according to the anti-relay rule, to determine whether the mobile phone 10 encounters a relay attack. For a specific anti-relay rule, refer to FIG. 7A and FIG. 7B.

Figure 7A:
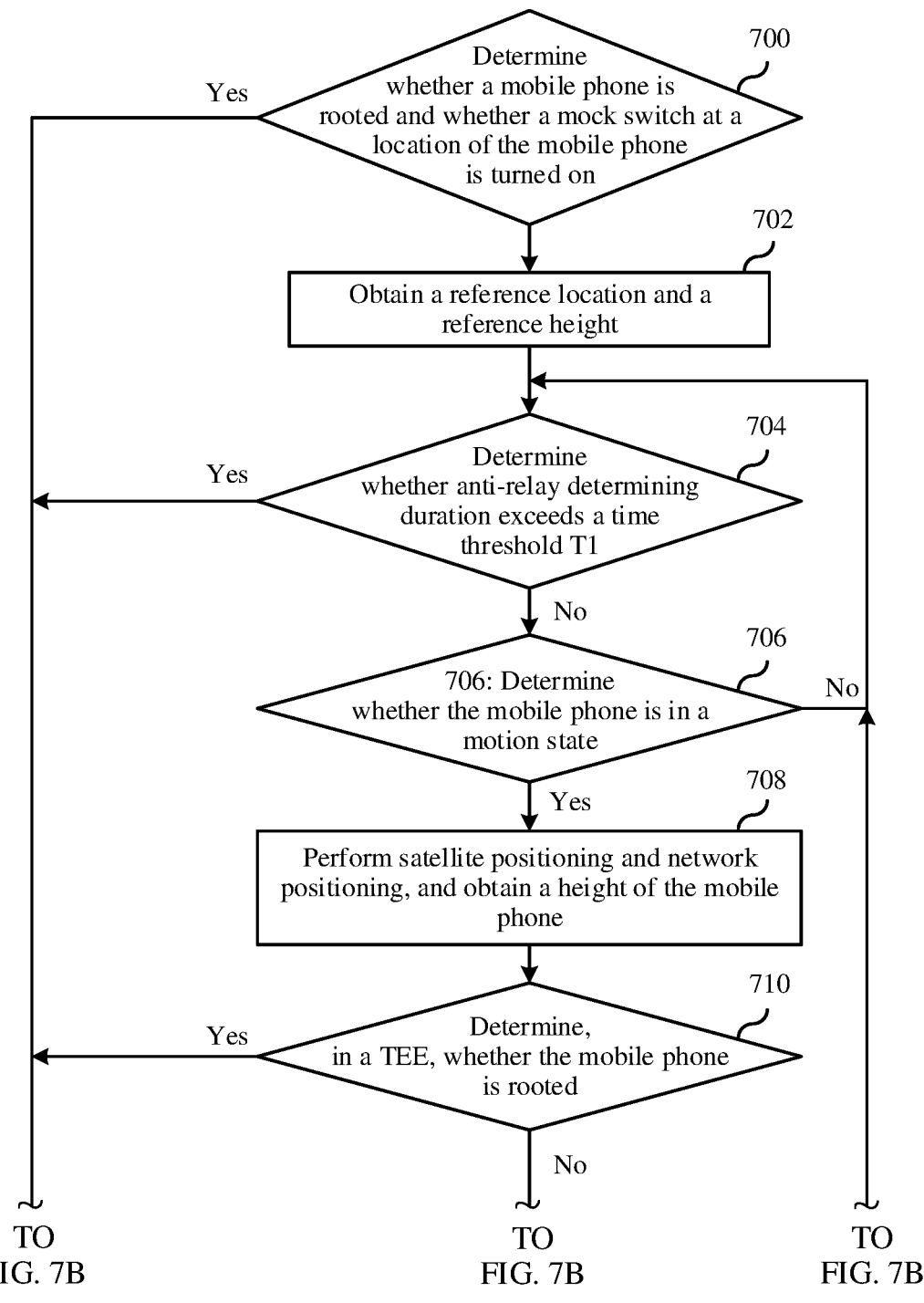
FIG. 7A and FIG. 7B are a schematic flowchart of an anti-relay rule according to some embodiments of this application.
Figure 7B:
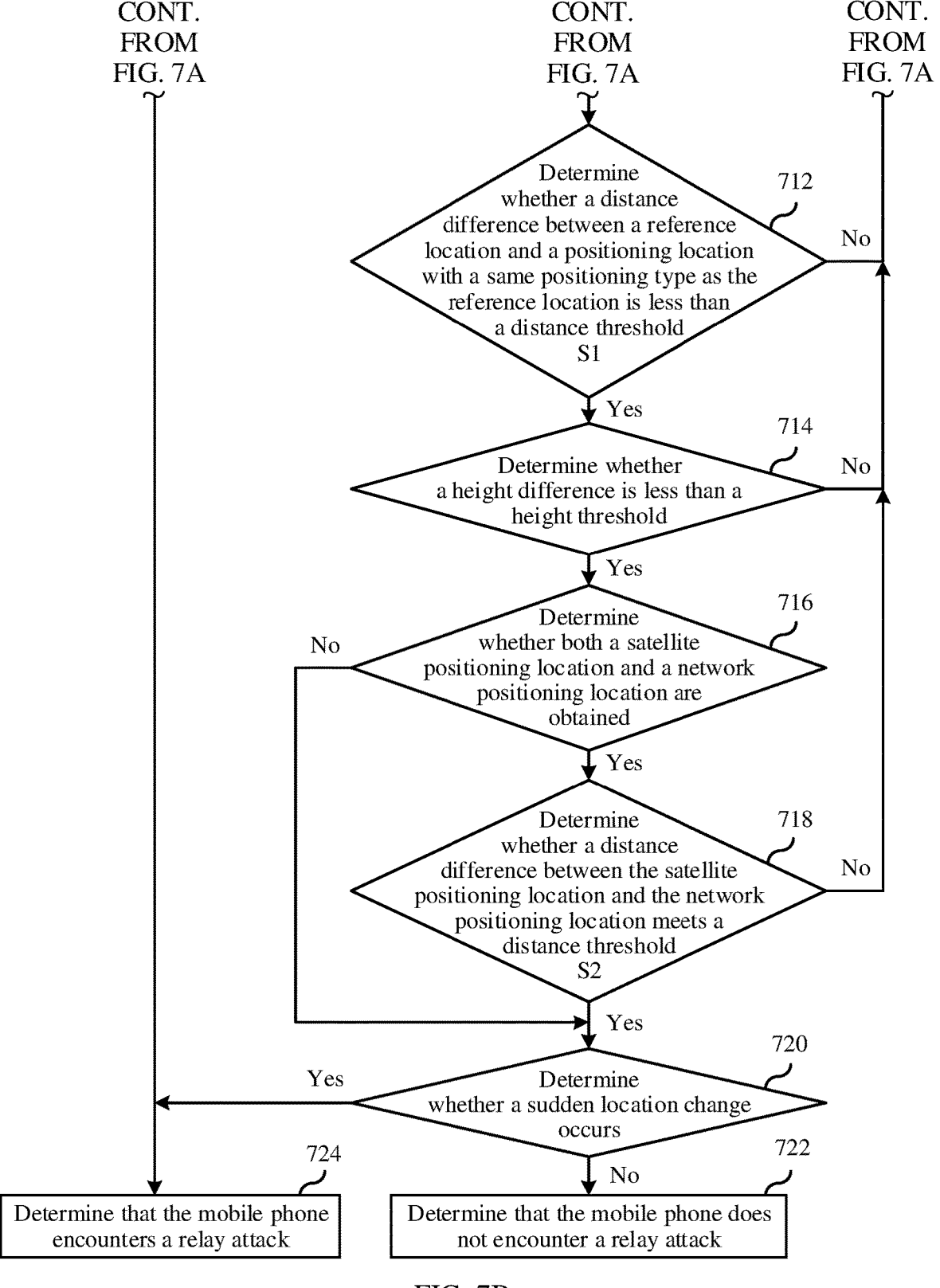

In some embodiments, refer to FIG. 7A and FIG. 7B. It may be understood that when the mobile phone 10 determines that the mobile phone is rooted, a location of the mobile phone is mooked, and duration in which the mobile phone 10 performs anti-relay determining exceeds a time threshold, it indicates that the mobile phone 10 encounters a relay attack. In this case, the mobile phone 10 may determine that the mobile phone encounters the relay attack, and may send, to the vehicle 20, a message indicating that the mobile phone encounters the relay attack.

It may be understood that, that the mobile phone is rooted indicates that the mobile phone may be maliciously controlled, and data on the mobile phone becomes insecure. Therefore, in this case, flameout positioning needs to be canceled. That the location of the mobile phone is mocked means that the location of the mobile phone is simulated. Therefore, a positioning location of the mobile phone is no longer a real location of the mobile phone, and in this case, the mobile phone 10 is likely to encounter a relay attack.

610: After completing anti-relay determining, the anti-relay TA 107 sends an anti-relay determining complete message to the mobile wallet 103 through the anti-relay application 104.

612: After receiving the anti-relay determining complete message, the mobile wallet 103 initiates imperceptible authentication to the wallet TA 106.

614: The wallet TA 106 obtains an anti-relay determining result from the anti-relay TA 107.

In some embodiments, to improve security, after completing anti-relay determining, the anti-relay TA 107 may retain only the anti-relay determining result for a very short time period (for example, 3 seconds). If the retention period expires, the wallet TA 106 cannot obtain the anti-relay determining result.

It may be understood that, as described above, in some embodiments, a distance range for imperceptible authentication may be set. For example, a distance between the mobile phone 10 and the vehicle 20 is set to be less than 35 meters and greater than 3 meters. When the distance between the mobile phone 10 and the vehicle 20 reaches 3 meters, if the vehicle 20 does not receive an imperceptible authentication success ciphertext, or the vehicle 20 receives an imperceptible authentication success ciphertext but verification performed by the vehicle 20 on the imperceptible authentication success ciphertext fails, the vehicle 20 sends a perceptible authentication initiation command to the mobile phone 10. After the mobile phone 10 receives the perceptible authentication initiation command sent by the vehicle 20, the anti-relay TA 107 ends anti-relay determining, and the mobile phone 10 performs perceptible authentication, so that a user opens a vehicle lock through biometric recognition feature authentication.

616: The anti-relay TA 107 returns the anti-relay determining result to the wallet TA 106.

It may be understood that because security of a TEE of the mobile phone 10 is high, obtaining the anti-relay determining result by using the wallet TA 106 can prevent the anti-relay determining result from being forged, and improve anti-relay determining security.

618: After receiving the anti-relay determining result, the wallet TA 106 determines, based on the anti-relay determining result, whether the mobile phone 10 encounters a relay attack. If the wallet TA 106 determines that the mobile phone does not encounter the relay attack, the wallet TA 106 performs 620. If the wallet TA 106 determines that the mobile phone encounters the relay attack, the wallet TA 106 may send, to the vehicle 20 or the user of the mobile phone 10 through the mobile wallet 103, a message indicating that the mobile phone encounters the relay attack. In some embodiments, after receiving the message indicating that the mobile phone 10 encounters the relay attack, the vehicle 20 may send a perceptible authentication initiation request to the mobile phone 10, to request the mobile phone 10 to perform biometric authentication on the user. After the user receives the perceptible authentication initiation request, if the user finds that the user is not beside the vehicle 20, the user determines that wireless communication between the mobile phone 10 and the vehicle 20 encounters a relay attack, and the user may refuse to perform perceptible authentication. In addition, the user may further send an alarm or lock a vehicle lock of the vehicle 20 through the mobile wallet card 103 or the vehicle manufacturer app 102, and the vehicle 20 no longer performs imperceptible authentication before unlocking. Specifically, the mobile phone of the user may display a one-key alarm button or a one-key lock button.

620: When determining that the mobile phone 10 does not encounter the relay attack, the wallet TA 106 requests a vehicle key applet 108 to generate an imperceptible authentication success ciphertext.

It may be understood that because security of a TEE of the mobile phone 10 is high, obtaining the imperceptible authentication success ciphertext by using the wallet TA 106 can prevent an imperceptible authentication result from being forged, and improve imperceptible authentication security.

622: After receiving the request from the wallet TA 106, the vehicle key applet 108 generates the imperceptible authentication success ciphertext.

It may be understood that in some embodiments, the imperceptible authentication success ciphertext may be a ciphertext obtained by encrypting authentication success information by using a key, and the key is a key in agreed data sent by the mobile phone 10 to the vehicle 20 when a BLE connection is established between the vehicle 20 and the mobile phone 10. For example, the imperceptible authentication success ciphertext may include a vehicle ID, an authentication ID, and a positioning ID that are encrypted by using a key. When the vehicle 20 sends a positioning request to the mobile phone 10 before a current unlock service is performed and after a flameout closest to the current unlock service occurs or a vehicle door is closed, the positioning ID is a parameter that is included in the positioning request and that is used to identify current positioning. The mobile phone 10 may store both the positioning ID and a reference location after obtaining the reference location. Each time sending a positioning request, the vehicle lock command engine 212 of the vehicle 20 generates a new positioning ID.

624: After generating the imperceptible authentication success ciphertext, the vehicle key applet 108 forwards the imperceptible authentication success ciphertext to the vehicle lock command engine 212 sequentially through the wallet TA 106, the mobile wallet 103, the vehicle manufacturer app 102, and the vehicle-mounted BLE module 213.

In some embodiments, after receiving the imperceptible authentication success ciphertext, the vehicle lock command engine 212 directly requests the vehicle lock applet 211 to verify the imperceptible authentication success ciphertext, and stores a verification result after receiving the verification result returned by the vehicle lock applet 211. In this way, in a process in which the mobile phone 10 approaches the vehicle 20, if it is measured that a distance between the mobile phone 10 and the vehicle 20 is beyond an imperceptible authentication range (for example, less than 3 meters), the verification result is directly obtained: (1) In a possible implementation, if the verification result of the imperceptible authentication success ciphertext indicates that verification succeeds, the vehicle 20 performs an unlock service. In another possible implementation, when verification on the imperceptible authentication success ciphertext succeeds, the vehicle 20 does not directly perform an unlock service, but when the distance between the mobile phone 10 and the vehicle 20 reaches the unlocking distance mentioned above, re-obtains the verification result of the imperceptible authentication success ciphertext from the vehicle lock command engine 212, and opens a vehicle lock only when the obtained verification result indicates that verification on the imperceptible authentication success ciphertext succeeds. (2) When the verification result is that verification fails, the vehicle 20 sends a perceptible authentication initiation request to the mobile phone 10. In addition, in a possible implementation, if perceptible authentication succeeds, the vehicle 20 performs an unlock service. In another possible implementation, after perceptible authentication succeeds, the vehicle 20 does not directly open a lock but stores the verification result, and when determining that the distance between the mobile phone 10 and the vehicle 20 reaches the unlocking distance mentioned above, re-obtains a verification result of a perceptible authentication success ciphertext from the vehicle lock command engine 212, and opens a vehicle lock only when the obtained verification result indicates that verification on the perceptible authentication success ciphertext succeeds. Verification on the perceptible authentication success ciphertext may be performed immediately when the perceptible authentication success ciphertext is received, or may be performed when the unlocking distance is reached. This is not limited herein.

In addition, in some other embodiments, after receiving the imperceptible authentication success ciphertext, the vehicle lock command engine 212 does not perform verification immediately, but stores the imperceptible authentication success ciphertext. In this way, in a process in which the mobile phone 10 approaches the vehicle 20, if the vehicle lock command engine 212 measures that the distance between the mobile phone 10 and the vehicle 20 is beyond the imperceptible authentication range (for example, less than 3 meters), the vehicle lock command engine 212 requests the vehicle lock applet 211 to verify the imperceptible authentication success ciphertext, and receives the verification result from the vehicle lock applet 211: (1) In a possible implementation, if the received verification result indicates that verification on the imperceptible authentication success ciphertext succeeds, the vehicle lock command engine 212 performs the unlock service. In another possible implementation, when verification on the imperceptible authentication success ciphertext succeeds, the vehicle lock command engine 212 does not directly perform the unlock service but stores the verification result, and when the distance between the mobile phone 10 and the vehicle 20 reaches the unlocking distance (for example, 1 meter) mentioned above, re-obtains the verification result of the imperceptible authentication success ciphertext from the vehicle lock command engine 212, and opens the vehicle lock only when determining that the obtained verification result indicates that verification succeeds. (2) When the verification result is that verification fails, the vehicle 20 sends the perceptible authentication initiation request to the mobile phone 10. In a possible implementation, if perceptible authentication succeeds, the vehicle 20 performs the unlock service. In another possible implementation, after perceptible authentication succeeds, the vehicle 20 does not directly open the lock, but when determining that the distance between the mobile phone 10 and the vehicle 20 reaches the unlocking distance mentioned above, re-obtains the verification result of the perceptible authentication success ciphertext from the vehicle lock command engine 212, and opens the vehicle lock only when the obtained verification result indicates that verification on the perceptible authentication success ciphertext succeeds. Verification on the perceptible authentication success ciphertext may be performed immediately when the perceptible authentication success ciphertext is received, or may be performed when the unlocking distance is reached. This is not limited herein.

A process in which the vehicle lock command engine 212 requests the vehicle lock applet 211 to verify the imperceptible authentication success ciphertext is shown in FIG. 6A, FIG. 6B, and FIG. 6C, and includes the following steps.

626: Request the vehicle lock applet 211 to verify the imperceptible authentication success ciphertext.

628: After receiving the request, the vehicle lock applet 211 verifies the imperceptible authentication success ciphertext.

A process in which the vehicle lock applet 211 verifies the imperceptible authentication success ciphertext may include: The vehicle lock applet 211 decrypts the imperceptible authentication success ciphertext by using a key received when the BLE connection is established between the vehicle lock applet 211 and the mobile phone 10, and matches a vehicle ID, an authentication ID, and a positioning ID that are obtained through decryption with a vehicle ID, an authentication ID, and a positioning ID that are stored in the vehicle lock applet 211. If the matching succeeds, verification succeeds. If the matching fails, verification fails. In this case, the vehicle 20 may consider that a result that imperceptible authentication succeeds is untrue, and therefore does not open a vehicle lock.

630: After completing verification, the vehicle lock applet 211 returns a verification result to the vehicle lock command engine 212.

632: The vehicle lock command engine 212 receives the verification result from the vehicle lock applet 211.

As described above, in a possible implementation, after receiving the verification result, if the verification result indicates that verification on the imperceptible authentication success ciphertext succeeds, the vehicle lock command engine 212 directly opens the vehicle lock. In another possible implementation, if the verification result indicates that verification on the imperceptible authentication success ciphertext succeeds, the vehicle lock command engine 212 does not open the vehicle lock immediately but stores the verification result, and when the unlocking distance (for example, less than 1 meter) between the vehicle 20 and the mobile phone 10 is reached, re-obtains the verification result, and opens the vehicle lock only when determining that the obtained verification result is that verification on the imperceptible authentication ciphertext succeeds. When the verification result indicates that verification on the imperceptible authentication success ciphertext fails, the vehicle lock command engine 212 sends the perceptible authentication initiation to the mobile phone 10, and determines, based on a perceptible authentication result, whether to open the vehicle lock.

Phase of Measuring a Distance for Unlocking

Still refer to FIG. 4. After completing imperceptible authentication, to further improve security of the imperceptible unlock service, during unlocking, the vehicle 20 opens a vehicle lock of a vehicle door only when the distance between the mobile phone 10 and the vehicle 20 is less than the unlocking distance. Specifically, whether to open the vehicle lock may be determined in two manners. One manner is as follows:

A sensing switch is disposed on a handle of the vehicle door. When a user touches the door handle, the vehicle 20 receives trigger information. The vehicle 20 measures, through BLE, whether the distance between the vehicle 20 and the mobile phone 10 is less than the unlocking distance (for example, less than 1 meter). If the distance is less than the unlocking distance, and a verification result that is of an imperceptible unlocking ciphertext and that is received by the vehicle lock command engine 212 is that verification succeeds, the vehicle 20 opens the vehicle lock of the vehicle door.

The other manner is as follows:

Without triggering a signal, after establishing a BLE connection to the mobile phone 10, the vehicle 20 always measures the distance between the vehicle 20 and the mobile phone 10. If the vehicle 20 measures that the distance between the vehicle 20 and the mobile phone 10 is less than the unlocking distance (less than 1 meter) and a verification result that is of an imperceptible unlocking ciphertext and that is received by the vehicle lock command engine 212 is that verification succeeds, the vehicle 20 directly opens the vehicle lock of the vehicle door.

It may be understood that the vehicle lock is opened only when the distance between the mobile phone 10 and the vehicle 20 reaches the unlocking distance. This can ensure that after imperceptible authentication succeeds, if the distance between the mobile phone 10 and the vehicle 20 is greater than the unlocking distance, another person cannot open the vehicle door; and if the distance is less than or equal to the unlocking distance, even if someone can open the vehicle door, a vehicle owner can also discover this case in real time.

Phase of Notifying that Unlocking Succeeds

After opening the vehicle lock of the vehicle door, the vehicle 20 may send an unlocking success notification to the mobile phone.

For example, when unlocking succeeds, the head unit 210 notifies the mobile phone 10 by using an AUTH4 (unlocking success notification) command, and the mobile phone 10 notifies the user of unlocking success in a form of sound, vibration, a picture, or the like. If the unlocking action is not performed by the user, the user can take corresponding measures after receiving the message. The AUTH4 (unlocking success notification) command may include a command identifier 2, and the command identifier 2 is used to identify that the AUTH4 command is the unlocking success notification command.

Anti-Relay Rule

As described above, the anti-relay TA 107 may perform anti-relay determining according to an anti-relay rule. FIG. 7A and FIG. 7B are a schematic flowchart of an anti-relay rule according to some embodiments. Specifically, as shown in FIG. 7A and FIG. 7B, the anti-relay rule includes the following steps.

700: Determine whether a mobile phone is rooted and whether a mock switch at a location of the mobile phone is turned on. If the determining result is that the mobile phone is rooted and the mock switch at the location of the mobile phone is turned on, it indicates that there is a risk that the mobile phone encounters a relay attack, anti-relay determining may be ended, and step 724 is performed.

It may be understood that, that the mobile phone is rooted indicates that the mobile phone may be maliciously controlled, and data on the mobile phone becomes insecure. Therefore, in this case, flameout positioning needs to be canceled. That the location of the mobile phone is mocked means that the location of the mobile phone is simulated. Therefore, a positioning location of the mobile phone is no longer a real location of the mobile phone, and in this case, the mobile phone 10 is likely to encounter a relay attack.

702: If the mobile phone is not rooted and the mock switch at the location of the mobile phone is not turned on, obtain a reference location and a reference height that is of the mobile phone 10 and at which the mobile phone 10 obtains the reference location. As described above, when the vehicle 20 sends a positioning request to the mobile phone 10 before a current unlock service is performed and after a flameout closest to the current unlock service occurs, the reference location and the reference height may be respectively a location and a height that are of the mobile phone 10 and that are determined by the mobile phone 10 near the vehicle 20 according to a flameout positioning policy in response to the positioning request.

704: Determine whether anti-relay determining duration exceeds a time threshold T1. When the anti-relay determining duration does not exceed T1, anti-relay determining continues to be performed, and step 706 is performed. When the anti-relay determining duration exceeds T1, it indicates that the mobile phone 10 may not be near the vehicle 20, and the mobile phone 10 encounters a relay attack and perform step 724.

In some embodiments, before a perceptible authentication initiation request is received, anti-relay determining is not always performed, but timing is performed on anti-relay determining. When the anti-relay determining duration exceeds the time threshold T1 (for example, 10 minutes), it indicates that the mobile phone may encounter a relay attack, stop anti-relay determining, perform step 724, and send, to the vehicle 20, a message indicating that the mobile phone encounters the relay attack. In addition, in some embodiments, when the anti-relay determining duration exceeds the time threshold T1 (for example, 10 minutes), reminder information indicating that the mobile phone may encounter a relay attack may be further sent to a user of the mobile phone 10. It may be understood that when detecting that the distance between the vehicle 20 and the mobile phone 10 has entered a perceptible authentication range (for example, less than 3 meters), the vehicle 20 sends a perceptible authentication initiation command to the mobile phone 10.

In addition, that the anti-relay determining duration exceeds the time threshold T1 herein may include that satellite positioning duration exceeds a time threshold T or network positioning duration exceeds a time threshold T. Because satellite positioning and network positioning are simultaneously performed herein, positioning time points of satellite positioning and network positioning are the same.

In addition, it may be understood that after receiving the message indicating that the mobile phone 10 encounters the relay attack, the vehicle 20 may send the perceptible authentication initiation request to the mobile phone 10, to verify validity of the user of the mobile phone 10 through biometric recognition, or may take other measures to ensure that the vehicle lock is opened by mistake.

706: Determine whether the mobile phone is in a motion state; and return to 704 if it is determined that the mobile phone 10 is in a static state, or perform 708 if it is determined that the mobile phone 10 is in the motion state. For example, in a process in which the user walks toward the vehicle 20, there may be a pause. In this case, the mobile phone 10 is determined to be in a static state. Therefore, it is set to return to 704 to restart determining. If the user is always in a static state, it indicates that the user may not be near the vehicle 20, and wireless communication between the mobile phone 10 and the vehicle 20 is likely to encounter a relay attack. In 704, when it is determined that the positioning duration exceeds the time threshold T1, it is determined that the mobile phone 10 encounters a relay attack.

708: Simultaneously perform satellite positioning and network positioning on the mobile phone, to obtain a satellite positioning location and a network positioning location, and obtain a current height of the mobile phone 10.

It may be understood that, in another embodiment, another positioning service may also be used to position the mobile phone. This is not limited herein.

710: After obtaining the satellite positioning location, the network positioning location, and the current height of the mobile phone 10, to further improve security, determine, in a TEE, whether the mobile phone 10 is rooted; and if the mobile phone 10 is not rooted, perform 712, or if the mobile phone 10 is rooted, it indicates that the mobile phone may encounter a relay attack, and perform 724.

It may be understood that, in some embodiments, whether the mobile phone 10 is rooted and whether the location of the mobile phone 10 is mocked may alternatively be simultaneously determined in the TEE.

712: Based on information about the obtained reference location, determine a positioning type used when the mobile phone 10 obtains the reference location, and compare the reference location with a positioning location with a same positioning type as the reference location, to determine whether a distance difference between the positioning location and the reference location is less than a distance threshold S1 (for example, 0.5 meters).

For example, in some embodiments, information about the stored reference location includes a parameter identifying a positioning service. If the parameter identifies satellite positioning, it indicates that the mobile phone 10 uses satellite positioning when obtaining the reference location, and the satellite positioning location obtained each time in 708 is compared with the reference location, to determine whether a distance difference between the satellite positioning location and the reference location is less than the distance threshold S1. If the parameter identifies network positioning, it indicates that the mobile phone 10 uses network positioning when obtaining the reference location, and the network positioning location obtained each time in

708 is compared with the reference location, to determine whether a distance difference between the network positioning location and the reference location is less than the distance threshold S1.

If it is determined that a distance difference between a satellite positioning location or a network positioning location determined in 708 and the reference location is less than S1, it indicates that the mobile phone 10 is near the vehicle 20, a height of the mobile phone 10 is measured, and 714 is performed. If is determined that a distance difference between a satellite positioning location or a network positioning location determined in 708 and the reference location is not less than S1, and a positioning stop command is not received, 704 is returned, and satellite positioning and network positioning continue to be performed, to compare a newly obtained satellite positioning location and network positioning location with the reference location again.

In addition, in 708, when a positioning location with a same positioning service type as that used for obtaining the reference location is not obtained due to a poor positioning signal during positioning or another reason, 704 is still performed to continue to perform anti-relay determining.

714: Determine whether a height difference between a reference height and the current height that is of the mobile phone and that is obtained in 708 is less than a height threshold; and perform 716 if the height difference is less than the height threshold, or return to 704 if the height difference is not less than the height threshold.

It may be understood that, in some embodiments, 714 and 716 are not sequential, or 714 and 716 are performed simultaneously.

716: Determine whether both the satellite positioning location and the network positioning location are obtained within the time threshold T1; and perform 718 if both the satellite positioning location and the network positioning location are obtained, or perform 720 if the satellite positioning location and the network positioning location are not both obtained.

718: Determine whether a distance difference between the satellite positioning location and the network positioning location is less than a distance threshold S2; and perform 720 if the distance difference between the satellite positioning location and the network positioning location is less than the distance threshold S2, or return to 704 if the distance difference between the satellite positioning location and the network positioning location is not less than the distance threshold S2.

Specifically, if a large quantity of satellite positioning locations and network positioning locations are obtained during anti-relay positioning, a satellite positioning location and a network positioning location whose positioning time points are close may be compared, to determine whether a distance difference between the satellite positioning location and the network positioning location is less than S2 (for example, 100 meters). When the distance difference between the satellite positioning location and the network positioning location is greater than S2, it indicates that one of the positioning services has a problem of inaccurate positioning, and whether the mobile phone 10 is near the vehicle 20 needs to be re-determined.

720: If the distance difference between the satellite positioning location and the network positioning location is less than the distance threshold S2, determine whether a sudden location change occurs in a positioning location determined through a satellite positioning service and a network positioning service; and if the sudden location change does not occur, perform 722, or if the sudden location change occurs, it indicates that there is a risk that the mobile phone 10 encounters a relay attack, and perform 724.

For example, 100 positioning locations are determined through a positioning service. If several positioning locations in the 100 positioning locations differ greatly from other locations, for example, a difference of 10 kilometers, it indicates that a location of the mobile phone 10 suddenly changes, and there is a risk that the mobile phone 10 encounters a relay attack.

> 722: Determine that an anti-relay determining result is that the mobile phone 10 does not encounter the relay attack.

> 724: Determine that an anti-relay determining result is that the mobile phone 10 encounters the relay attack.

It may be understood that, in another embodiment, another anti-relay rule may also be used to perform anti-relay determining, to determine whether the current location of the mobile phone 10 matches the reference location or is near the reference location, so as to determine whether the mobile phone 10 encounters a relay attack.

In addition, it may be understood that, in another embodiment of the present invention, another anti-relay determining rule may also be used. For example, a relationship between the current location and the reference location of the mobile phone 10 is determined through only one positioning service.

Obtaining a Reference Location

Figure 8:
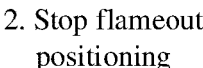
FIG. 8 is a diagram of a scenario in which a mobile phone 10 obtains a reference location by using a vehicle flameout as a trigger point according to some embodiments of this application.
Figure 8:
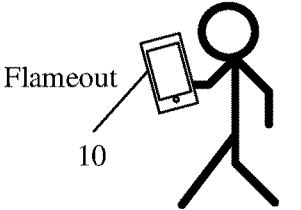
Figure 8:
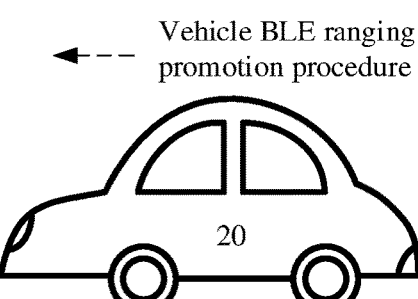
Figures 2, 9A:
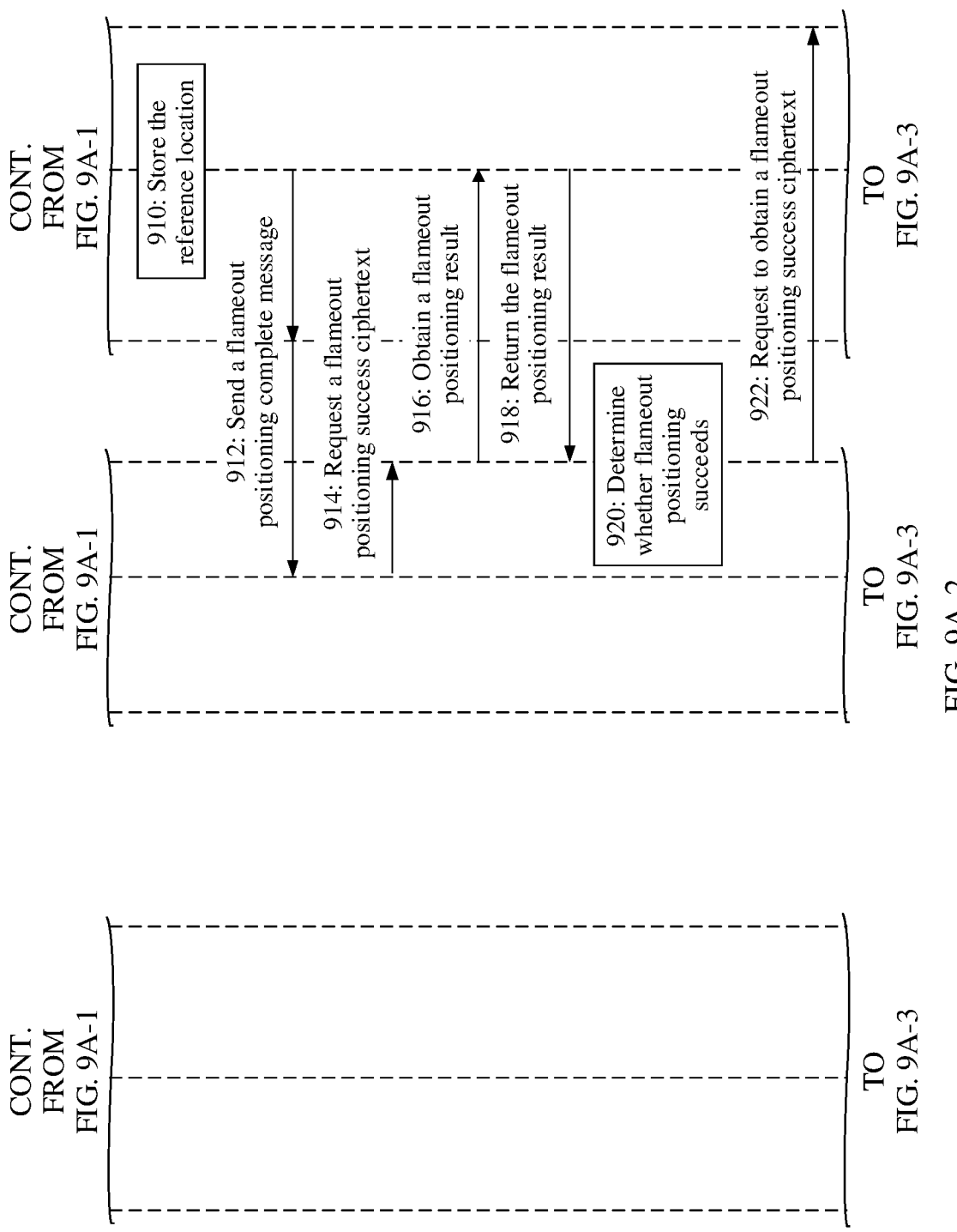
Figures 3, 9A:
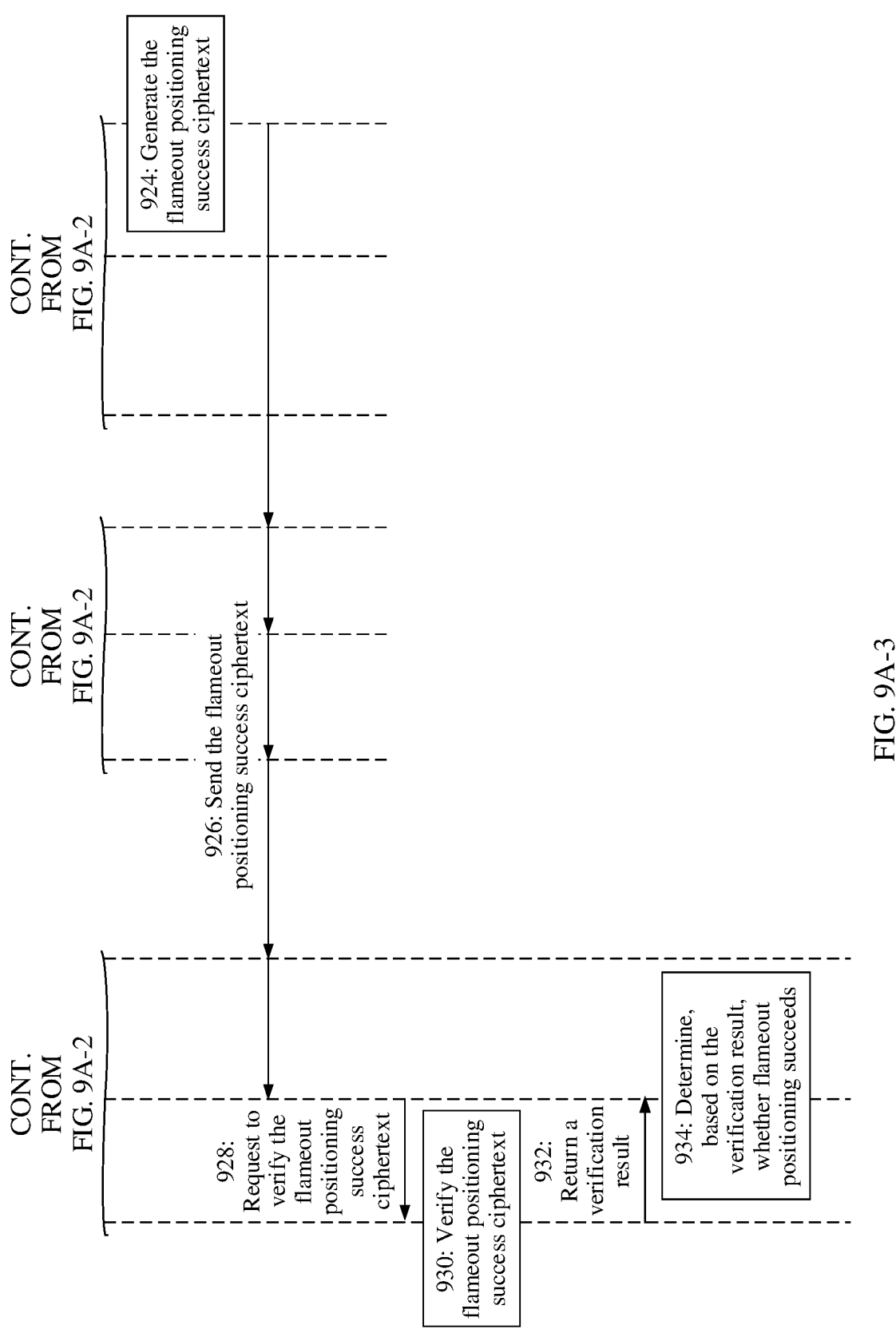
Figures 2, 9B:
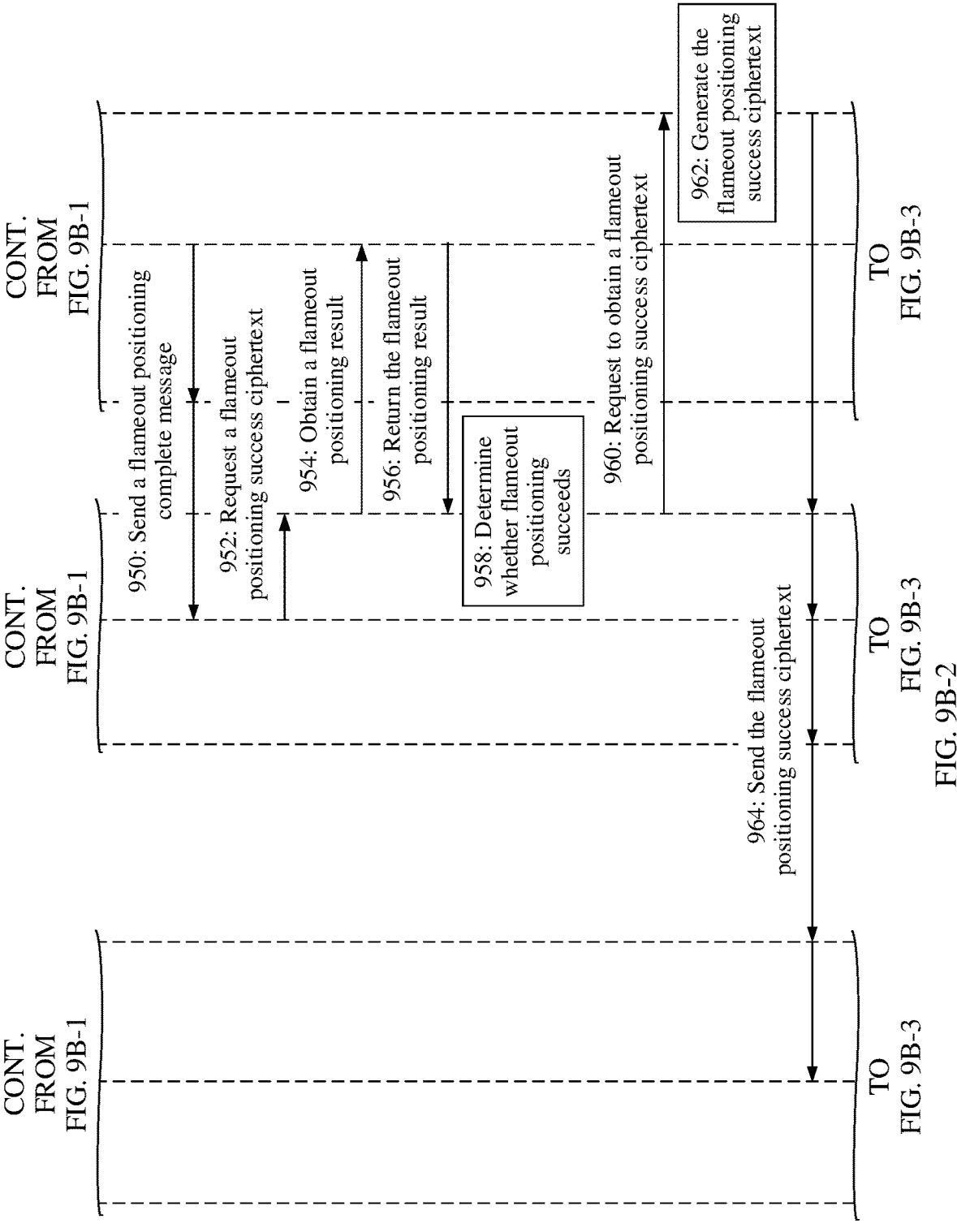
Figure 9B:
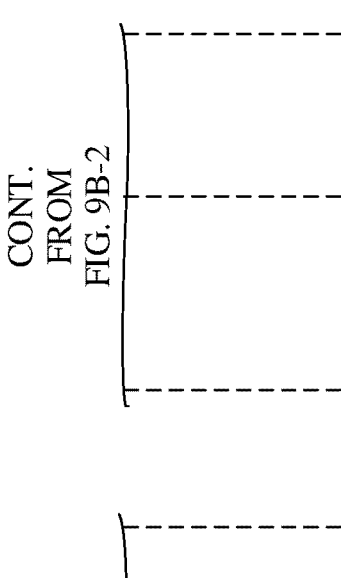
Figure 3:
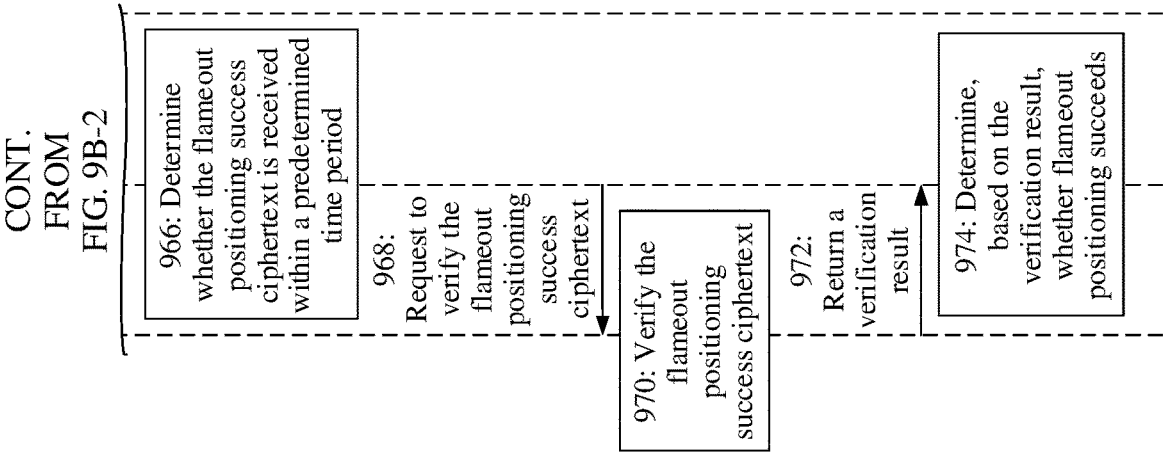

As described above, when performing anti-relay determining in the imperceptible authentication phase, the mobile phone 10 needs to compare the current positioning location with the reference location. When the vehicle 20 sends a positioning request to the mobile phone 10 before a current unlock service is performed and after a flameout closest to the current unlock service occurs or a vehicle door is closed, a location that is of the mobile phone 10 and that is determined by the mobile phone 10 near the vehicle 20 in response to the positioning request is the reference location. FIG. 8 is a diagram of a scenario in which a mobile phone 10 obtains a reference location by using a vehicle flameout as a trigger point according to some embodiments. FIG. 9A-1, FIG. 9A-2, and FIG. 9A-3 and FIG. 9B-1, FIG. 9B-2, and FIG. 9B-3 are respectively schematic flowcharts of performing flameout positioning by a mobile phone 10 before and after receiving an AUTH2 (flameout positioning stop) command according to some embodiments.

Specifically, as shown in FIG. 8, during a flameout, the vehicle 20 sends an AUTH1 (flameout positioning start) command to the mobile phone 10, and detects whether a flameout positioning success ciphertext is received within a flameout positioning distance (20 meters shown in FIG. 8). If the flameout positioning success ciphertext is received before a flameout positioning stop distance is reached, and the flameout positioning success ciphertext is verified, it is determined that flameout positioning succeeds, and a positioning ID in the AUTH1 (flameout positioning start) command is retained. In this way, only a reference location obtained by the mobile phone 10 can be used for next anti-relay determining. If the flameout positioning success ciphertext is not received when a flameout positioning stop distance is reached, the vehicle 20 sends a flameout positioning stop command to the mobile phone 10, and the mobile phone 10 determines a reference location according to a flameout positioning policy in the entire process. A specific process of flameout positioning is shown in FIG. 9A-1, FIG. 9A-2, and FIG. 9A-3 and FIG. 9B-1, FIG. 9B-2, and FIG. 9B-3.

> 900: A vehicle lock command engine 212 generates an AUTH1 (flameout positioning start) command.

For example, in some embodiments, the AUTH1 (flameout positioning start) command may include information shown in Table 3:

TABLE 3

| AUTH1 | Command identifier 2 | Configuration data 2 | Vehicle random number |
|---|---|---|---|

The command identifier 2 is used to identify that the AUTH0 command is a command used to start flameout positioning. The configuration data 2 includes a vehicle ID, a positioning ID, a vehicle key AID (Application identifier, application identifier), and a key ID. The positioning ID is used to identify current flameout positioning, that is, the vehicle lock command engine 212 updates the positioning ID each time generating the AUTH1 (flameout positioning start) command. The vehicle random number is randomly generated by the vehicle lock command engine 212 of the head unit 210, and is included in the AUTH1 (flameout positioning start) command. After the vehicle random number is sent to the mobile phone 10, and flameout positioning succeeds, the mobile phone 10 may use a flameout positioning success ciphertext to include the vehicle random number and send the flameout positioning success ciphertext to the vehicle lock command engine 212 of the head unit 210. Then, when verifying the flameout positioning success ciphertext in response to a request of the vehicle lock command engine 212, a vehicle lock applet 211 compares the vehicle random number in the flameout positioning success ciphertext with a vehicle random number stored in the vehicle lock applet 211. If the two vehicle random numbers are the same, it indicates that the AUTH1 (flameout positioning start) command received by the mobile phone 10 or the flameout positioning success ciphertext sent by the mobile phone 10 is not tampered with.

It may be understood that the information included in the flameout positioning start command shown in Table 3 is merely an example but is not limitative. The flameout positioning start command may further include other information.

In addition, it may be understood that although a name of the flameout positioning start command is AUTH2 herein, in another embodiment, the flameout positioning start command may also be named in another name, and a function is the same as that of AUTH2. This is not limited herein.

> 902: Send the generated AUTH1 (flameout positioning start) command to a mobile wallet 103 sequentially through a vehicle-mounted BLE module 213 and a vehicle manufacturer app 102.

> 904: After receiving the AUTH1 (flameout positioning start) command, the mobile wallet 103 requests an anti-relay application 104 to obtain a reference location.

> 906: After receiving the request from the anti-relay application 104, the anti-relay application 104 may start flameout positioning according to a flameout positioning policy, to obtain the reference location.

It may be understood that, as described above, if the vehicle 20 does not receive the flameout positioning success ciphertext when the flameout positioning stop distance is reached, the vehicle 20 sends the flameout positioning stop command to the mobile phone 10. Therefore, before and after receiving the AUTH2 (flameout positioning stop) command, the anti-relay application 104 may obtain the reference location according to different flameout positioning policies. For example, before the AUTH2 (flameout positioning stop) command is received, the reference location may be obtained according to a flameout positioning policy shown in FIG. 10A-1 and FIG. 10A-2.

908: If flameout positioning succeeds before the anti-relay application 104 receives the AUTH2 (flameout positioning stop) command, send the determined reference location to an anti-relay TA 107, or if flameout positioning fails when the anti-relay application 104 receives the AUTH2 (flameout positioning stop) command, end flameout positioning. For obtaining of the reference location, refer to FIG. 10B.

910: After receiving the reference location, the anti-relay TA 107 stores the received reference location.

It may be understood that the reference location is stored only in the anti-relay TA 107 until a new reference location is generated during next flameout positioning. In addition, in another embodiment, to ensure that the reference location is stolen, the reference location may also be stored in a vehicle key applet 108.

912: The anti-relay TA 107 sends a flameout positioning complete message to the mobile wallet 103 through the anti-relay application 104.

914: After receiving a flameout positioning success message, the mobile wallet 103 requests a flameout positioning success ciphertext from a wallet TA 106.

916: After receiving the request from the mobile wallet 103, the wallet TA 106 obtains a flameout positioning result from the anti-relay TA 107.

In some embodiments, to ensure security of the flameout positioning result, after sending the flameout positioning complete message, the anti-relay TA 106 retains the flameout positioning result only within a short time period (for example, three seconds). The result is deleted if the wallet TA 106 does not obtain the flameout positioning result within the time period.

In addition, it may be understood that because security of a TEE of the mobile phone 10 is high, obtaining the flameout positioning success ciphertext by using the wallet TA 106 can prevent the flameout positioning result from being forged, and improve flameout positioning security.

918: The anti-relay TA 107 returns the flameout positioning result to the wallet TA 106.

920: After receiving the flameout positioning result, the wallet TA 106 determines, based on the flameout positioning result, whether flameout positioning succeeds. For example, the flameout positioning result includes a character indicating whether flameout positioning succeeds. For example, 0 indicates that flameout positioning succeeds, and 1 indicates that flameout positioning fails. The wallet TA 106 may determine, based on the character, whether flameout positioning succeeds.

922: If the wallet TA 106 determines that flameout positioning succeeds, the wallet TA 106 requests a flameout positioning success ciphertext from the vehicle key applet 108.

924: After receiving the request, the vehicle key applet 108 generates the flameout positioning success ciphertext.

In some embodiments, the flameout positioning success ciphertext may include a vehicle ID and a positioning ID in an AUTH1 (flameout positioning start) command received from the vehicle 20, and the vehicle ID and the positioning ID are encrypted by using a key.

926: After generating the flameout positioning success ciphertext, the vehicle key applet 108 sends the flameout positioning success ciphertext to the vehicle lock command engine 212 sequentially through the wallet TA 106, the mobile wallet 103, the vehicle manufacturer app 102, and the vehicle-mounted BLE module 213.

928: After receiving the flameout positioning success ciphertext, the vehicle lock command engine 212 requests the vehicle lock applet 211 to verify the flameout positioning success ciphertext.

930: After receiving the request, the vehicle lock applet 211 verifies the flameout positioning success ciphertext.

It may be understood that in some embodiments, a process in which the vehicle lock applet 211 verifies the flameout positioning success ciphertext may include: The vehicle lock applet 211 decrypts the flameout positioning success ciphertext by using a key received when a BLE connection is established between the vehicle lock applet 211 and the mobile phone 10, and matches a vehicle ID and a positioning ID that are obtained through decryption with a vehicle ID and a latest positioning ID that are stored in the vehicle lock applet 211. If the matching succeeds, verification succeeds. If the matching fails, verification fails.

932: After completing verification, the vehicle lock applet 211 returns a verification result to the vehicle lock command engine 212.

934: The vehicle lock command engine 212 determines, based on the received verification result, whether flameout positioning succeeds.

For example, if the verification result is that verification succeeds, the vehicle lock command engine 212 may consider that the flameout positioning success ciphertext is trusted, and a location at which current flameout positioning succeeds may be used as a reference location for anti-relay determining. Therefore, a current positioning ID is retained. If the verification result is that verification fails, the vehicle lock command engine 212 may consider that the flameout positioning success ciphertext is unauthentic, and clear a current positioning ID. In this way, regardless of whether a relay attack occurs when imperceptible authentication is performed next time, because the vehicle lock applet 108 needs to match a flameout ID when verifying the imperceptible authentication success ciphertext, verification cannot succeed because the current positioning ID is cleared. Consequently, no electronic device can perform imperceptible authentication or imperceptible authentication cannot succeed.

As described above, if the vehicle 20 does not receive the flameout positioning success ciphertext when a flameout positioning stop distance is reached, the vehicle 20 sends a flameout positioning stop command to the mobile phone 10. A specific process is shown in FIG. 9B-1, FIG. 9B-2, and FIG. 9B-3.

940: When the vehicle 20 detects that a distance between the vehicle 20 and the mobile phone 10 exceeds a flameout positioning distance, if the vehicle 20 does not receive the flameout positioning success ciphertext, the vehicle lock command engine 212 of the head unit 210 generates an AUTH2 (flameout positioning stop) command.

For example, in some embodiments, the AUTH2 (flameout positioning stop) command may include information shown in Table 4:

33

TABLE 4

| AUTH2 | Command identifier 3 | Configuration data 3 | Vehicle random number |
|---|---|---|---|

The command identifier 3 is used to identify that the AUTH2 command is a command used to stop flameout positioning. The configuration data 3 includes a vehicle ID, a positioning ID, a vehicle key AID (Application identifier, application identifier), and a key ID. The positioning ID is used to identify current flameout positioning. The vehicle random number is randomly generated by the vehicle lock command engine 212 of the head unit 210, and is included in the AUTH2 (flameout positioning stop) command. After the vehicle random number is sent to the mobile phone 10, and flameout positioning succeeds, the mobile phone 10 may use a flameout positioning success ciphertext to include the vehicle random number and send the flameout positioning success ciphertext to the vehicle lock command engine 212 of the head unit 210. Then, when verifying the flameout positioning success ciphertext in response to a request of the vehicle lock command engine 212, a vehicle lock applet 211 compares the vehicle random number in the flameout positioning success ciphertext with a vehicle random number stored in the vehicle lock applet 211. If the two vehicle random numbers are the same, it indicates that the AUTH2 (flameout positioning stop) command received by the mobile phone 10 or the flameout positioning success ciphertext sent by the mobile phone 10 is not tampered with.

In addition, it may be understood that although a name of the flameout positioning stop command is AUTH2 herein, in another embodiment, the flameout positioning stop command may also be named in another name, and a function is the same as that of AUTH2. This is not limited herein.

942: The vehicle lock command engine 212 sends the generated AUTH2 (flameout positioning stop) command to the anti-relay application 104 through the vehicle-mounted BLE module 213, the vehicle manufacturer app 102, and the mobile wallet 103.

944: After receiving the command, the anti-relay application 104 stops flameout positioning, and determines a reference location according to a flameout positioning policy, for example, determines the reference location according to a flameout positioning policy shown in FIG. 10B.

946: After determining the reference location, the anti-relay application 104 sends the determined reference location to the anti-relay TA 107.

Steps 948 to 964 are correspondingly the same as steps 910 to 926. Details are not described again.

966: After sending the AUTH2 (flameout positioning stop) command, the vehicle lock command engine 212 determines whether the flameout positioning success ciphertext is received within a predetermined time period (for example, one minute); and if the flameout positioning success ciphertext is received within the predetermined time period, determines that the reference location is successfully obtained, and performs step 968 to request to verify the flameout location success ciphertext, or if the flameout positioning success ciphertext is not received within the predetermined time period, determines that the reference location fails to be obtained, and clears a positioning ID.

968: If the vehicle lock command engine 212 receives the flameout positioning success ciphertext within the predetermined time period, the vehicle lock command engine 212 requests the vehicle lock applet 211 to verify the flameout positioning success ciphertext.

970: After receiving the request, the vehicle lock applet 211 verifies the flameout positioning success ciphertext.

It may be understood that in some embodiments, a process in which the vehicle lock applet 211 verifies the flameout positioning success ciphertext may include: The vehicle lock applet 211 decrypts the flameout positioning success ciphertext by using a key received when a BLE connection is established between the vehicle lock applet 211 and the mobile phone 10, and matches a vehicle ID and a positioning ID that are obtained through decryption with a vehicle ID and a latest positioning ID that are stored in the vehicle lock applet 211. If the matching succeeds, verification succeeds. If the matching fails, verification fails.

972: After completing verification, the vehicle lock applet 211 returns a verification result to the vehicle lock command engine 212.

974: The vehicle lock command engine 212 determines, based on the received verification result, whether flameout positioning succeeds.

For example, if the verification result is that verification succeeds, the vehicle lock command engine 212 may consider that the flameout positioning success ciphertext is trusted, and a reference location at which current flameout positioning succeeds may be used for anti-relay determining. Therefore, a current positioning ID is retained. If the verification result is that verification fails, the vehicle lock command engine 212 may consider that the flameout positioning success ciphertext is unauthentic, and clear a current positioning ID. In this way, regardless of whether a relay attack occurs when imperceptible authentication is performed next time, because the vehicle lock applet 108 needs to match a flameout ID when verifying the imperceptible authentication success ciphertext, verification cannot succeed because the current positioning ID is cleared. Consequently, no electronic device can perform imperceptible authentication or imperceptible authentication cannot succeed.

FIG. 10A-1 and FIG. 10A-2 and FIG. 10B respectively show flameout positioning policies that may be used by an anti-relay application 104 before and after the anti-relay application 104 receives an AUTH2 (flameout positioning stop) command.

Figures 1, 10A:
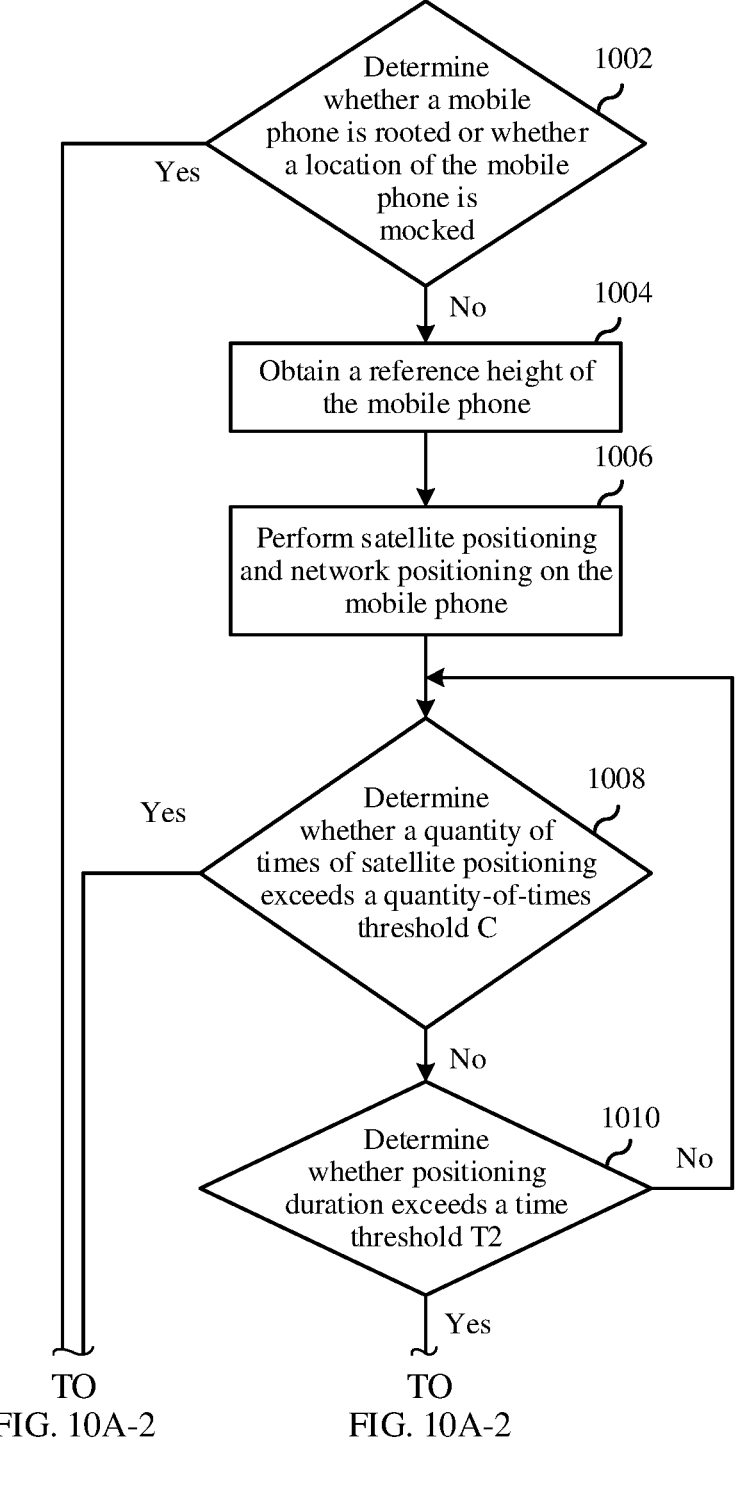
Figures 2, 10A:
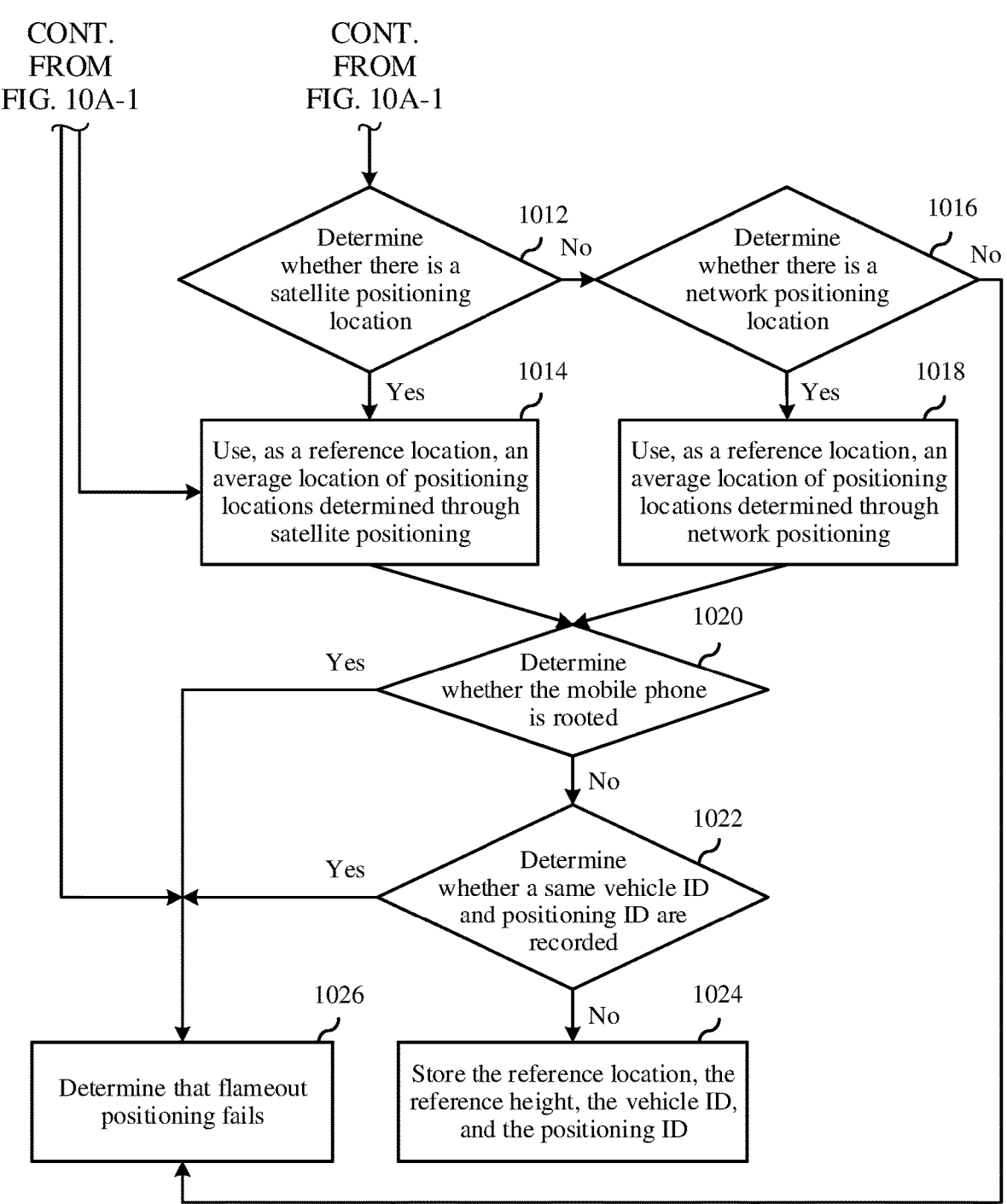

Specifically, as shown in FIG. 10A-1 and FIG. 10A-2, before the AUTH2 (flameout positioning stop) command is received, the flameout positioning policy may include the following steps.

1002: Determine whether a mobile phone 10 is rooted and whether a location of the mobile phone is mocked.

If the mobile phone 10 is rooted or the location of the mobile phone is not mocked, it indicates that the mobile phone 10 has a security risk, and 1032 is performed. If the mobile phone 10 is not rooted and the location of the mobile phone is not mocked, 1004 is performed.

1004: Obtain a reference height of the mobile phone 10, for example, measure a height of the mobile phone 10 through a positioning service or a barometric pressure sensor in the mobile phone 10, where the reference height may be an average value of a plurality of measured height values, for example, an average value of five measured height values.

1006: Simultaneously perform satellite positioning and network positioning on the mobile phone, to obtain a satellite positioning location and a network positioning location.

1008: Each time positioning is completed, determine whether a quantity of times of satellite positioning exceeds a quantity-of-times threshold C (for example, 50 times); and if it is determined that the quantity of times of satellite positioning exceeds the quantity-of-times threshold C, stop satellite positioning and network positioning, and perform 1014, or if it is determined that the quantity of times of satellite positioning does not exceed the quantity-of-times threshold C, perform 1010.

1010: Determine whether satellite positioning duration exceeds a time threshold T2 (for example, 5 minutes); and perform 1014 if it is determined that the satellite positioning duration exceeds the time threshold T2, or return to 1008 if it is determined that the satellite positioning duration does not exceed the time threshold T2.

1012: Determine whether there is a satellite positioning location determined through satellite positioning; and perform 1014 if there is the satellite positioning location determined through satellite positioning, or perform 1016 if there is no satellite positioning location determined through satellite positioning.

1014: Use, as a reference location, an average location of positioning locations determined through satellite positioning, and then perform 1020.

1016: Determine whether there is a network positioning location determined through network positioning; and if there is the network positioning location determined through network positioning, perform 1018, or if there is no network positioning location determined through network positioning, end flameout positioning, and perform 1026.

1018: Use, as a reference location, an average location of positioning locations determined through network positioning, and then perform 1020.

1020: To improve security, before storing the reference location, re-determine whether the mobile phone 10 is rooted; and perform 1026 if it is determined that the mobile phone is rooted, or perform 1022 if it is determined that the mobile phone is not rooted.

1022: Determine whether a vehicle ID and a positioning ID that are included in an AUTH1 (flameout positioning start) command are recorded in the mobile phone 10; and perform 1026 if the vehicle ID and the positioning ID that are included in the AUTH1 (flameout positioning start) command are recorded in the mobile phone, or perform 1024 if the vehicle ID and the positioning ID that are included in the AUTH1 (flameout positioning start) command are not recorded in the mobile phone.

If the vehicle ID and the positioning ID included in the AUTH1 (flameout positioning start) command are recorded in the mobile phone 10, it indicates that there is a risk that the positioning ID is forged, and current flameout positioning is unreliable. Therefore, it is determined that flameout positioning fails.

1024: Store the foregoing obtained reference location and reference height, and store the vehicle ID and the positioning ID that are included in the AUTH1 (flameout positioning start) command, for example, store the reference location, the reference height, the vehicle ID, and the positioning ID in the anti-relay TA or the vehicle key applet 108 of the mobile phone 10, so that the reference location, the reference height, the vehicle ID, and the positioning ID are used when the mobile phone 10 performs anti-relay determining.

1026: Determine that flameout positioning fails.

In some embodiments, if the reference location is not obtained when flameout positioning fails, after obtaining a flameout positioning failure result, the wallet TA 106 may send a flameout positioning failure message to the vehicle lock command engine 212 sequentially through the mobile wallet 103, the vehicle manufacturer app 102, and the vehicle-mounted BLE module 214. After receiving the flameout positioning failure message, the vehicle lock command engine 212 clears the positioning ID. In this way, regardless of whether a relay attack occurs when imperceptible authentication is performed next time, because the vehicle lock applet 108 needs to match a flameout ID when verifying the imperceptible authentication success ciphertext, verification cannot succeed because the current positioning ID is cleared. Consequently, no electronic device can perform imperceptible authentication or imperceptible authentication cannot succeed, and the mobile phone 10 can open a lock only through perceptible authentication or by using a physical vehicle key.

Figure 10B:
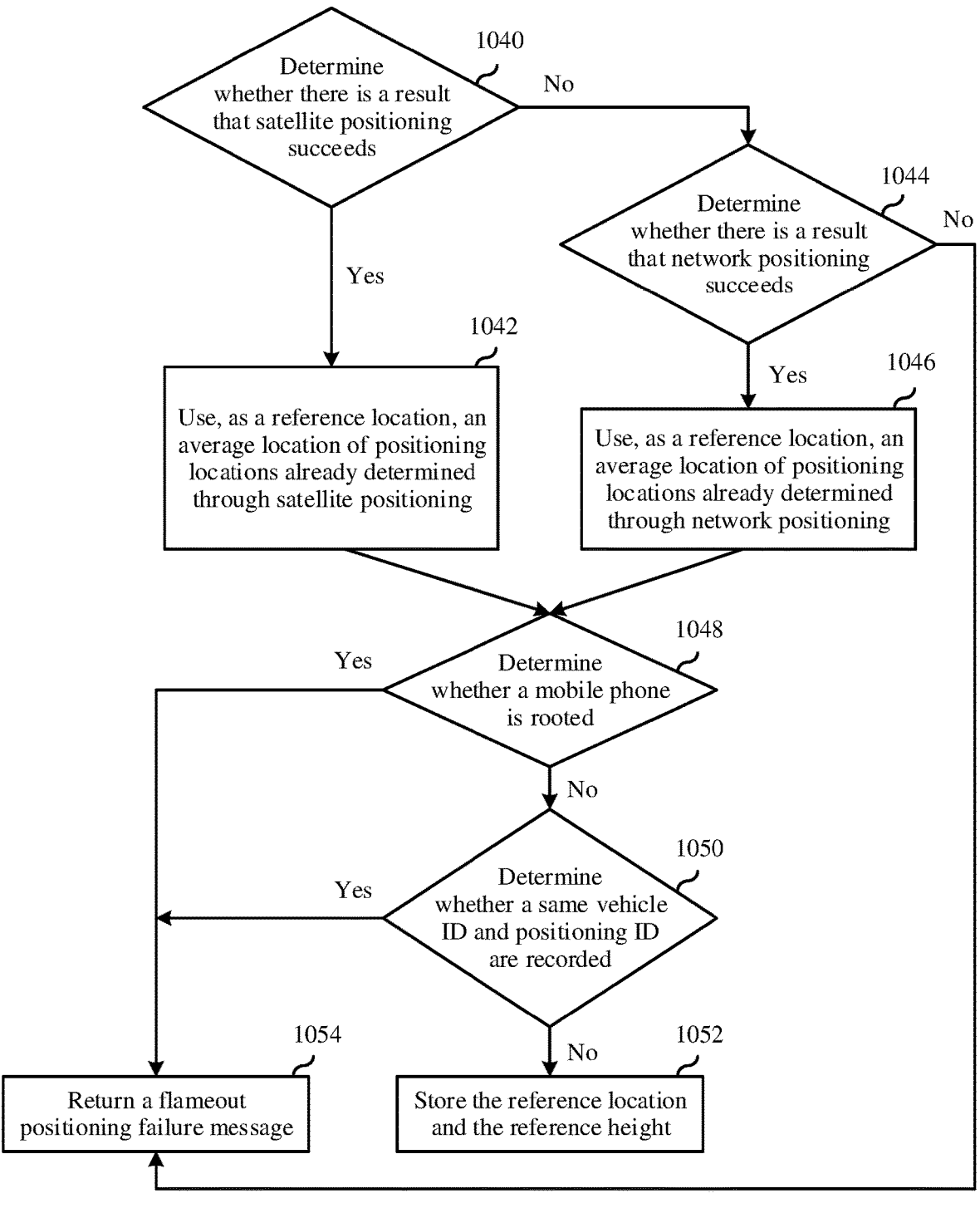

Specifically, as shown in FIG. 10B, after the AUTH2 (flameout positioning stop) command is received, the flameout positioning policy may include the following steps.

1040: Determine whether there is a result that satellite positioning succeeds.

1042 is performed if there is the result that satellite positioning succeeds, or 1044 is performed if there is no result that satellite positioning succeeds.

1042: Use, as a reference location, an average location of positioning locations already determined through satellite positioning.

1044: Determine whether there is a result that network positioning succeeds.

1046 is performed if there is the result that network positioning succeeds, or 1054 is performed if there is no result that network positioning succeeds.

1046: Use, as a reference location, an average location of positioning locations already determined through network positioning.

Then, steps 1048 to 1054 are performed. Execution content of steps 1048 to 1054 is completely the same as that of steps 1020 to 1026. To avoid repetition, details are not described herein again.

In addition, it may be understood that the anti-relay application 104 may also obtain the reference location according to another flameout positioning policy, which is not limited to the policies shown in FIG. 10A-1 and FIG. 10A-2 and FIG. 10B, provided that the reference location can be obtained near the vehicle 20.

In addition, in another embodiment, in a process in which the mobile phone 10 performs flameout positioning, the AUTH2 (flameout positioning stop) command may also be generated in another case. For example, after leaving the vehicle 20, the user of the mobile phone 10 returns to the vehicle, and in this case, stops flameout positioning. Because the BLE connection is still maintained between the vehicle 20 and the mobile phone 10, and there is previously a result that imperceptible authentication or perceptible authentication succeeds, the vehicle 20 only needs to determine whether the distance between the mobile phone 10 and the vehicle 20 is the unlocking distance, to determine whether to open the vehicle lock.

In addition, it may be understood that, in another embodiment of the present invention, the reference location may also be obtained in another manner. For example, the reference location is obtained through only one positioning service, for example, the reference location is obtained through only satellite positioning or only network positioning.

Perceptible Authentication

Figure 11:
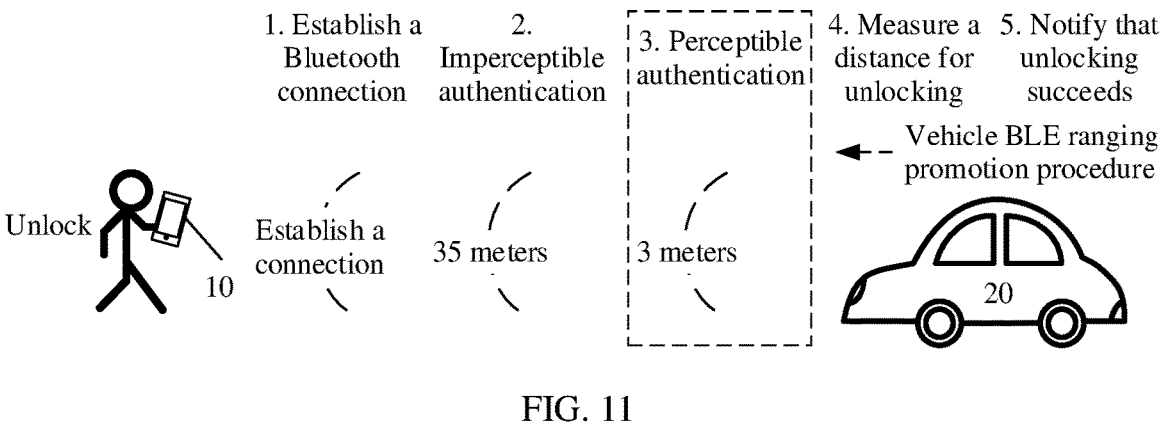
FIG. 11 is a diagram of a scenario in which a mobile phone 10 and a vehicle 20 implement an imperceptible unlock service according to some embodiments of this application.
Figure 12:
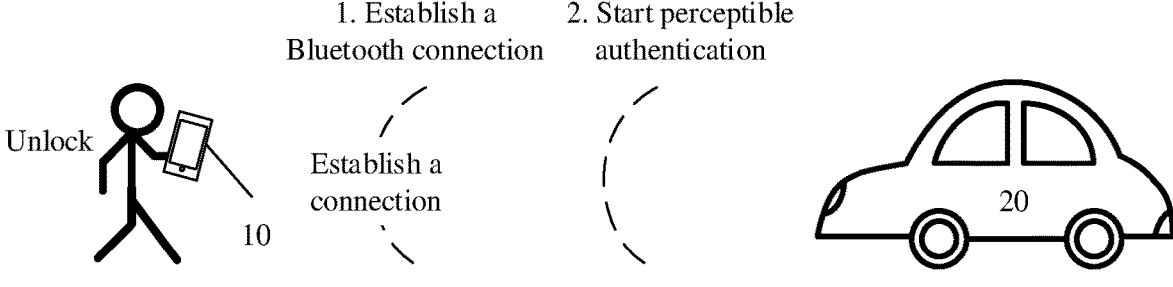
FIG. 12 is a diagram of a scenario in which a mobile phone 10 and a vehicle 20 implement a perceptible unlock service according to some embodiments of this application.

As described above, in some embodiments, the mobile phone 10 includes a perceptible authentication application, and a distance range for imperceptible authentication may be set. As shown in FIG. 11, when imperceptible authentication fails within the distance range for imperceptible authentication, perceptible authentication may be performed. It may be understood that, in embodiments of this application, as shown in FIG. 12, the user may initiate perceptible authentication at any time when the mobile phone 10 establishes BLE communication with the vehicle 20. In the perceptible authentication phase, in response to a perceptible authentication request sent by the vehicle 20, the mobile phone 10 may verify a biometric recognition feature of the user, for example, verify a fingerprint, an iris, or a voice, or perform facial recognition. In addition, in some embodiments, another verification method, for example, password verification or posture verification, may also be used. After perceptible authentication succeeds, the mobile phone 10 may send, to the vehicle 20, a message indicating that perceptible authentication succeeds, to indicate the vehicle 20 to open a lock.

In some embodiments, the vehicle 20 may send prompt information for performing perceptible authentication to the mobile phone 10, so that the user performs perceptible authentication by using the mobile phone 10. It may be understood that the user 10 may also actively initiate perceptible authentication without a prompt. For example, the user may find an imperceptible vehicle key icon on a leftmost screen, a wallet app, or a vehicle manufacturer app, and the user may perform an active operation of "unlocking" or "locking the vehicle".

Figure 13A:
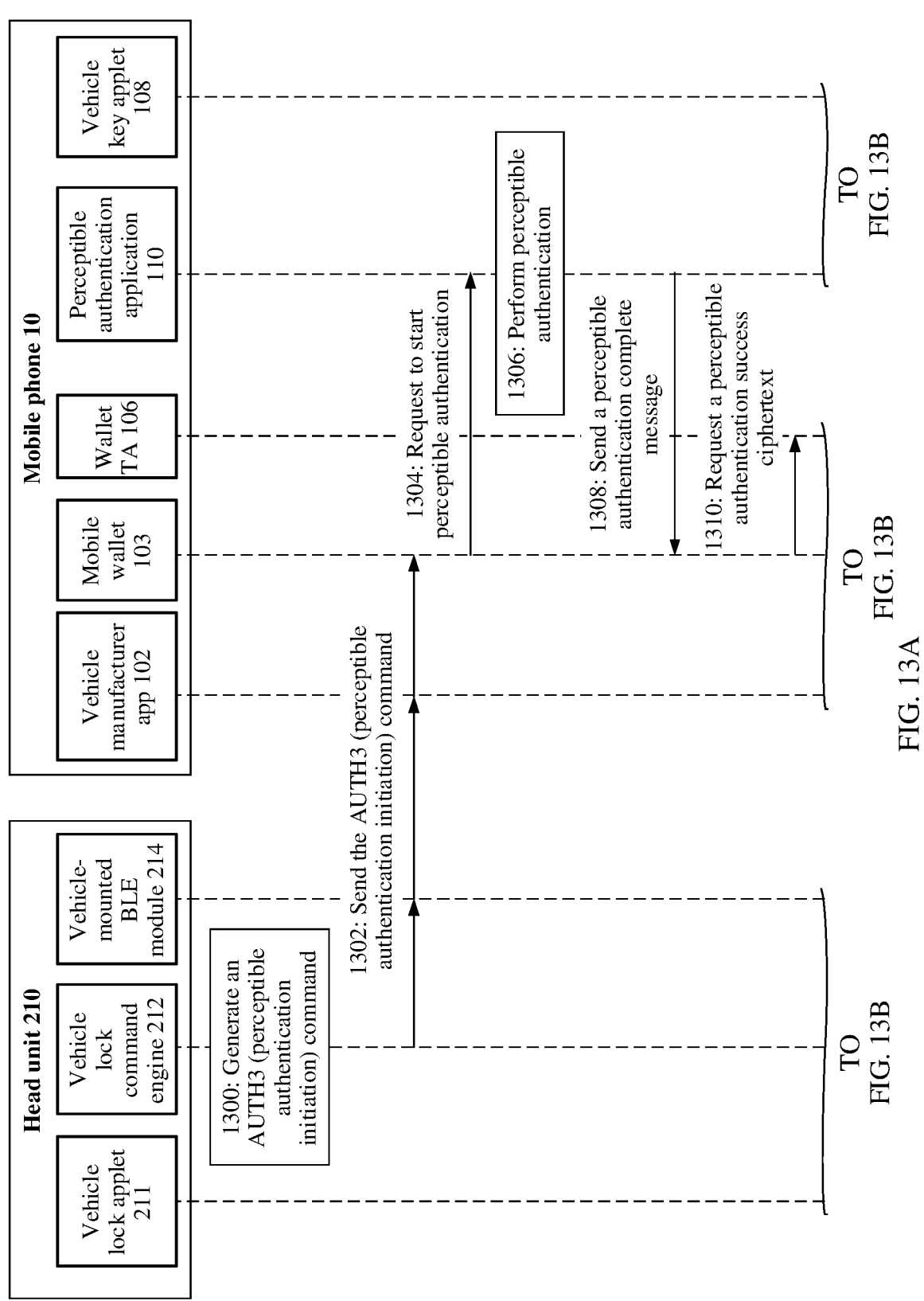
FIG. 13A, FIG. 13B, and FIG. 13C are a schematic flowchart of performing perceptible authentication by a mobile phone 10 in the architecture shown in FIG. 2 according to some embodiments of this application.
Figure 13B:
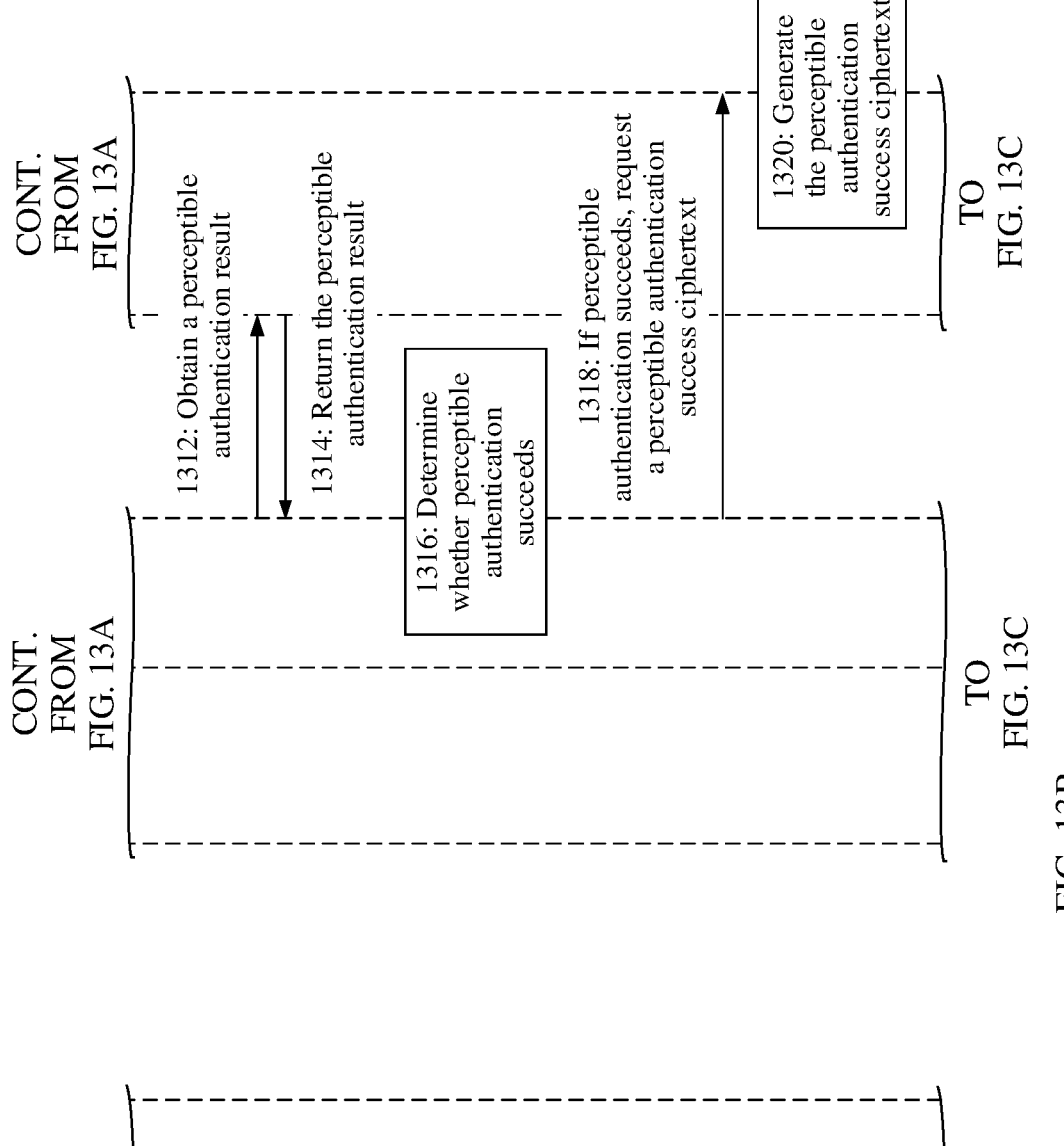
Figure 13C:
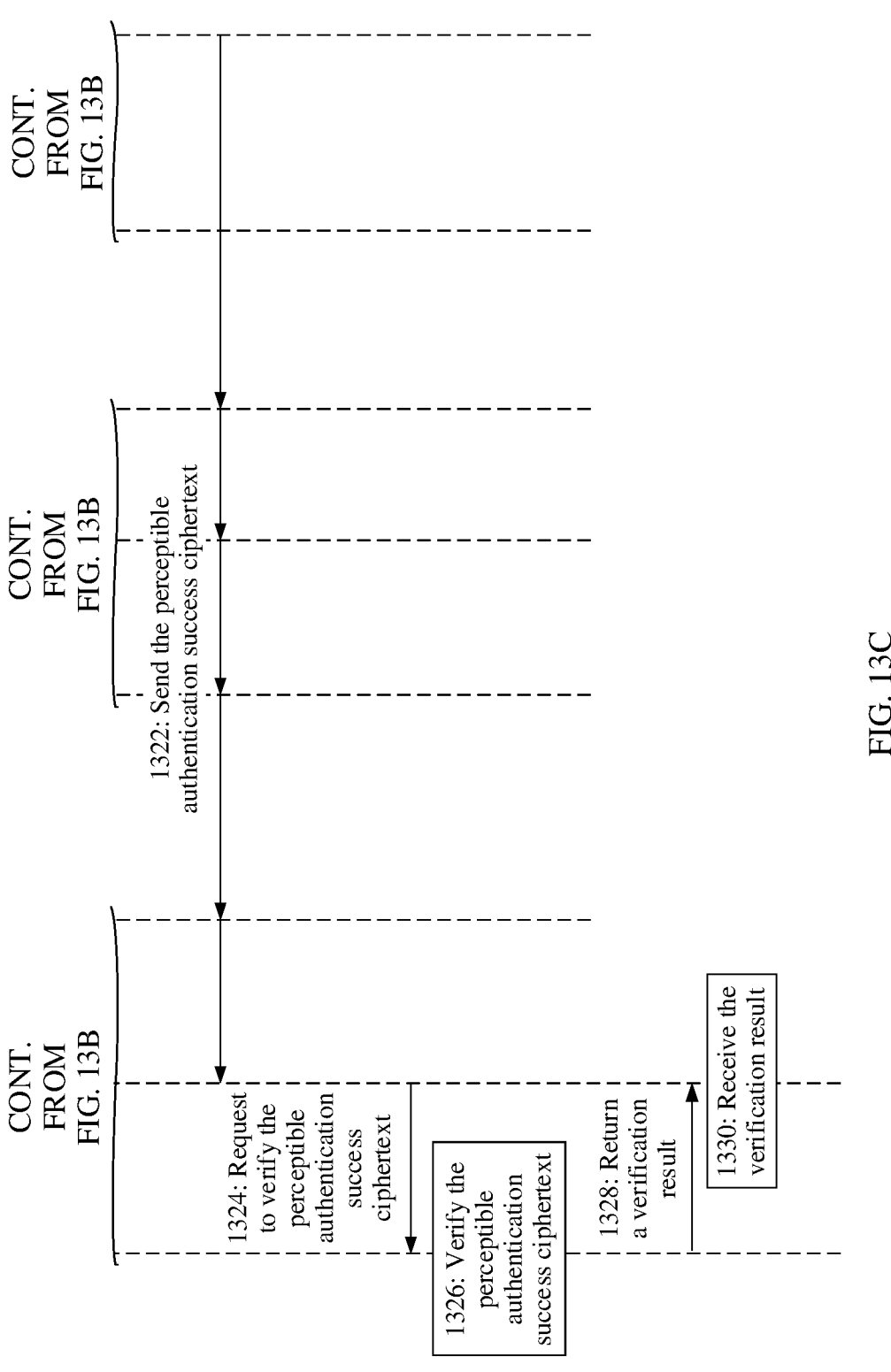
Figure 14:
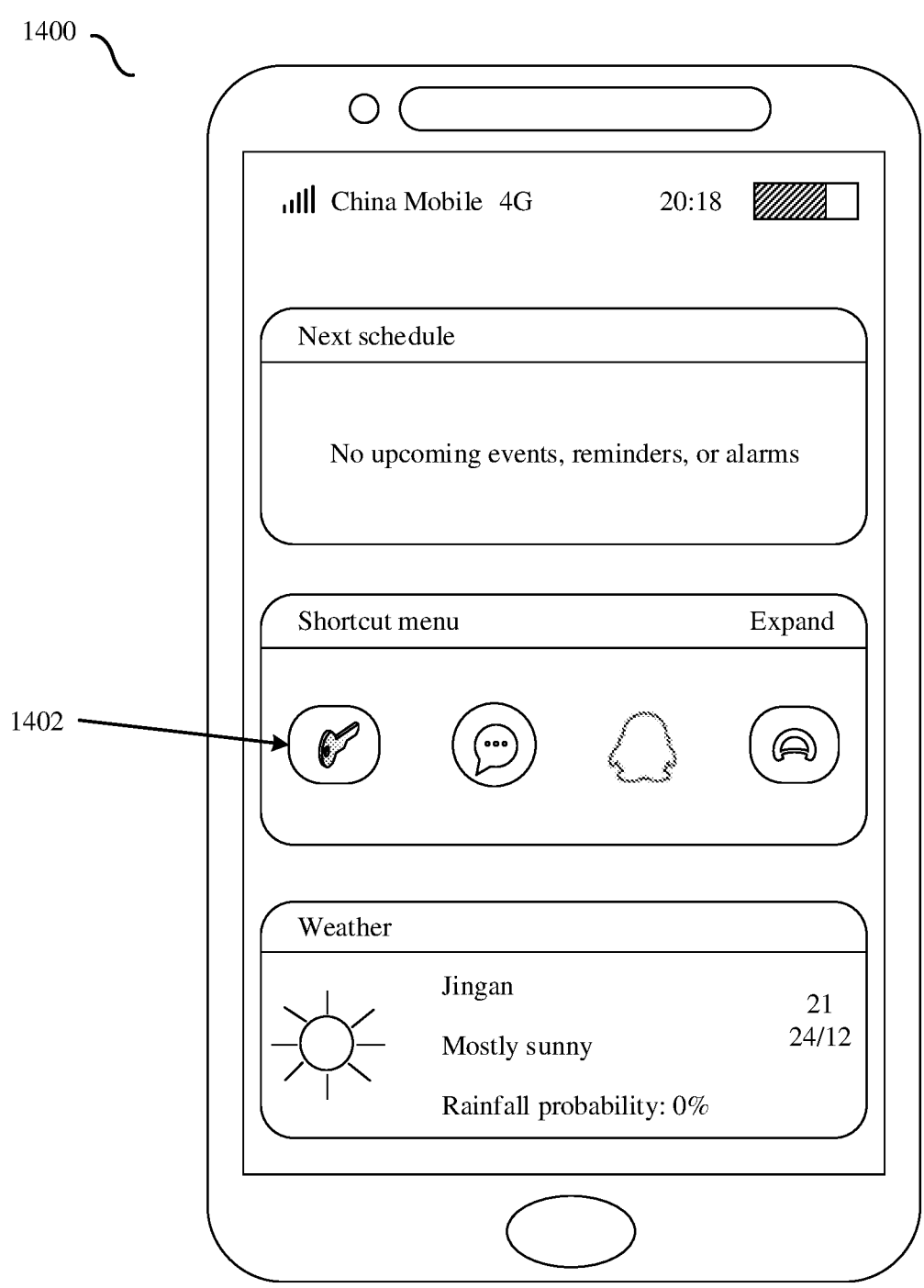
FIG. 14 is a schematic diagram of a screen 1400 of a mobile phone 10 according to some embodiments of this application.
Figures 15A, 15B:
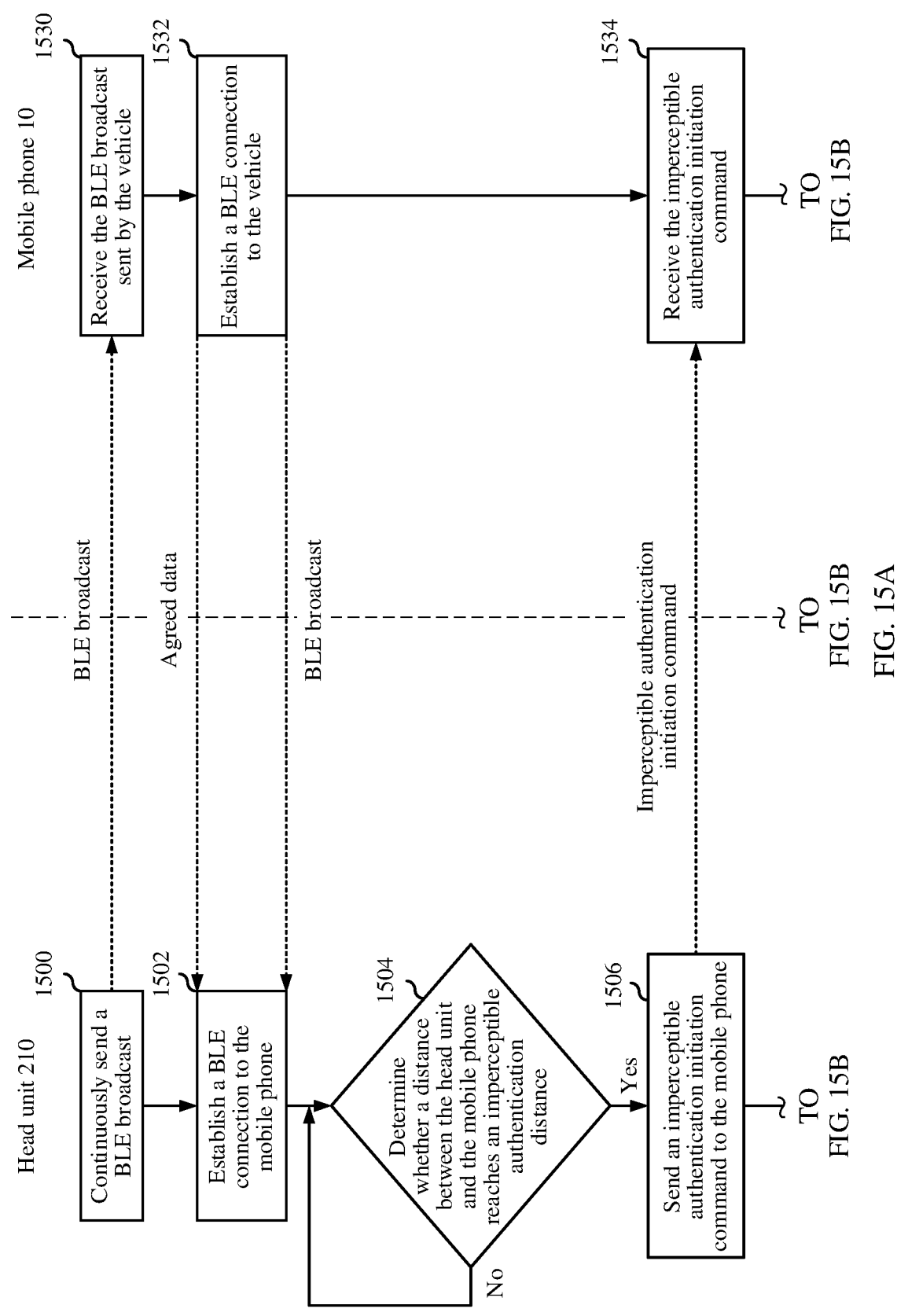
FIG. 15A to FIG. 15D are a schematic diagram of working procedures of a mobile phone 10 and a head unit 210 in an unlock service according to some embodiments of this application.
Figure 15B:
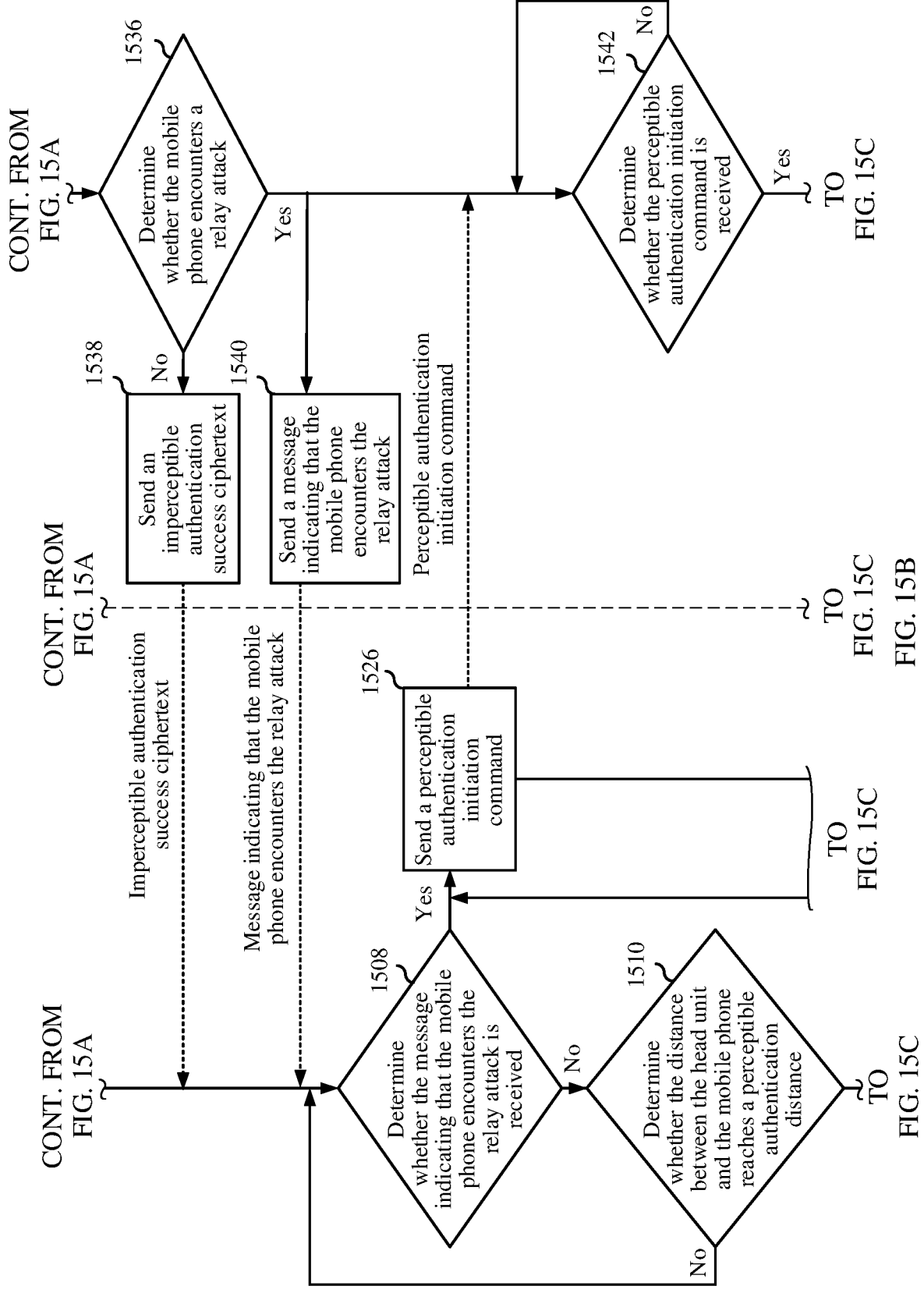
Figures 15C, 15D:
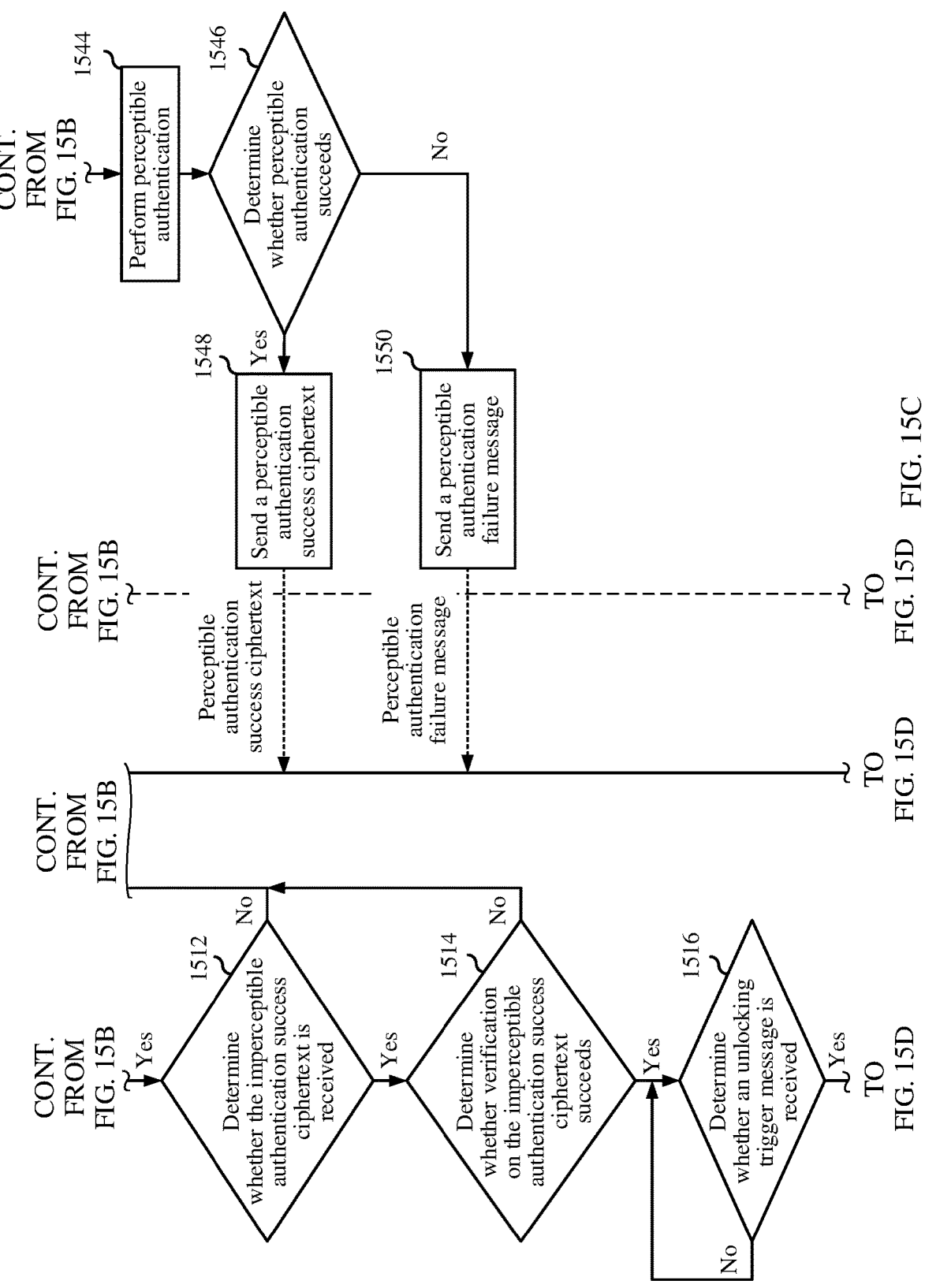

FIG. 13A, FIG. 13B, and FIG. 13C are a schematic flowchart of performing perceptible authentication. FIG. 14 is a schematic diagram of a screen 1400 of a mobile phone 10. In the figure, a leftmost screen of the mobile phone 10 is displayed on the screen of the mobile phone 10, and a shortcut menu includes an imperceptible vehicle key icon 1402. Tapping the imperceptible vehicle key icon 1402 on the leftmost screen of the mobile phone 10 is used as an example. As shown in FIG. 13A, FIG. 13B, and FIG. 13C, a perceptible authentication process includes the following steps.

1300: After a user triggers the imperceptible vehicle key icon 1402 on the leftmost screen, transfer an active unlock instruction to a vehicle lock command engine 212. After receiving the active unlock instruction, the vehicle lock command engine 212 generates an AUTH3 (perceptible authentication initiation) command. Alternatively, when it is measured that a distance between the mobile phone 10 and a vehicle 20 reaches a perceptible authentication distance (for example, 3 meters), if imperceptible authentication fails, the vehicle lock command engine 212 of a head unit 210 of the vehicle 20 generates an AUTH3 (perceptible authentication initiation) command.

For example, in some embodiments, the AUTH3 (imperceptible authentication initiation) command may include information shown in Table 5:

38

TABLE 5

| AUTH3 | Command identifier 4 | Configuration data 4 | Vehicle random number |
| --- | --- | --- | --- |

The command identifier 4 is used to identify that the AUTH3 command is a command used to initiate perceptible authentication. The configuration data 4 includes a vehicle ID, an authentication ID, a vehicle key AID (Application identifier, application identifier), and a key ID. The authentication ID is used to identify current perceptible authentication. The vehicle random number is randomly generated by the vehicle lock command engine 212 of the head unit 210, and is included in the AUTH3 (perceptible authentication initiation) command. After the vehicle random number is sent by the vehicle lock command engine 212 of the head unit 210 to the mobile phone 10, and perceptible authentication succeeds, the mobile phone 10 may use a perceptible authentication success ciphertext to include the vehicle random number and send the perceptible authentication success ciphertext to the vehicle lock command engine 212 of the head unit 210. Then, when verifying the perceptible authentication success ciphertext in response to a request of the vehicle lock command engine 212, a vehicle lock applet 211 compares the vehicle random number in the perceptible authentication success ciphertext with a vehicle random number stored in the vehicle lock applet 211. If the two vehicle random numbers are the same, it indicates that the AUTH3 (perceptible authentication initiation) command received by the mobile phone 10 is not tampered with or the received perceptible authentication success ciphertext is not tampered with.

In addition, it may be understood that although a name of the perceptible authentication initiation command is AUTH3 herein, in another embodiment, the perceptible authentication initiation command may also be named in another name, and a function is the same as that of AUTH3. This is not limited herein.

1302: The vehicle lock command engine 212 sends the AUTH3 (perceptible authentication initiation) command to a mobile wallet 103 sequentially through a vehicle-mounted BLE module 213 and a vehicle manufacturer app 102.

1304: After receiving the AUTH3 (perceptible authentication initiation) command, the mobile wallet 103 requests a perceptible authentication application to start perceptible authentication.

1306: After receiving the request, the perceptible authentication application performs perceptible authentication.

In some embodiments, if the perceptible authentication application performs authentication by collecting a fingerprint of the user, the perceptible authentication application may compare a fingerprint stored in the mobile phone 10 or a fingerprint stored in a server with the collected fingerprint of the user. If the comparison succeeds, it indicates that verification succeeds. If the comparison fails, it indicates that verification fails. In some embodiments, the perceptible authentication application may invoke a fingerprint authentication interface by using the mobile wallet 103, so that the user enters fingerprint information, and then obtain the fingerprint information entered by the user for verification.

1308: After completing perceptible authentication, the perceptible authentication application sends a perceptible authentication complete message to the mobile wallet 103.

1310: After receiving the perceptible authentication complete message, the mobile wallet 103 requests a perceptible authentication success ciphertext from a wallet TA 106.

1312: After receiving the request, the wallet TA 106 obtains a perceptible authentication result from the perceptible authentication application.

1314: The perceptible authentication application returns the perceptible authentication result to the wallet TA 106.

It may be understood that, in some embodiments, after sending the perceptible authentication complete message to the mobile wallet 103, the perceptible authentication application may retain the perceptible authentication result for a short time period (for example, three seconds). If the wallet TA does not obtain the authentication result in a timely manner within the time period, the perceptible authentication result is deleted.

1316: After receiving the perceptible authentication result, the wallet TA 106 determines whether perceptible authentication succeeds.

1318: If it is determined that perceptible authentication succeeds, request a perceptible authentication success ciphertext from a vehicle key applet 108.

It may be understood that, if the perceptible authentication result indicates that perceptible authentication fails, the authentication result is not returned to the head unit 210 of the vehicle 20, or a message indicating that perceptible authentication fails is returned.

1320: After receiving the request from the wallet TA 106, the vehicle key applet 108 generates the perceptible authentication success ciphertext.

It may be understood that in some embodiments, the perceptible authentication success ciphertext may be a ciphertext obtained by encrypting authentication success information by using a key, and the key is a key in agreed data sent by the mobile phone 10 to the vehicle 20 when a BLE connection is established between the vehicle 20 and the mobile phone 10. For example, the perceptible authentication success ciphertext may include a vehicle ID encrypted by using a key.

1322: The vehicle key applet 108 sends the perceptible authentication success ciphertext to the vehicle lock command engine 212 sequentially through the wallet TA 106, the mobile wallet 103, the vehicle manufacturer app 102, and the vehicle-mounted BLE module 213.

1324: After receiving the perceptible authentication success ciphertext, the vehicle lock command engine 212 requests the vehicle lock applet 211 to verify the perceptible authentication success ciphertext.

1326: The vehicle lock applet 211 verifies the perceptible authentication success ciphertext in response to the received request.

1328: After completing verification, the vehicle lock applet 211 returns a verification result to the vehicle lock command engine 212.

1330: The vehicle lock command engine 212 receives the verification result.

In some embodiments, after receiving the verification result, if the verification result is that verification on the perceptible authentication success ciphertext succeeds, the vehicle lock command engine 212 immediately opens the vehicle lock; or if the verification result is that verification fails, the vehicle lock command engine 212 does not open the vehicle lock, and sends an unlock failure message to the mobile phone 10. In some other embodiments, the vehicle lock command engine 212 stores the verification result after receiving the verification result, re-obtains the verification result of the perceptible authentication success ciphertext from the vehicle lock command engine 212 only when determining that the distance between the mobile phone 10 and the vehicle 20 reaches the unlocking distance mentioned above, and opens the vehicle lock only when the obtained verification result indicates that verification on the perceptible authentication success ciphertext succeeds. When verification fails, the vehicle lock command engine 212 does not open the vehicle lock, and sends an unlock failure message to the mobile phone 10.

For example, in a possible implementation, a sensing switch is disposed on a door handle of the vehicle. When the user touches the door handle, the vehicle 20 starts to measure the distance between the vehicle 20 and the mobile phone 10 through BLE. If the distance is less than the unlocking distance (for example, less than 1 meter), the vehicle 20 obtains the verification result of the perceptible authentication success ciphertext, and opens the vehicle lock of the vehicle door only when determining that the verification result is that verification succeeds. When verification fails, the vehicle 20 does not open the vehicle lock, and sends an unlock failure message to the mobile phone 10. For another example, in another possible implementation, the vehicle 20 continuously performs ranging on the mobile phone 10. When the distance between the vehicle 20 and the mobile phone 10 is less than the unlocking distance (for example, less than 1 meter), the vehicle 20 obtains the verification result of the perceptible authentication success ciphertext, and opens the vehicle lock of the vehicle door when determining that the verification result is that verification succeeds. When verification fails, the vehicle 20 does not open the vehicle lock, and sends an unlock failure message to the mobile phone 10.

Based on the foregoing descriptions, the following describes main working procedures of the mobile phone 10 and the head unit 210 when the mobile phone 10 and the vehicle 20 perform an unlock service. Specific details in the foregoing embodiment are still applicable to the following procedure. The details are not described herein again. The scenario shown in FIG. 11 is used as an example. As shown in FIG. 15A to FIG. 15D, a working procedure of the head unit 210 includes the following steps.

1500: When the vehicle 20 stops, the head unit 210 continuously sends a BLE broadcast.

When the mobile phone 10 is close enough to the vehicle 20, the mobile phone 10 may receive the BLE broadcast sent by the head unit 210.

1502: The head unit 210 establishes a BLE connection to the mobile phone.

After the mobile phone 10 receives the BLE broadcast sent by the head unit 210, the mobile phone 10 establishes the BLE connection to the head unit 210.

In some embodiments, after the mobile phone 10 establishes the BLE connection to the head unit 210, the head unit 210 obtains agreed data that includes a key and a distance configuration table from the mobile phone 10, and the mobile phone 10 starts to transmit the BLE broadcast. The head unit 210 wakes up a plurality of BLE ranging antennas to receive the BLE broadcast from the mobile phone 20, to perform RSSI ranging on the mobile phone 10.

1504: After establishing the BLE connection to the mobile phone 10, the head unit 210 measures whether a distance between the head unit 210 and the mobile phone 10 reaches an imperceptible authentication distance (for example, less than 35 meters shown in FIG.

11); and performs 1506 if the imperceptible authentication distance is reached, or continues to perform 1504 if the imperceptible authentication distance is not reached.

1506: If the imperceptible authentication distance is reached, send an imperceptible authentication initiation command to the mobile phone.

1508: After sending the imperceptible authentication initiation command, the head unit 210 determines whether a message indicating that the mobile phone encounters a relay attack is received; and performs 1510 if the message indicating that anti-relay determining fails is not received, or performs 1526 if the message indicating that anti-relay determining fails is received.

1510: When determining whether the message indicating that the mobile phone encounters the relay attack is received, the head unit 210 further continuously monitors the distance between the head unit 210 and the mobile phone 10, and determines whether the distance between the head unit 210 and the mobile phone 10 reaches a perceptible authentication distance (for example, 3 meters shown in FIG. 11).

The head unit 210 performs 1512 if the head unit 210 detects that the distance between the head unit 210 and the mobile phone 10 reaches the perceptible authentication distance, or the head unit 210 returns to 1508 if the head unit 210 detects that the distance between the head unit 210 and the mobile phone 10 does not reach the perceptible authentication distance.

1512: When the distance between the head unit 210 and the mobile phone 10 reaches the perceptible authentication distance, the head unit 210 determines whether an imperceptible authentication success ciphertext has been received; and performs 1514 if the head unit 210 determines that the imperceptible authentication success ciphertext has been received, or perform 1526 if the head unit 210 determines that the imperceptible authentication success ciphertext has not been received.

It may be understood that, although the figure shows that the imperceptible authentication success ciphertext is received before 1508, this is merely an example. Specifically, the imperceptible authentication success ciphertext may be received at any moment after the imperceptible authentication initiation command is sent in 1506.

1514: The head unit 210 determines whether an obtained verification result of the imperceptible authentication success ciphertext indicates that verification succeeds; and performs 1516 if the verification result indicates that verification succeeds, or performs 1526 if the verification result indicates that verification fails.

It may be understood that, in some embodiments, the verification result of the imperceptible authentication success ciphertext may be directly obtained. For example, after receiving the imperceptible authentication success ciphertext, the vehicle lock command engine 212 of the head unit 210 may directly request the vehicle lock applet 211 to verify the imperceptible authentication success ciphertext, and store a verification result returned by the vehicle lock applet 211 in the vehicle lock command engine 212. Therefore, when it is measured that the distance between the mobile phone 10 and the vehicle 20 reaches the perceptible authentication distance, the verification result is directly obtained from the vehicle lock command engine 212.

In addition, in some other embodiments, after receiving the imperceptible authentication success ciphertext, the vehicle lock command engine 212 of the head unit 210 may store only the imperceptible authentication success ciphertext, but does not verify the received imperceptible authentication success ciphertext. When it is determined in 1510 that the distance between the head unit 210 and the mobile phone 10 reaches the perceptible authentication distance, the vehicle lock command engine 212 requests the vehicle lock applet 211 to verify the imperceptible authentication success ciphertext, and receives the verification result.

1516: The head unit 210 determines whether an unlocking trigger message is received.

As described above, in some embodiments, when preparing to open a vehicle door, a user holding the mobile phone 10 triggers a sensing switch disposed on a door handle of the vehicle door. When the user touches the sensing switch, the sensing switch may send the unlocking trigger message to the head unit 210.

1518: If the head unit 210 receives the unlocking trigger message, the head unit 210 needs to determine whether the distance between the vehicle 20 and the mobile phone 10 is less than an unlocking distance (for example, 1 meter); and performs 1520 if the head unit 210 determines that the distance between the vehicle 20 and the mobile phone 10 is less than the unlocking distance, or continues to perform 1518 if the head unit 210 determines that the distance between the vehicle 20 and the mobile phone 10 is not less than the unlocking distance.

1520: Determine whether an obtained verification result of the imperceptible authentication success ciphertext or a perceptible authentication success ciphertext indicates that verification succeeds; and perform 1522 if the verification result of the imperceptible authentication success ciphertext or the perceptible authentication success ciphertext indicates that verification succeeds, or perform 1524 if the verification result of the imperceptible authentication success ciphertext or the perceptible authentication success ciphertext indicates that verification fails.

It may be understood that 1518 and 1520 may be simultaneously performed, or 1520 is performed before 1518.

1522: The head unit 210 sends an unlock instruction to a vehicle lock on the vehicle door, to open the vehicle lock on the vehicle door.

1524: The head unit 210 sends an unlock failure message to the mobile phone.

1526: The head unit 210 sends a perceptible authentication initiation command to the mobile phone 10.

1528: The head unit 210 determines whether the perceptible authentication success ciphertext is received (or determines whether a message indicating that perceptible authentication fails is received); and performs 1520 if the head unit 210 determines that the perceptible authentication success ciphertext is received, or performs 1524 if the head unit 210 determines that the perceptible authentication success ciphertext is not received.

In addition, it may be understood that, in some other embodiments, in 1528, after determining that the perceptible authentication success ciphertext is received, the head unit 210 may not perform 1520, but performs 1518 to determine whether the distance between the vehicle 20 and the mobile phone 10 is less than the unlocking distance, that is, opens the vehicle lock only when the distance between the vehicle 20 and the mobile phone 10 is less than the unlocking distance.

In addition, it may be understood that, in some other embodiments, when determining that verification on the received imperceptible authentication success ciphertext succeeds, the head unit 210 may directly perform 1522 to open the vehicle lock, instead of performing 1516.

In addition, it may be understood that, in some other embodiments, when determining that verification on the received imperceptible authentication success ciphertext succeeds, the head unit 210 may not perform 1516 to determine whether the head unit 210 receives the unlocking trigger message, but directly performs 1518 to determine whether the distance between the vehicle 20 and the mobile phone 10 is less than the unlocking distance. In addition, when determining that the distance between the vehicle 20 and the mobile phone 10 is less than the unlocking distance, the head unit 210 obtains the verification result of the imperceptible authentication success ciphertext, and when the verification result of the imperceptible authentication success ciphertext indicates that verification succeeds, the head unit 210 performs 1522 to open the vehicle lock.

As shown in FIG. 15A to FIG. 15D, a working procedure of the mobile phone 10 includes the following steps.

> 1530: When the mobile phone 10 is close enough to the vehicle 20, the mobile phone 10 receives the BLE broadcast sent by the head unit 210.
>
> 1532: After the mobile phone 10 receives the BLE broadcast sent by the head unit 210, the mobile phone 10 establishes the BLE connection to the head unit 210.

In some embodiments, after the mobile phone 10 establishes the BLE connection to the head unit 210, the mobile phone 10 sends agreed data that includes a key and a distance configuration table to the head unit 210, and the mobile phone 10 starts to transmit the BLE broadcast.

> 1534: The mobile phone 10 receives an imperceptible authentication initiation command from the head unit 210.
>
> 1536: The mobile phone 10 determines, according to an anti-relay rule, whether the mobile phone encounters a relay attack; and performs 1538 if the mobile phone 10 determines that the mobile phone 10 does not encounter the relay attack, or performs 1540 and 1542 if the mobile phone 10 determines that the mobile phone 10 encounters the relay attack.
>
> 1538: When imperceptible authentication succeeds, the mobile phone 10 sends an imperceptible authentication success ciphertext to the head unit 210.

It may be understood that, although the figure shows that the head unit 210 receives the imperceptible authentication success ciphertext before determining whether the message indicating that the mobile phone encounters the relay attack is received, this is merely intended to indicate that the head unit 210 receives the imperceptible authentication success ciphertext, and a receiving time point may be any time point after the head unit 210 sends the imperceptible authentication initiation command to the mobile phone 10. Therefore, this is not limited herein.

> 1540: The mobile phone 10 sends, to the head unit 210, the message indicating that the mobile phone encounters the relay attack.

It may be understood that, as described above, when the mobile phone 10 determines that the mobile phone is rooted, a location of the mobile phone is mooked, and duration in which the mobile phone 10 performs anti-relay determining exceeds a time threshold, it indicates that the mobile phone 10 encounters the relay attack. In this case, the mobile phone 10 may send, to the head unit 210, the message indicating that the mobile phone encounters the relay attack.

> 1542: When determining that the mobile phone encounters the relay attack, the mobile phone 10 further determines whether a perceptible authentication initiation command is received from the head unit 210.

The mobile phone 10 performs 1544 if the perceptible authentication command is received, or continues to perform 1542 if the perceptible authentication command is not received.

> 1544: The mobile phone 10 performs perceptible authentication. For a specific process of perceptible authentication, refer to the foregoing descriptions.
>
> 1546: The mobile phone 10 determines whether perceptible authentication succeeds; and performs 1548 if perceptible authentication succeeds, or performs 1550 if perceptible authentication fails.
>
> 1548: The mobile phone 10 sends a perceptible authentication success ciphertext.
>
> 1550: The mobile phone 10 sends a perceptible authentication failure message.

Figure 16:
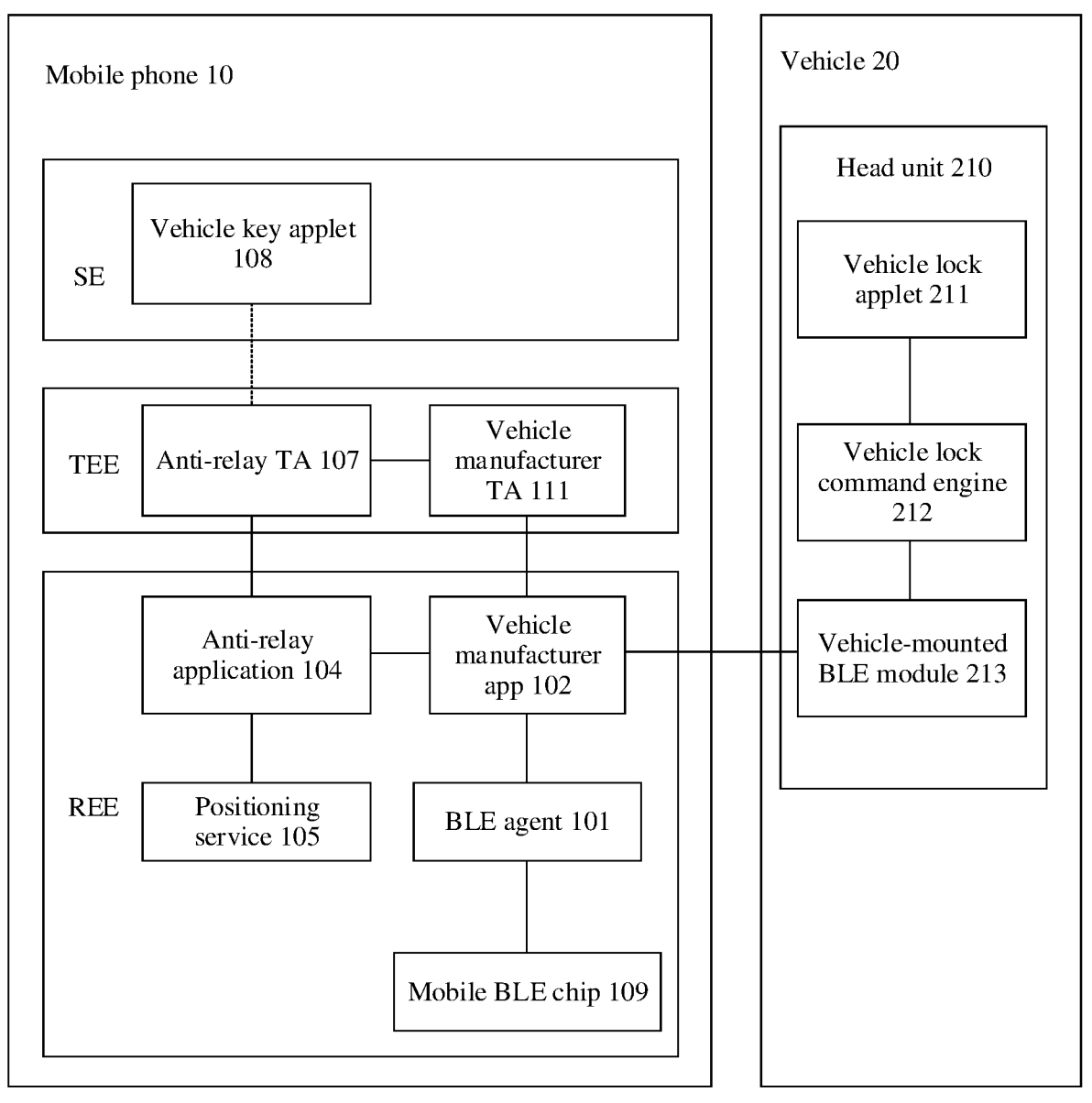
FIG. 16 is a diagram of an architecture of a system for implementing an unlock service between a mobile phone and a vehicle according to some embodiments of this application.

It may be understood that, although the unlock service between the mobile phone 10 and the vehicle 20 is described in the foregoing embodiment based on the architecture shown in FIG. 2, an architecture that can implement the technical solutions of this application is not limited to the architecture shown in FIG. 2. This is not limited herein. For example, FIG. 16 shows another architecture in which an unlock service between a mobile phone 10 and a vehicle 20 can be implemented. Specifically, as shown in FIG. 16, functions of a mobile wallet and a vehicle manufacturer app of the mobile phone 10 may be integrated into a same application, for example, integrated into a vehicle manufacturer app 102, and a corresponding vehicle manufacturer TA 111 is set. Except for the vehicle manufacturer app 102 and the vehicle manufacturer TA 111, functions of other modules in FIG. 16 are the same as functions of the modules in the architecture shown in FIG. 2. Details are as follows: The mobile phone 10 includes a BLE agent 101, a vehicle manufacturer app 102, an anti-relay application 104, a positioning service 105, a vehicle manufacturer TA 111, an anti-relay TA 107, a vehicle key applet 108, and a mobile BLE chip 109. The vehicle 20 includes a head unit 210, and the head unit 210 includes a vehicle lock applet 211, a vehicle lock command engine 212, and a vehicle-mounted BLE module 213.

Specifically, the BLE agent (BLE agent) 101 of the mobile phone 10 may register related information of the vehicle 20 when a connection is initially established between the vehicle 20 and the mobile phone 10, and may wake up, after the mobile BLE chip 109 receives a BLE broadcast from the vehicle 20, the vehicle manufacturer app 102 to establish a BLE connection to the vehicle 20.

The vehicle manufacturer app 102 may communicate with the vehicle-mounted BLE module 213 of the head unit 210, and receive a command from the vehicle-mounted BLE module. According to a command received from the vehicle lock command engine 212 of the head unit 210, the vehicle manufacturer app 102 may further invoke the anti-relay application 104 to perform imperceptible authentication and flameout positioning, or invoke a perceptible authentication service to perform perceptible authentication. The vehicle manufacturer TA 111 may be located in a TEE of the mobile phone 10, and is configured to obtain an anti-relay determining result and a flameout positioning result from the anti-relay TA 107, or obtain a perceptible authentication result from a perceptible authentication application in some embodiments. The vehicle manufacturer TA 111 is disposed in the TEE of the mobile phone 10, so that authenticity of authentication results or flameout positioning results of all authentication can be effectively ensured, and security of an unlocking process is improved.

The anti-relay application 104 and the anti-relay TA 107 may complete imperceptible authentication in response to an imperceptible authentication invocation request from the vehicle manufacturer app 102, or complete flameout positioning in response to a flameout positioning request from the vehicle manufacturer app 102. During flameout positioning, the anti-relay application 104 may be configured to perform a flameout positioning process, and a reference location determined through flameout positioning is stored in the anti-relay TA 107. In an imperceptible authentication phase, the anti-relay TA 107 performs anti-relay determining according to an anti-relay rule. The positioning service 105 is configured to provide a positioning service for the anti-relay application 104.

The vehicle key applet 108 may be configured to: store key information and generate ciphertexts in all phases in an unlocking process, for example, an imperceptible authentication ciphertext, a perceptible authentication ciphertext, and a flameout positioning success ciphertext. The vehicle lock applet 211 may be configured to store key information, and is configured to verify various ciphertexts generated by the vehicle key applet 108. The vehicle lock command engine 212 is configured to generate commands of various tasks that need to be performed by the mobile phone in the unlocking process, for example, an imperceptible authentication command, a perceptible authentication command, and a flameout positioning command. The vehicle-mounted BLE module 213 may be a BLE chip in the head unit 210, and is configured to: forward various commands generated by the vehicle lock command engine 212 to the vehicle manufacturer app 102 on a side of the mobile phone 10, and forward, to the vehicle lock command engine 212, various ciphertexts sent by the vehicle manufacturer app 102, and then the vehicle lock command engine 212 sends the ciphertexts to the vehicle lock applet 211 for verification.

Based on the architecture shown in FIG. 16, the following describes in detail the unlocking process between the mobile phone 10 and the vehicle 20.

When the mobile phone 10 initially establishes a communication connection to the head unit 210 of the vehicle 20, registration and Bluetooth ranging calibration need to be performed. The registration process and the Bluetooth ranging calibration process are completely the same as those in the architecture shown in FIG. 2, and are completed by the vehicle-mounted BLE module 213 of the head unit 210 and the vehicle manufacturer app 102 of the mobile phone 10. A specific implementation process is shown in FIG. 3. Therefore, details are not described herein again.

The scenario in which the mobile phone 10 and the vehicle 20 implement the imperceptible unlock service and that is shown in FIG. 4 is also applicable to the architecture shown in FIG. 16. Specifically, to start the vehicle 20, the mobile phone 10 needs to sequentially go through four phases: a Bluetooth connection establishment phase, an imperceptible authentication phase, a phase of measuring a distance for unlocking, and a phase of notifying that unlocking succeeds.

BLE Connection Establishment Phase

As described above, when the vehicle 20 stops, the head unit 210 continuously sends a BLE broadcast. If the mobile phone 10 can receive, in a process of approaching the vehicle 20, the BLE broadcast sent by the head unit 210, the mobile phone 10 establishes a BLE connection to the head unit 210. A procedure of establishing the BLE connection between the mobile phone 10 and the vehicle 20 in the architecture shown in FIG. 16 is the same as the procedure of establishing the BLE connection in the architecture shown in FIG. 2. For details, refer to the foregoing related descriptions of FIG. 5. Therefore, the details are not described herein again.

Imperceptible Authentication Phase

As described above, after establishing a BLE connection to the vehicle manufacturer app, the vehicle-mounted BLE module 213 starts to perform RSSI ranging on the mobile phone 10. Still refer to FIG. 4. When measuring that the distance between the mobile phone 10 and the vehicle 20 reaches the imperceptible authentication distance (35 meters shown in FIG. 4), a vehicle lock command engine 212 of the head unit 210 of the vehicle 20 generates an AUTH0 (imperceptible authentication initiation) command, to command the mobile phone 10 to start to perform imperceptible authentication. In addition, in some embodiments, a distance range for imperceptible authentication may be set. For example, when the distance is less than 35 meters and greater than 3 meters, imperceptible authentication is performed. When imperceptible authentication performed when the distance is less than 3 meters fails, another manner is used to open a vehicle lock, for example, perceptible authentication is performed, and the user is indicated to open the lock by using a biometric recognition feature (for example, a fingerprint).

In the imperceptible authentication phase, the mobile phone 10 compares a current location obtained through a positioning service with a reference location. Before a current unlock service is performed, the reference location may be a location that is of the mobile phone 10 and that is determined by the mobile phone 10 near the vehicle 20 according to a flameout positioning policy in response to a positioning request sent by the vehicle 20 after a flameout closest to the current unlock service occurs. If the current location of the mobile phone 10 matches the reference location or the current location of the mobile phone 10 is near the reference location, it indicates that the mobile phone 10 is near the vehicle 20, a possibility that the mobile phone 10 encounters a relay attack is low, and imperceptible authentication succeeds. Obtaining the reference location is discussed in detail below.

Figure 17A:
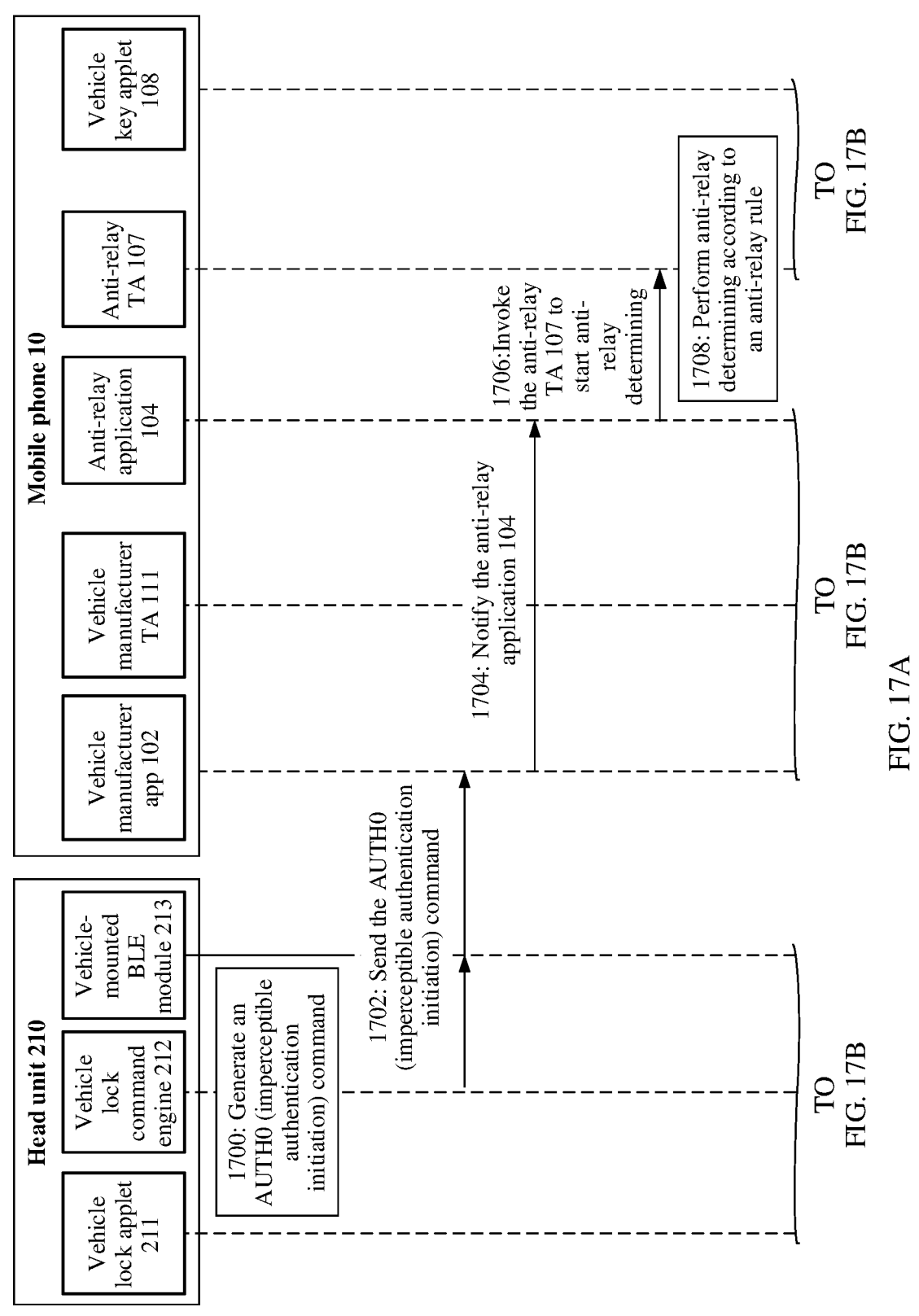
FIG. 17A, FIG. 17B, and FIG. 17C are a schematic flowchart of performing imperceptible authentication by a mobile phone 10 in the architecture shown in FIG. 16 according to some embodiments of this application.
Figure 17B:
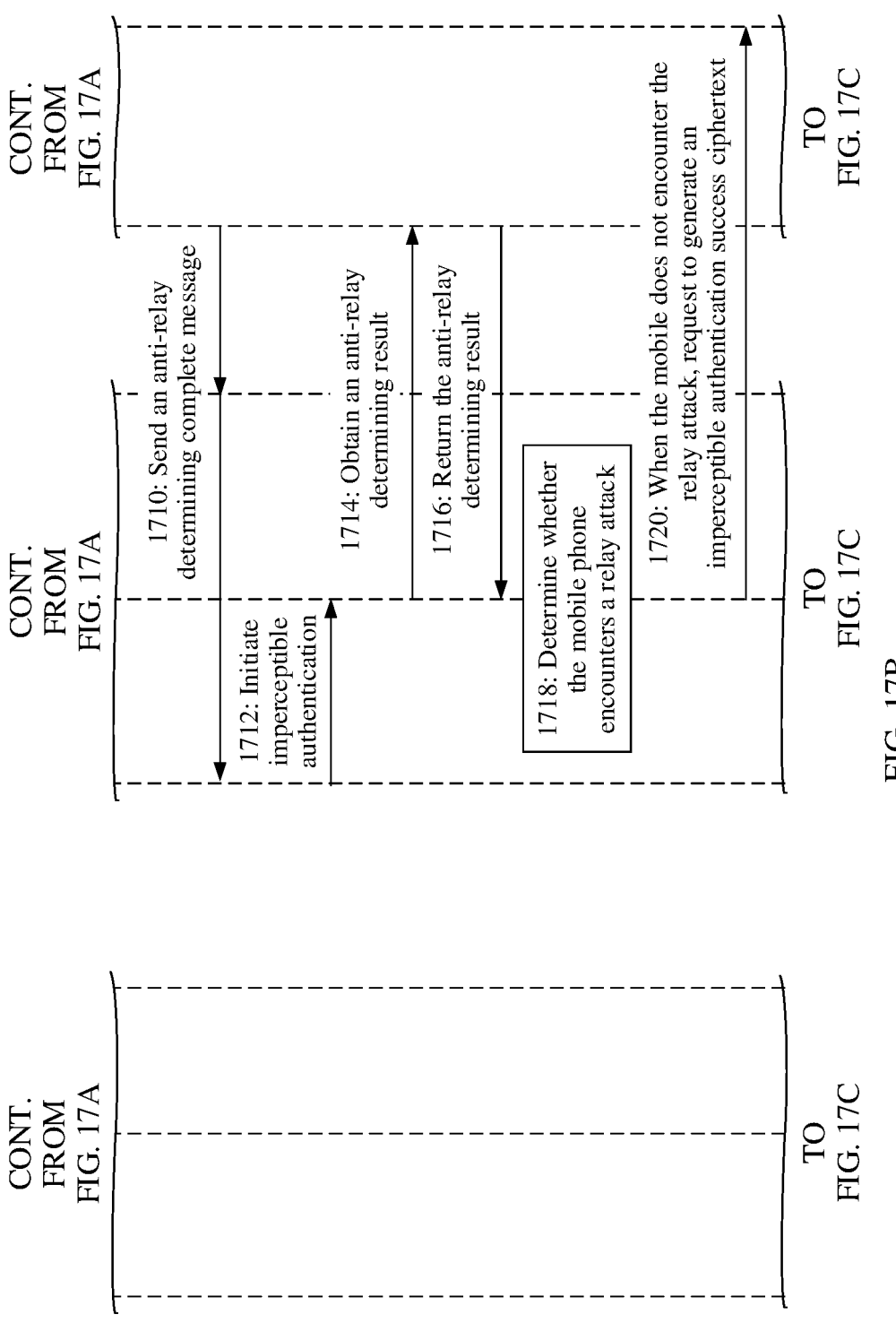
Figure 17C:
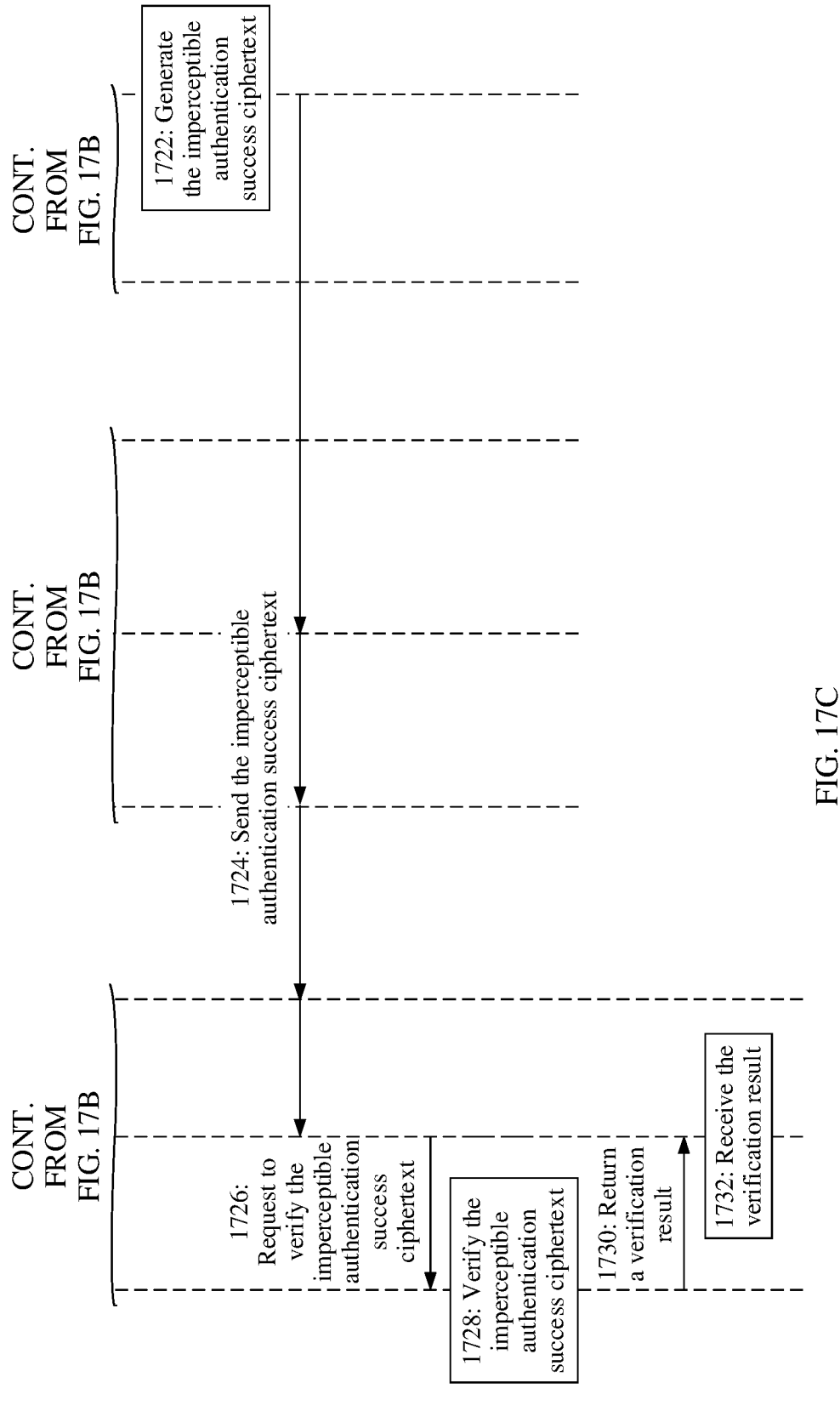
Figures 1, 18A:
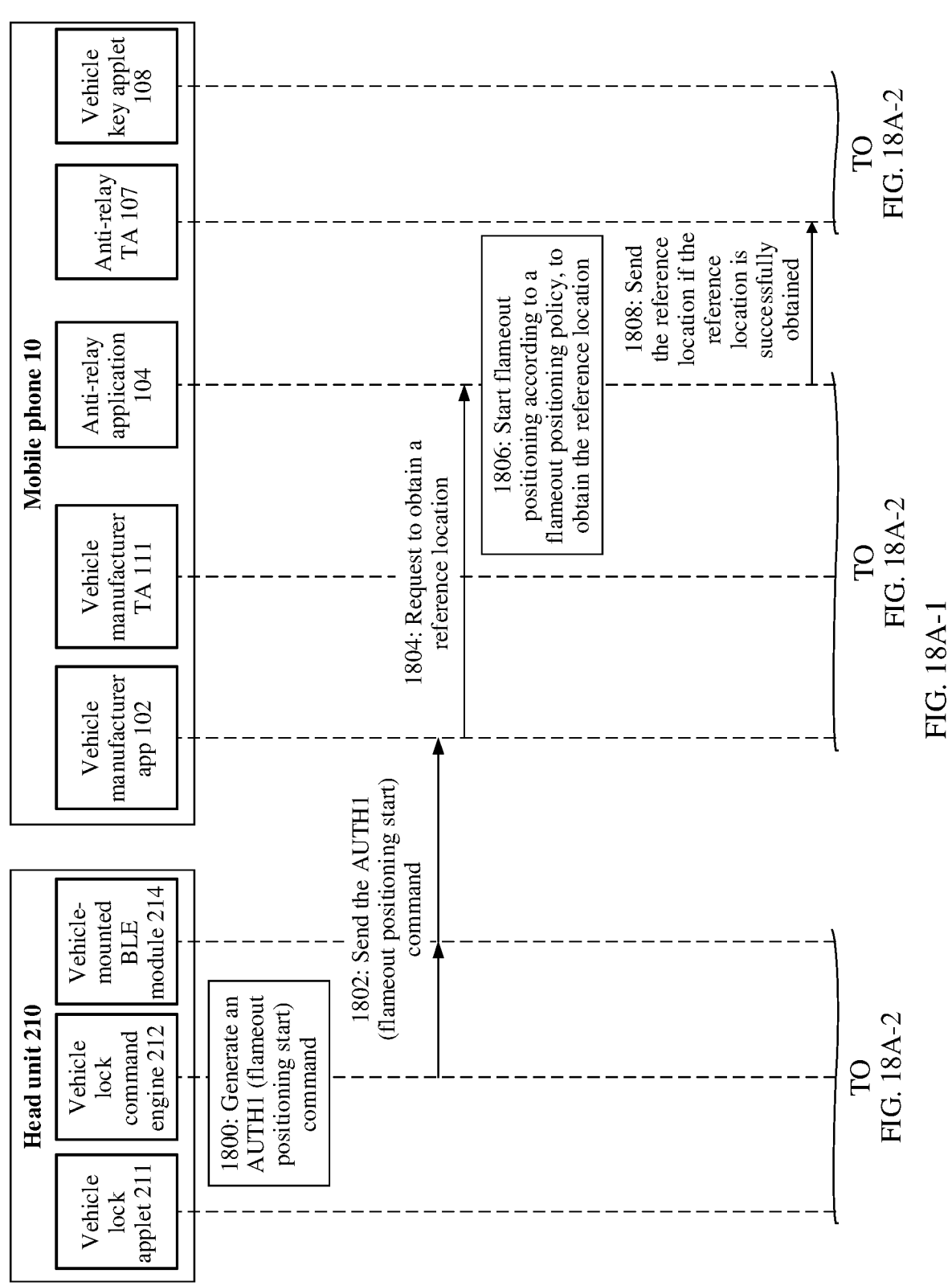
Figures 3, 18A:
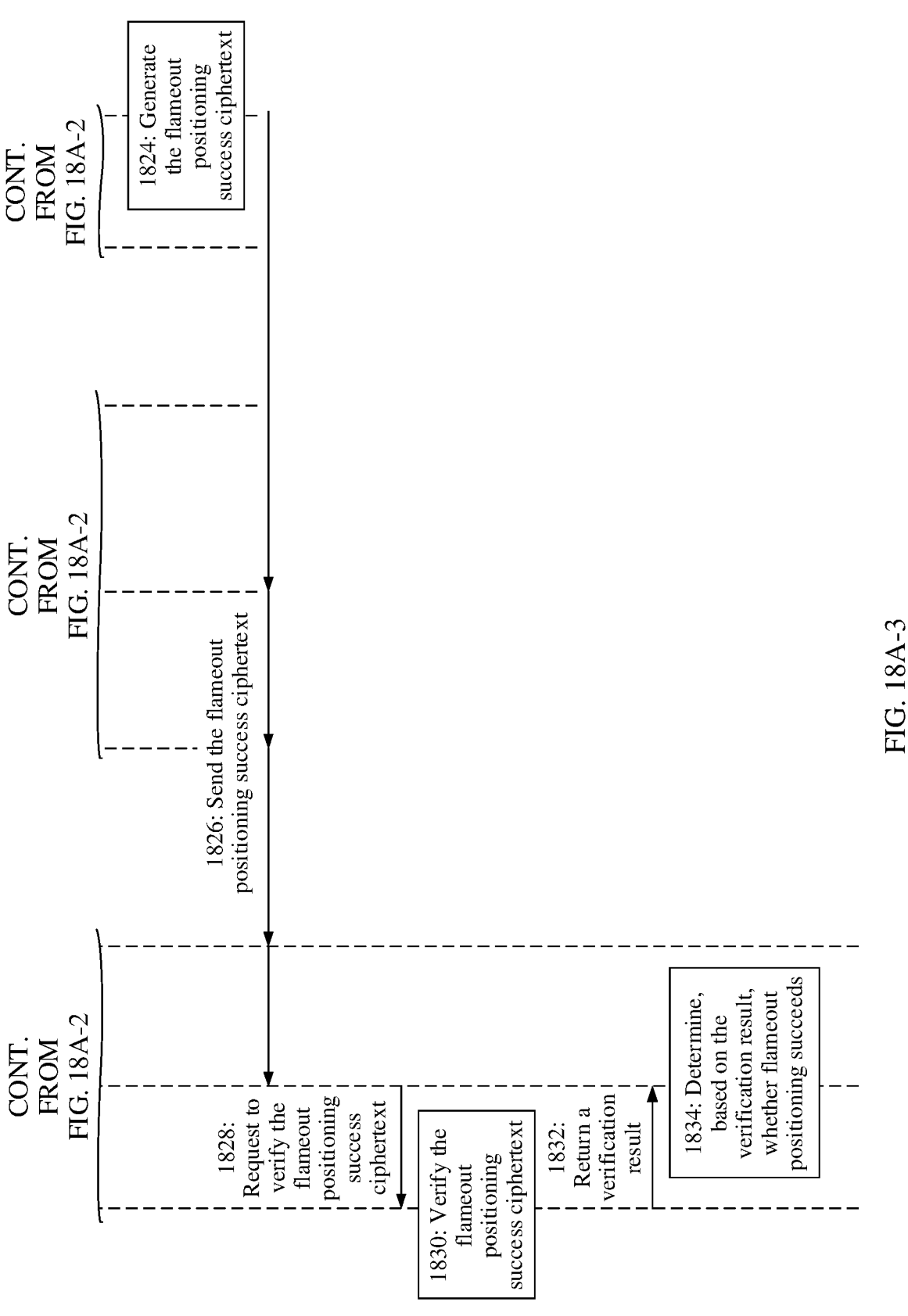
Figures 1, 18B:
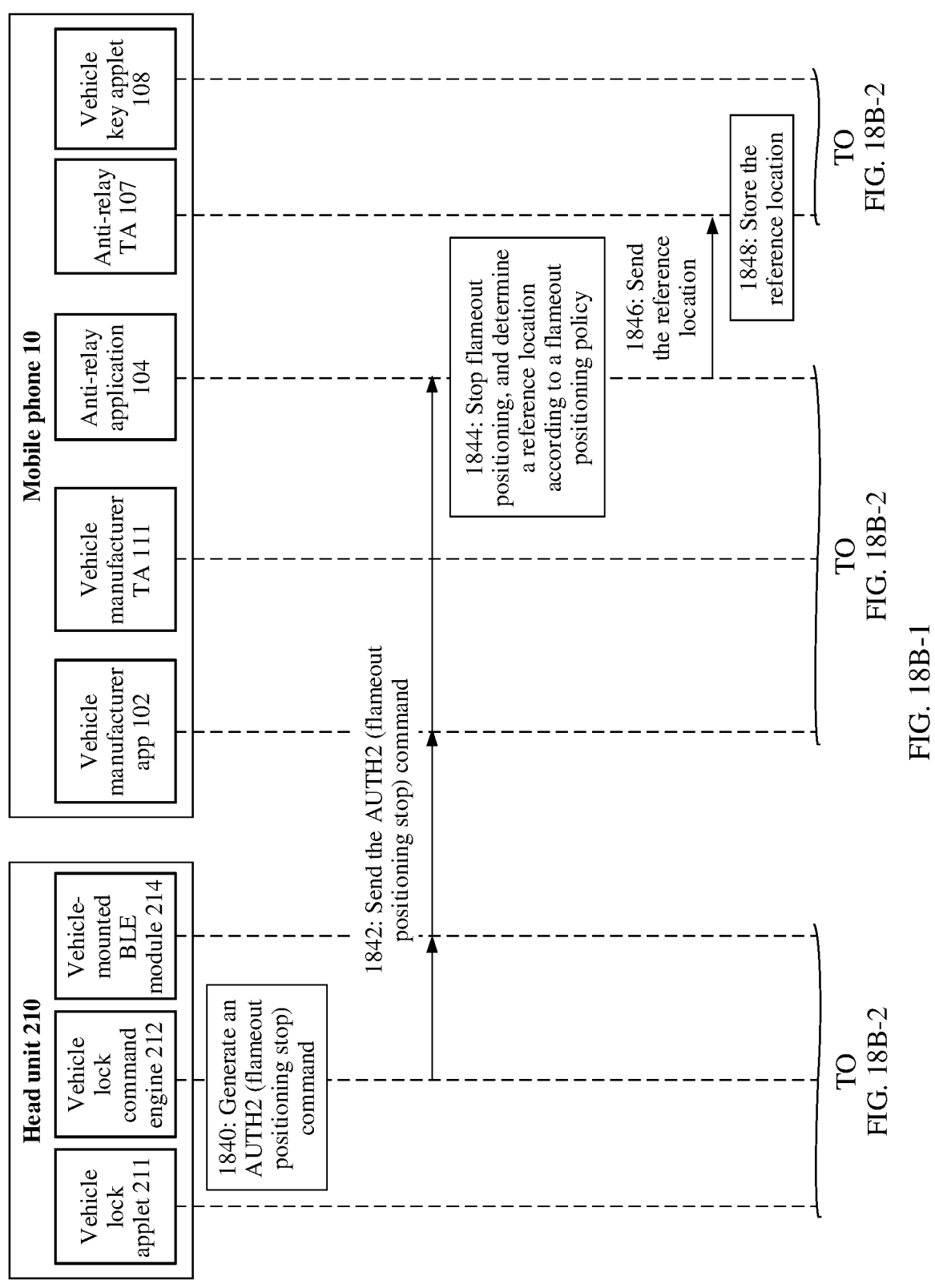
Figures 2, 18B:
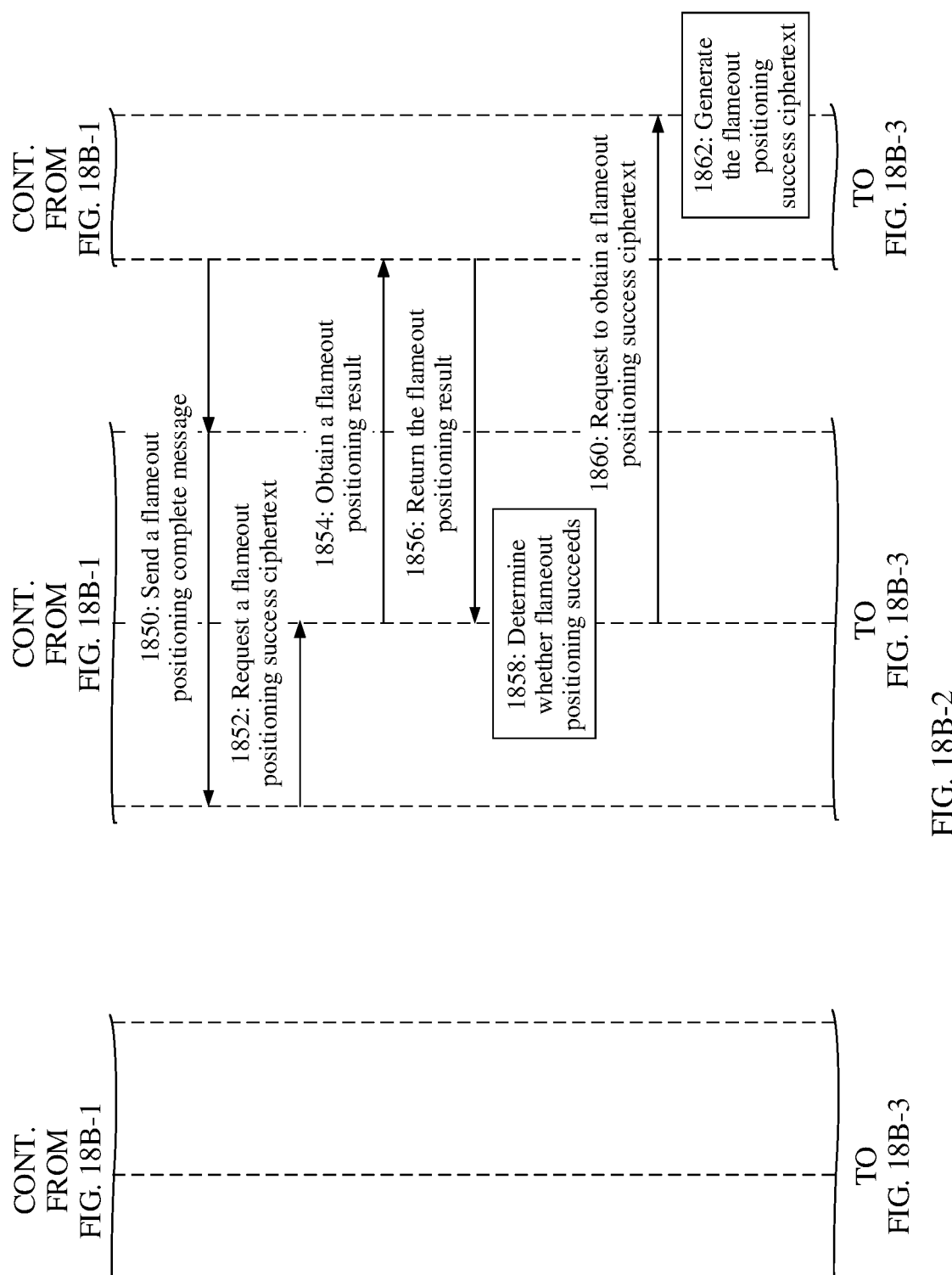
Figures 3, 18B:
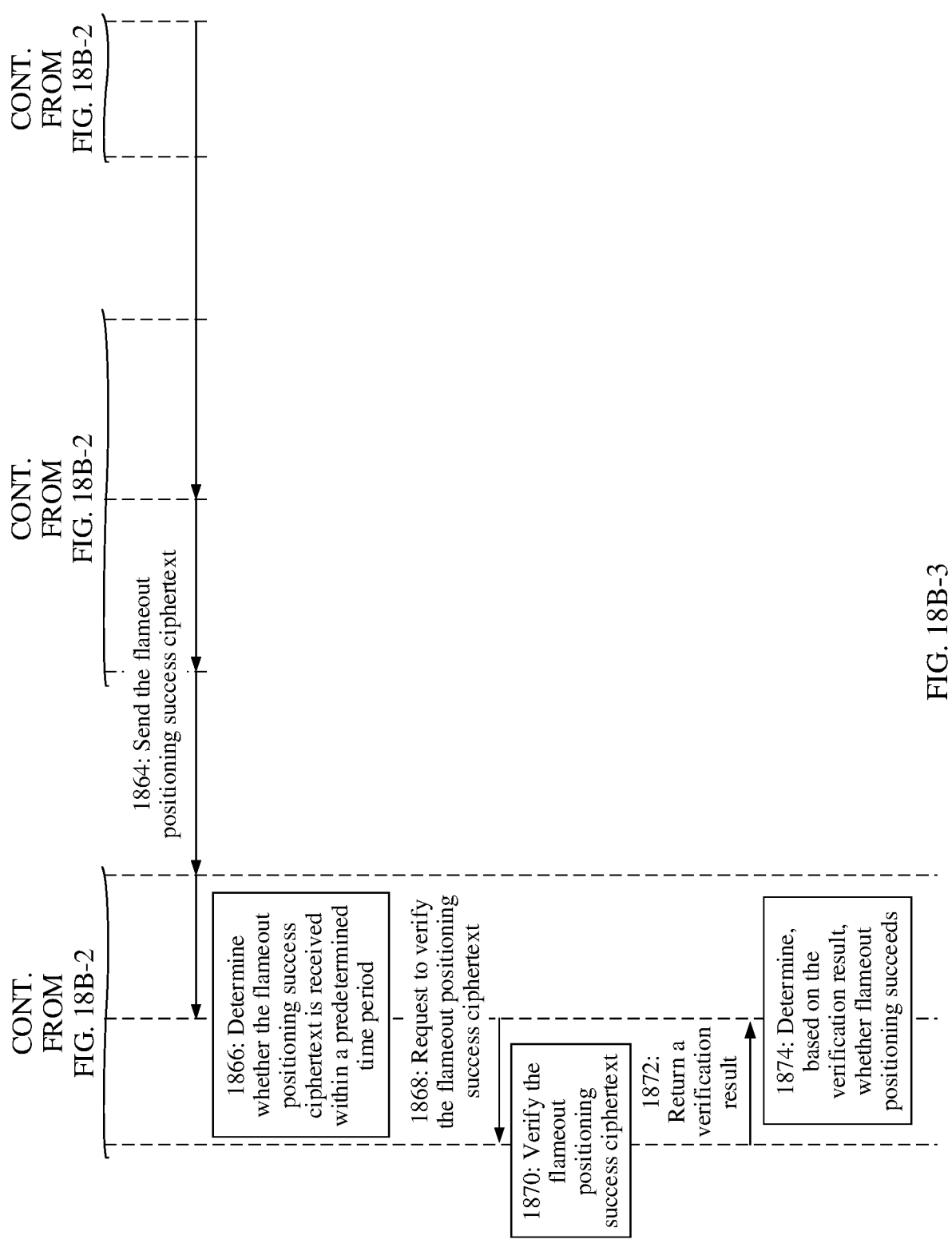

FIG. 17A, FIG. 17B, and FIG. 17C are a schematic flowchart of performing imperceptible authentication by a mobile phone 10 according to some embodiments. Specifically, as shown in FIG. 17A, FIG. 17B, and FIG. 17C, a process of performing imperceptible authentication by the mobile phone 10 includes the following steps.

1700: A vehicle lock command engine 212 generates an AUTH0 (imperceptible authentication initiation) command.

In some embodiments, for information included in the AUTH0 (imperceptible authentication initiation) command, refer to the foregoing descriptions of Table 2. To avoid repetition, details are not described herein again.

In addition, it may be understood that although a name of the imperceptible authentication initiation command is AUTH0 herein, in another embodiment, the imperceptible authentication initiation command may also be named in another name, and a function is the same as that of AUTH0. This is not limited herein.

1702: The vehicle lock command engine 212 sends the AUTH0 (imperceptible authentication initiation) command to a vehicle manufacturer app 102 through a vehicle-mounted BLE module 213.

1704: After receiving the AUTH0 (imperceptible authentication initiation) command, the vehicle manufacturer app 102 notifies an anti-relay application 104 to start anti-relay determining.

1706: After receiving the notification, the anti-relay application 104 invokes an anti-relay TA 107 to start anti-relay determining.

To improve security of an unlock service, an anti-relay rule followed by anti-relay determining is stored in the anti-relay TA 107, and the anti-relay TA 107 can communicate with only the anti-relay application 104 and a vehicle manufacturer TA 111.

1708: After receiving the notification, the anti-relay TA 107 performs anti-relay determining according to the anti-relay rule, to determine whether the mobile phone 10 encounters a relay attack. For a specific anti-relay rule, refer to the foregoing descriptions of FIG. 7A and FIG. 7B.

1710: After completing anti-relay determining, the anti-relay TA 107 sends an anti-relay determining complete message to the vehicle manufacturer app 102 through the anti-relay application 104.

1712: After receiving the anti-relay determining complete message, the vehicle manufacturer app 102 initiates imperceptible authentication to the vehicle manufacturer TA 111.

1714: The vehicle manufacturer TA 111 obtains an anti-relay determining result from the anti-relay TA 107.

In some embodiments, to improve security, after completing anti-relay determining, the anti-relay TA 107 may retain only the anti-relay determining result for a very short time period (for example, 3 seconds). If the retention period expires, the wallet TA 106 cannot obtain the anti-relay determining result.

It may be understood that, as described above, in some embodiments, a distance range for imperceptible authentication may be set. For example, a distance between the mobile phone 10 and the vehicle 20 is set to be less than 35 meters and greater than 3 meters. When the distance between the mobile phone 10 and the vehicle 20 reaches 3 meters, if the vehicle 20 does not receive an imperceptible authentication success ciphertext, or the vehicle 20 receives an imperceptible authentication success ciphertext but verification performed by the vehicle 20 on the imperceptible authentication success ciphertext fails, the vehicle 20 sends a perceptible authentication initiation command to the mobile phone 10. After the mobile phone 10 receives the perceptible authentication initiation command sent by the vehicle 20, the anti-relay TA 107 ends anti-relay determining, and the mobile phone 10 performs perceptible authentication, so that a user opens a vehicle lock through biometric recognition feature authentication.

1716: The anti-relay TA 107 returns the anti-relay determining result to the vehicle manufacturer TA 111.

It may be understood that because security of a TEE of the mobile phone 10 is high, obtaining the anti-relay determining result by using the vehicle manufacturer TA 111 can prevent the anti-relay determining result from being forged, and improve anti-relay determining security.

1718: After receiving the anti-relay determining result, the vehicle manufacturer TA 111 determines, based on the anti-relay determining result, whether the mobile phone 10 encounters a relay attack; and If the vehicle manufacturer TA 111 determines that the mobile phone does not encounter the relay attack, the vehicle manufacturer TA 111 performs step 1720. If the vehicle manufacturer TA 111 determines that the mobile phone encounters the relay attack, the vehicle manufacturer TA 111 may send, to the vehicle 20 or the user of the mobile phone 10 through the vehicle manufacturer app 102, a message indicating that the mobile phone encounters the relay attack.

In some embodiments, after receiving the message indicating that the mobile phone 10 encounters the relay attack, the vehicle 20 may send a perceptible authentication initiation request to the mobile phone 10, to request the mobile phone 10 to perform biometric authentication on the user. After the user receives the perceptible authentication initiation request, if the user finds that the user is not beside the vehicle 20, the user determines that wireless communication between the mobile phone 10 and the vehicle 20 encounters a relay attack, and the user may refuse to perform perceptible authentication. In addition, the user may further send an alarm or lock a vehicle lock of the vehicle 20 through the vehicle manufacturer app 102, and the vehicle 20 no longer performs imperceptible authentication before unlocking. Specifically, the mobile phone of the user may display a one-key alarm button or a one-key lock button.

1720: When determining that the mobile phone 10 does not encounter the relay attack, the vehicle manufacturer TA 111 requests a vehicle key applet 108 to generate an imperceptible authentication success ciphertext.

It may be understood that because security of a TEE of the mobile phone 10 is high, obtaining the imperceptible authentication success ciphertext by using the vehicle manufacturer TA 111 can prevent an imperceptible authentication result from being forged, and improve imperceptible authentication security.

1722: After receiving the request from the vehicle manufacturer TA 111, the vehicle key applet 108 generates the imperceptible authentication success ciphertext.

It may be understood that in some embodiments, the imperceptible authentication success ciphertext may be a ciphertext obtained by encrypting authentication success information by using a key, and the key is a key in agreed data sent by the mobile phone 10 to the vehicle 20 when a BLE connection is established between the vehicle 20 and the mobile phone 10. For example, the imperceptible authentication success ciphertext may include a vehicle ID, an authentication ID, and a positioning ID that are encrypted by using a key. When the vehicle 20 sends a positioning request to the mobile phone 10 before a current unlock service is performed and after a flameout closest to the current unlock service occurs or a vehicle door is closed, the positioning ID is an ID that is included in the positioning request and that is used to identify current positioning. The mobile phone 10 may store both the positioning ID and a reference location after obtaining the reference location. Each time sending a positioning request, the vehicle lock command engine 212 of the vehicle 20 generates a new positioning ID.

1724: After generating the imperceptible authentication success ciphertext, the vehicle key applet 108 forwards the imperceptible authentication success ciphertext to the vehicle lock command engine 212 sequentially through the vehicle manufacturer TA 111, the vehicle manufacturer app 102, and the vehicle-mounted BLE module 213.

In some embodiments, after receiving the imperceptible authentication success ciphertext, the vehicle lock command engine 212 directly requests the vehicle lock applet 211 to verify the imperceptible authentication success ciphertext, and stores a verification result after receiving the verification result returned by the vehicle lock applet 211. In this way, in a process in which the mobile phone 10 approaches the vehicle 20, if it is measured that a distance between the mobile phone 10 and the vehicle 20 is beyond an imperceptible authentication range (for example, less than 3 meters), the verification result is directly obtained: (1) In a possible implementation, if the verification result of the imperceptible authentication success ciphertext indicates that verification fails, the vehicle 20 performs an unlock service. In another possible implementation, when verification on the imperceptible authentication success ciphertext succeeds, the vehicle 20 does not directly perform an unlock service, but when the distance between the mobile phone 10 and the vehicle 20 reaches the unlocking distance mentioned above, re-obtains the verification result of the imperceptible authentication success ciphertext from the vehicle lock command engine 212, and opens a vehicle lock only when the obtained verification result indicates that verification on the imperceptible authentication success ciphertext succeeds. (2) When the verification result is that verification fails, the vehicle 20 sends a perceptible authentication initiation request to the mobile phone 10. In addition, in a possible implementation, if perceptible authentication succeeds, the vehicle 20 performs an unlock service. In another possible implementation, after perceptible authentication succeeds, the vehicle 20 does not directly open a lock but stores the verification result, and when determining that the distance between the mobile phone 10 and the vehicle 20 reaches the unlocking distance mentioned above, re-obtains a verification result of a perceptible authentication success ciphertext from the vehicle lock command engine 212, and opens a vehicle lock only when the obtained verification result indicates that verification on the perceptible authentication success ciphertext succeeds. Verification on the perceptible authentication success ciphertext may be performed immediately when the perceptible authentication success ciphertext is received, or may be performed when the unlocking distance is reached. This is not limited herein.

In addition, in some other embodiments, after receiving the imperceptible authentication success ciphertext, the vehicle lock command engine 212 does not perform verification immediately, but stores the imperceptible authentication success ciphertext. In this way, in a process in which the mobile phone 10 approaches the vehicle 20, if the vehicle lock command engine 212 measures that the distance between the mobile phone 10 and the vehicle 20 is beyond the imperceptible authentication range (for example, less than 3 meters), the vehicle lock command engine 212 requests the vehicle lock applet 211 to verify the imperceptible authentication success ciphertext, and receives the verification result from the vehicle lock applet 211: (1) In a possible implementation, if the received verification result indicates that verification on the imperceptible authentication success ciphertext succeeds, the vehicle lock command engine 212 performs the unlock service. In another possible implementation, when verification on the imperceptible authentication success ciphertext succeeds, the vehicle lock command engine 212 does not directly perform the unlock service but stores the verification result, and when the distance between the mobile phone 10 and the vehicle 20 reaches the unlocking distance (for example, 1 meter) mentioned above, re-obtains the verification result of the imperceptible authentication success ciphertext from the vehicle lock command engine 212, and opens the vehicle lock only when determining that the obtained verification result indicates that verification succeeds. (2) When the verification result is that verification fails, the vehicle 20 sends the perceptible authentication initiation request to the mobile phone 10. In a possible implementation, if perceptible authentication succeeds, the vehicle 20 performs the unlock service. In another possible implementation, after perceptible authentication succeeds, the vehicle 20 does not directly open the lock, but when determining that the distance between the mobile phone 10 and the vehicle 20 reaches the unlocking distance mentioned above, re-obtains the verification result of the perceptible authentication success ciphertext from the vehicle lock command engine 212, and opens the vehicle lock only when the obtained verification result indicates that verification on the perceptible authentication success ciphertext succeeds. Verification on the perceptible authentication success ciphertext may be performed immediately when the perceptible authentication success ciphertext is received, or may be performed when the unlocking distance is reached. This is not limited herein.

A process in which the vehicle lock command engine 212 requests the vehicle lock applet 211 to verify the imperceptible authentication success ciphertext is shown in FIG. 6A, FIG. 6B, and FIG. 6C, and includes the following steps.

1726: Request the vehicle lock applet 211 to verify the imperceptible authentication success ciphertext.

1728: After receiving the request, the vehicle lock applet 211 verifies the imperceptible authentication success ciphertext.

A process in which the vehicle lock applet 211 verifies the imperceptible authentication success ciphertext may include: The vehicle lock applet 211 decrypts the imperceptible authentication success ciphertext by using a key received when the BLE connection is established between the vehicle lock applet 211 and the mobile phone 10, and matches a vehicle ID, an authentication ID, and a positioning ID that are obtained through decryption with a vehicle ID, an authentication ID, and a positioning ID that are stored in the vehicle lock applet 211. If the matching succeeds, verification succeeds. If the matching fails, verification fails. In this case, the vehicle 20 may consider that a result that imperceptible authentication succeeds is untrue, and therefore does not open a vehicle lock.

1730: After completing verification, the vehicle lock applet 211 returns a verification result to the vehicle lock command engine 212.

1732: The vehicle lock command engine 212 receives the verification result from the vehicle lock applet 211.

As described above, in a possible implementation, after receiving the verification result, if the verification result indicates that verification on the imperceptible authentication success ciphertext succeeds, the vehicle lock command engine 212 directly opens the vehicle lock. In another possible implementation, if the verification result indicates that verification on the imperceptible authentication success ciphertext succeeds, the vehicle lock command engine 212 does not open the vehicle lock immediately but stores the verification result, and when the unlocking distance (for example, less than 1 meter) between the vehicle 20 and the mobile phone 10 is reached, re-obtains the verification result, and opens the vehicle lock only when determining that the obtained verification result is that verification on the imperceptible authentication ciphertext succeeds. When the verification result indicates that verification on the imperceptible authentication success ciphertext fails, the vehicle lock command engine 212 sends the perceptible authentication initiation to the mobile phone 10, and determines, based on a perceptible authentication result, whether to open the vehicle lock.

Phase of Measuring a Distance for Unlocking

A specific process of ranging unlocking is the same as that in the embodiment corresponding to FIG. 2. Therefore, details are not described herein again.

Phase of Notifying that Unlocking Succeeds

A specific process of notifying that unlocking succeeds is the same as that in the embodiment corresponding to FIG. 2. Therefore, details are not described herein again.

Obtain a Reference Location

FIG. 18A-1, FIG. 18A-2, and FIG. 18A-3 and FIG. 18B-1, FIG. 18B-2, and FIG. 18B-3 are respectively schematic flowcharts of performing flameout positioning by a mobile phone 10 before and after the mobile phone 10 receives an AUTH2 (flameout positioning stop) command in the architecture shown in FIG. 16.

Specifically, a specific process in which the mobile phone 10 performs flameout positioning before receiving the AUTH2 (flameout positioning stop) command is shown in FIG. 18A-1, FIG. 18A-2, and FIG. 18A-3.

1800: A vehicle lock command engine 212 generates an AUTH1 (flameout positioning start) command.

Information included in the AUTH1 (flameout positioning start) command may be the same as that included in the AUTH1 (flameout positioning start) command in FIG. 9A-1, FIG. 9A-2, and FIG. 9A-3. For details, refer to the foregoing descriptions of the AUTH1 (flameout positioning start) command in FIG. 9A-1, FIG. 9A-2, and FIG. 9A-3.

In addition, it may be understood that although a name of the flameout positioning start command is AUTH1 herein, in another embodiment, the flameout positioning start command may also be named in another name, and a function is the same as that of AUTH1. This is not limited herein.

1802: Send the generated AUTH1 (flameout positioning start) command to a vehicle manufacturer app 102 through a vehicle-mounted BLE module 213.

1804: After receiving the AUTH1 (flameout positioning start) command, the vehicle manufacturer app 102 requests an anti-relay application 104 to obtain a reference location.

1806: After receiving the request from the anti-relay application 104, the anti-relay application 104 may start flameout positioning according to a flameout positioning policy, to obtain the reference location.

It may be understood that, as described above, if the vehicle 20 does not receive the flameout positioning success ciphertext when the flameout positioning stop distance is reached, the vehicle 20 sends the flameout positioning stop command to the mobile phone 10. Therefore, before and after receiving the AUTH2 (flameout positioning stop) command, the anti-relay application 104 may obtain the reference location according to different flameout positioning policies. For example, before the AUTH2 (flameout positioning stop) command is received, the reference location may be obtained according to the flameout positioning policy shown in FIG. 10A-1 and FIG. 10A-2.

1808: If flameout positioning succeeds before the anti-relay application 104 receives the AUTH2 (flameout positioning stop) command, send the determined reference location to an anti-relay TA 107, or if flameout positioning fails when the anti-relay application 104 receives the AUTH2 (flameout positioning stop) command, end flameout positioning. For obtaining of the reference location, refer to FIG. 10B.

1810: After receiving the reference location, the anti-relay TA 107 stores the received reference location.

It may be understood that the reference location is stored only in the anti-relay TA 107 until a new reference location is generated during next flameout positioning. In addition, in another embodiment, to ensure that the reference location is stolen, the reference location may also be stored in a vehicle key applet 108.

1812: The anti-relay TA 107 sends a flameout positioning complete message to the vehicle manufacturer app 102 through the anti-relay application 104.

1814: After receiving a flameout positioning success message, the vehicle manufacturer app 102 requests a flameout positioning success ciphertext from a vehicle manufacturer TA 111.

1816: After receiving the request from the vehicle manufacturer app 102, the vehicle manufacturer TA 111 obtains a flameout positioning result from the anti-relay TA 107.

In some embodiments, to ensure security of the flameout positioning result, after sending the flameout positioning complete message, the anti-relay TA 106 retains the flameout positioning result only within a short time period (for example, three seconds). The result is deleted if the vehicle manufacturer TA 111 does not obtain the flameout positioning result within the time period.

In addition, it may be understood that because security of a TEE of the mobile phone 10 is high, obtaining the flameout positioning success ciphertext by using the vehicle manufacturer TA 111 can prevent the flameout positioning result from being forged, and improve flameout positioning security.

1818: The anti-relay TA 107 returns the flameout positioning result to the vehicle manufacturer TA 111.

1820: After receiving the flameout positioning result, the vehicle manufacturer TA 111 determines, based on the flameout positioning result, whether flameout positioning succeeds. For example, the flameout positioning result includes a character indicating whether flameout positioning succeeds. For example, 0 indicates that flameout positioning succeeds, and 1 indicates that flameout positioning fails. The wallet TA 106 may determine, based on the character, whether flameout positioning succeeds.

1822: If the vehicle manufacturer TA 111 determines that flameout positioning succeeds, the vehicle manufacturer TA 111 requests a flameout positioning success ciphertext from the vehicle key applet 108.

1824: After receiving the request, the vehicle key applet 108 generates the flameout positioning success ciphertext.

In some embodiments, the flameout positioning success ciphertext may include a vehicle ID and a positioning ID in an AUTH1 (flameout positioning start) command received from the vehicle 20, and the vehicle ID and the positioning ID are encrypted by using a key.

1826: After generating the flameout positioning success ciphertext, the vehicle key applet 108 sends the flameout positioning success ciphertext to the vehicle lock command engine 212 sequentially through the vehicle manufacturer TA 111, the vehicle manufacturer app 102, and the vehicle-mounted BLE module 213.

1828: After receiving the flameout positioning success ciphertext, the vehicle lock command engine 212 requests the vehicle lock applet 211 to verify the flameout positioning success ciphertext.

1830: After receiving the request, the vehicle lock applet 211 verifies the flameout positioning success ciphertext.

It may be understood that in some embodiments, a process in which the vehicle lock applet 211 verifies the flameout positioning success ciphertext may include: The vehicle lock applet 211 decrypts the flameout positioning success ciphertext by using a key received when a BLE connection is established between the vehicle lock applet 211 and the mobile phone 10, and matches a vehicle ID and a positioning ID that are obtained through decryption with a vehicle ID and a latest positioning ID that are stored in the vehicle lock applet 211. If the matching succeeds, verification succeeds. If the matching fails, verification fails.

> 1832: After completing verification, the vehicle lock applet 211 returns a verification result to the vehicle lock command engine 212.
>
> 1834: The vehicle lock command engine 212 determines, based on the received verification result, whether flameout positioning succeeds.

For example, if the verification result is that verification succeeds, the vehicle lock command engine 212 may consider that the flameout positioning success ciphertext is trusted, and a location at which current flameout positioning succeeds may be used as a reference location for anti-relay determining. Therefore, a current positioning ID is retained. If the verification result is that verification fails, the vehicle lock command engine 212 may consider that the flameout positioning success ciphertext is unauthentic, and clear a current positioning ID. In this way, regardless of whether a relay attack occurs when imperceptible authentication is performed next time, because the vehicle lock applet 108 needs to match a flameout ID when verifying the imperceptible authentication success ciphertext, verification cannot succeed because the current positioning ID is cleared. Consequently, no electronic device can perform imperceptible authentication or imperceptible authentication cannot succeed.

As described above, if the vehicle 20 does not receive the flameout positioning success ciphertext when a flameout positioning stop distance is reached, the vehicle 20 sends a flameout positioning stop command to the mobile phone 10. A specific process is shown in FIG. 18B-1, FIG. 18B-2, and FIG. 18B-3.

> 1840: When the vehicle 20 detects that a distance between the vehicle 20 and the mobile phone 10 exceeds a flameout positioning distance, if the vehicle 20 does not receive the flameout positioning success ciphertext, the vehicle lock command engine 212 of the head unit 210 generates an AUTH2 (flameout positioning stop) command.

Information included in the AUTH2 (flameout positioning stop) command may be the same as that included in the AUTH2 (flameout positioning stop) command in FIG. 9B-1, FIG. 9B-2, and FIG. 9B-3. For details, refer to the foregoing descriptions of the AUTH2 (flameout positioning stop) command in FIG. 9B-1, FIG. 9B-2, and FIG. 9B-3.

> 1842: The vehicle lock command engine 212 sends the generated AUTH2 (flameout positioning stop) command to the anti-relay application 104 through the vehicle-mounted BLE module 213 and the vehicle manufacturer app 102.
>
> 1844: After receiving the command, the anti-relay application 104 stops flameout positioning, and determines a reference location according to a flameout positioning policy, for example, determines the reference location according to the flameout positioning policy shown in FIG. 10B.
>
> 1846: After determining the reference location, the anti-relay application 104 sends the determined reference location to the anti-relay TA 107.

Steps 1848 to 1864 are correspondingly the same as steps 1810 to 1826. Details are not described again.

> 1866: After sending the AUTH2 (flameout positioning stop) command, the vehicle lock command engine 212 determines whether a flameout positioning success ciphertext is received within a predetermined time period (for example, one minute); and if the flameout positioning success ciphertext is received within the predetermined time period, determines that the reference location is successfully obtained, and performs step 1868 to request to verify the flameout location success ciphertext, or if the flameout positioning success ciphertext is not received within the predetermined time period, determines that the reference location fails to be obtained, and clears a positioning ID.
>
> 1868: If the vehicle lock command engine 212 receives the flameout positioning success ciphertext within the predetermined time period, the vehicle lock command engine 212 requests the vehicle lock applet 211 to verify the flameout positioning success ciphertext.
>
> 1870: After receiving the request, the vehicle lock applet 211 verifies the flameout positioning success ciphertext.

It may be understood that in some embodiments, a process in which the vehicle lock applet 211 verifies the flameout positioning success ciphertext may include: The vehicle lock applet 211 decrypts the flameout positioning success ciphertext by using a key received when a BLE connection is established between the vehicle lock applet 211 and the mobile phone 10, and matches a vehicle ID and a positioning ID that are obtained through decryption with a vehicle ID and a latest positioning ID that are stored in the vehicle lock applet 211. If the matching succeeds, verification succeeds. If the matching fails, verification fails.

> 1872: After completing verification, the vehicle lock applet 211 returns a verification result to the vehicle lock command engine 212.
>
> 1874: The vehicle lock command engine 212 determines, based on the received verification result, whether flameout positioning succeeds.

For example, if the verification result is that verification succeeds, the vehicle lock command engine 212 may consider that the flameout positioning success ciphertext is trusted, and a reference location at which current flameout positioning succeeds may be used for anti-relay determining. Therefore, a current positioning ID is retained. If the verification result is that verification fails, the vehicle lock command engine 212 may consider that the flameout positioning success ciphertext is unauthentic, and clear a current positioning ID. In this way, regardless of whether a relay attack occurs when imperceptible authentication is performed next time, because the vehicle lock applet 108 needs to match a flameout ID when verifying the imperceptible authentication success ciphertext, verification cannot succeed because the current positioning ID is cleared. Consequently, no electronic device can perform imperceptible authentication or imperceptible authentication cannot succeed.

Perceptible Authentication

As described above, in some embodiments, the vehicle 20 may send prompt information for performing perceptible authentication to the mobile phone 10, so that the user performs perceptible authentication by using the mobile phone 10. It may be understood that the user 10 may also actively initiate perceptible authentication without a prompt. For example, the user may find an imperceptible vehicle key icon on a leftmost screen or a vehicle manufacturer app, and the user may perform an active operation of "unlocking" or "locking the vehicle".

Figure 19A:
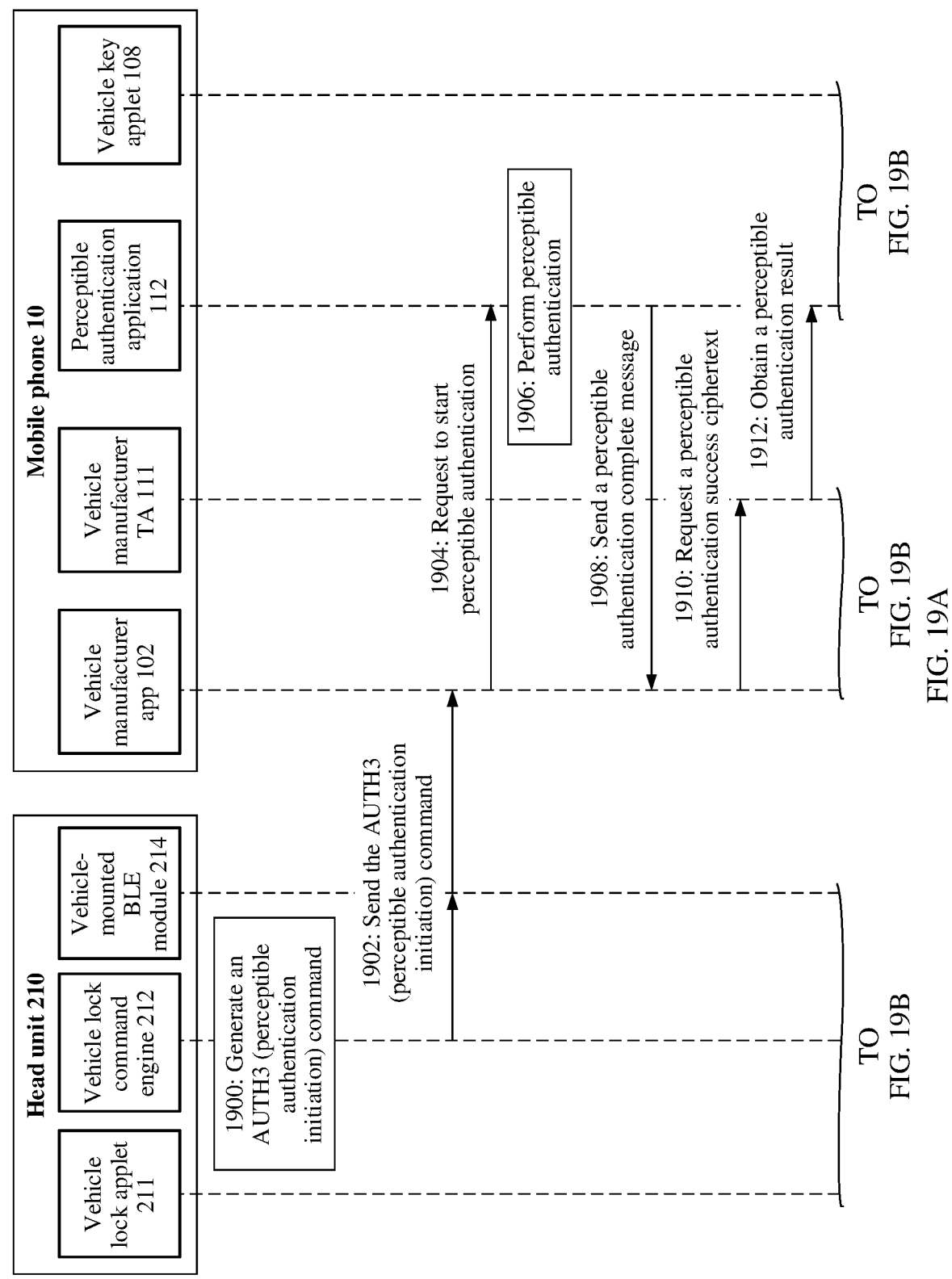
FIG. 19A and FIG. 19B are a schematic flowchart of performing perceptible authentication by a mobile phone 10 in the architecture shown in FIG. 16 according to some embodiments of this application.
Figure 19B:
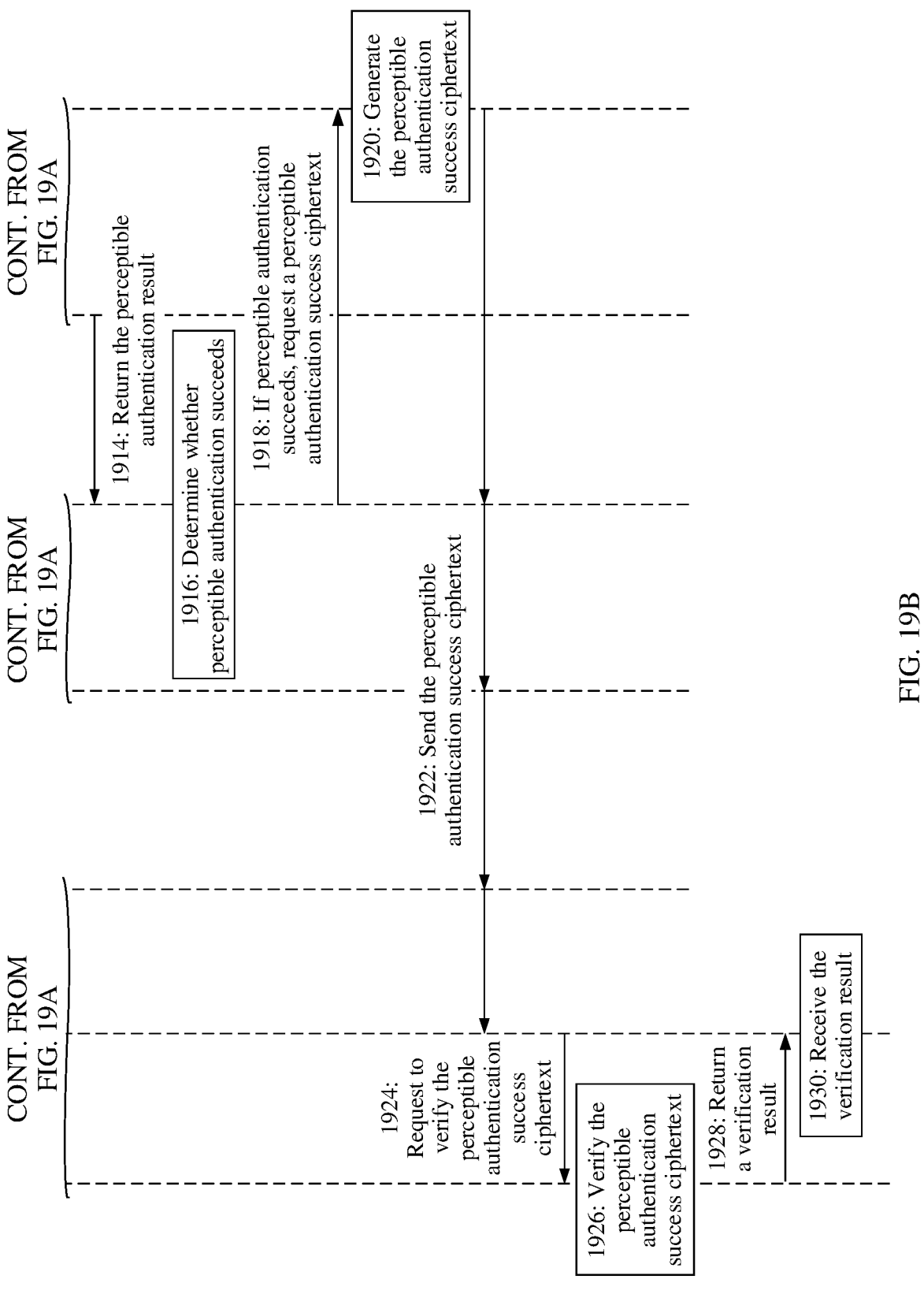

FIG. 19A and FIG. 19B are a schematic procedure of performing perceptible authentication in the architecture shown in FIG. 16. Tapping the imperceptible vehicle key icon on the leftmost screen of the mobile phone 10 is still used as an example. As shown in FIG. 19A and FIG. 19B, a perceptible authentication process of the mobile phone 10 in the architecture shown in FIG. 16 includes the following steps.

1900: After a user triggers the imperceptible vehicle key icon on the leftmost screen, transfer an active unlock instruction to a vehicle lock command engine 212. After receiving the active unlock instruction, the vehicle lock command engine 212 generates an AUTH3 (perceptible authentication initiation) command. Alternatively, when it is measured that a distance between the mobile phone 10 and a vehicle 20 reaches a perceptible authentication distance (for example, 3 meters), if imperceptible authentication fails, the vehicle lock command engine 212 of a head unit 210 of the vehicle 20 generates an AUTH3 (perceptible authentication initiation) command.

Information included in the AUTH3 (perceptible authentication initiation) command may be the same as that included in the AUTH3 (perceptible authentication initiation) command in FIG. 13A, FIG. 13B, and FIG. 13C. For details, refer to the foregoing descriptions of the AUTH3 (perceptible authentication initiation) command in FIG. 13A, FIG. 13B, and FIG. 13C.

1902: The vehicle lock command engine 212 sends the AUTH3 (perceptible authentication initiation) command to a vehicle manufacturer app 102 through a vehicle-mounted BLE module 219.

1904: After receiving the AUTH3 (perceptible authentication initiation) command, the vehicle manufacturer app 102 requests a perceptible authentication application to start perceptible authentication.

1906: After receiving the request, the perceptible authentication application performs perceptible authentication.

In some embodiments, if the perceptible authentication application performs authentication by collecting a fingerprint of the user, the perceptible authentication application may compare a fingerprint stored in the mobile phone 10 or a fingerprint stored in a server with the collected fingerprint of the user. If the comparison succeeds, it indicates that verification succeeds. If the comparison fails, it indicates that verification fails. In some embodiments, the perceptible authentication application may invoke a fingerprint authentication interface by using the vehicle manufacturer 103, so that the user enters fingerprint information, and then obtain the fingerprint information entered by the user for verification.

1908: After completing perceptible authentication, the perceptible authentication application sends a perceptible authentication complete message to the vehicle manufacturer app 102.

1910: After receiving the perceptible authentication complete message, the vehicle manufacturer app 102 requests a perceptible authentication success ciphertext from a vehicle manufacturer TA 111.

1912: After receiving the request, the vehicle manufacturer TA 111 obtains a perceptible authentication result from the perceptible authentication application.

1914: The perceptible authentication application returns the perceptible authentication result to the vehicle manufacturer TA 111.

It may be understood that, in some embodiments, after sending the perceptible authentication complete message to the vehicle manufacturer app 102, the perceptible authentication application may retain the perceptible authentication result for a short time period (for example, three seconds). If the vehicle manufacturer TA does not obtain the authentication result in a timely manner within the time period, the perceptible authentication result is deleted.

1916: After receiving the perceptible authentication result, the vehicle manufacturer TA 111 determines whether perceptible authentication succeeds.

1918: If the vehicle manufacturer TA 111 determines that perceptible authentication succeeds, the vehicle manufacturer TA 111 requests a perceptible authentication success ciphertext from a vehicle key applet 108.

It may be understood that, if the perceptible authentication result indicates that perceptible authentication fails, the authentication result is not returned to the head unit 210 of the vehicle 20, or a message indicating that perceptible authentication fails is returned.

1920: After receiving the request from the vehicle manufacturer TA 111, the vehicle key applet 108 generates the perceptible authentication success ciphertext.

It may be understood that in some embodiments, the perceptible authentication success ciphertext may be a ciphertext obtained by encrypting authentication success information by using a key, and the key is a key in agreed data sent by the mobile phone 10 to the vehicle 20 when a BLE connection is established between the vehicle 20 and the mobile phone 10. For example, the perceptible authentication success ciphertext may include a vehicle ID encrypted by using a key.

1922: The vehicle key applet 108 sends the perceptible authentication success ciphertext to the vehicle lock command engine 212 sequentially through the vehicle manufacturer TA 111, the vehicle manufacturer app 102, and the vehicle-mounted BLE module 219.

1924: After receiving the perceptible authentication success ciphertext, the vehicle lock command engine 212 requests the vehicle lock applet 211 to verify the perceptible authentication success ciphertext.

1926: The vehicle lock applet 211 verifies the perceptible authentication success ciphertext in response to the received request.

1928: After completing verification, the vehicle lock applet 211 returns a verification result to the vehicle lock command engine 212.

1930: The vehicle lock command engine 212 receives the verification result.

In some embodiments, after receiving the verification result, if the verification result is that verification on the perceptible authentication success ciphertext succeeds, the vehicle lock command engine 212 immediately opens the vehicle lock; or if the verification result is that verification fails, the vehicle lock command engine 212 does not open the vehicle lock, and sends an unlock failure message to the mobile phone 10. In some other embodiments, the vehicle lock command engine 212 stores the verification result after receiving the verification result, re-obtains the verification result of the perceptible authentication success ciphertext from the vehicle lock command engine 212 only when determining that the distance between the mobile phone 10 and the vehicle 20 reaches the unlocking distance mentioned above, and opens the vehicle lock only when the obtained verification result indicates that verification on the perceptible authentication success ciphertext succeeds. When verification fails, the vehicle lock command engine 212 does not open the vehicle lock, and sends an unlock failure message to the mobile phone 10.

For example, in a possible implementation, a sensing switch is disposed on a door handle of the vehicle. When the user touches the door handle, the vehicle 20 starts to measure the distance between the vehicle 20 and the mobile phone 10 through BLE. If the distance is less than the unlocking distance (for example, less than 1 meter), the vehicle 20 obtains the verification result of the perceptible authentication success ciphertext, and opens the vehicle lock of the vehicle door only when determining that the verification result is that verification succeeds. When verification fails, the vehicle 20 does not open the vehicle lock, and sends an unlock failure message to the mobile phone 10. For another example, in another possible implementation, the vehicle 20 continuously performs ranging on the mobile phone 10. When the distance between the vehicle 20 and the mobile phone 10 is less than the unlocking distance (for example, less than 1 meter), the vehicle 20 obtains the verification result of the perceptible authentication success ciphertext, and opens the vehicle lock of the vehicle door when determining that the verification result is that verification succeeds. When verification fails, the vehicle 20 does not open the vehicle lock, and sends an unlock failure message to the mobile phone 10.

It may be understood that, in embodiments of this application, the mobile phone 10 may be positioned through a security positioning service. The security positioning service may be a positioning service immune to a relay attack, for example, including but not limited to one or more of services such as GPS (Global Positioning System, global positioning system) satellite positioning, BeiDou satellite positioning, GLONASS satellite positioning, Galileo satellite positioning, Wi-Fi (wireless fidelity) positioning, mobile cellular network base station positioning, UWB (Ultra-WideBand, ultra-wideband) indoor positioning, and TOF (Time of flight, time of flight) security positioning.

In addition, it may be understood that BLE has security measures such as frequency modulation and encryption, and is more difficult to be tracked, relayed, and cracked. Security of BLE is significantly higher than that of a mainstream imperceptible key fob (which is a small hard disk device with a built-in verification mechanism and uses a low-frequency RFID signal) on the market. In the foregoing embodiments, wireless communication between the vehicle 20 and the mobile phone 10 is performed through BLE. However, a manner of communication between the vehicle 20 and the mobile phone 10 may not be limited to BLE mentioned in the foregoing embodiment, and may be another short-range wireless communications technology, for example, including but not limited to BT (Bluetooth, Bluetooth), NFC (Near Field Communication, near field communication), FM (frequency modulation, frequency modulation), and IR (Infrared, infrared) communication.

In addition, it may be understood that the vehicle in embodiments of this application may include various types of vehicles, including a car, a race car, a dedicated vehicle (for example, a fire engine, an ambulance, a fuel tanker, a bulletproof vehicle, and an engineering vehicle), and the like.

It addition, it may be understood that, the imperceptible unlocking technology of the vehicle disclosed in the foregoing embodiments may be used for authentication of various locks, for example, a control device of a door lock installed in a building or a control device of a gate in an office building. An authentication process is the same as authentication in the foregoing unlocking process, and a difference lies in that trigger points for obtaining a reference location are different. For example, when it is detected that the user locks a door and a mobile phone carried by the user is away from the door lock, the control device of the door lock initiates a positioning request for a reference location to the mobile phone. Alternatively, when it is detected that a user leaves the office building, the control device of the gate in the office building initiates a positioning request for a reference location to the mobile phone.

As described above, the technical solutions of this application may be applied to various wireless services. The following describes the technical solutions of this application by using imperceptible authentication in a parking lot as an example.

Specifically, it is assumed that a license plate of a vehicle has been registered in a vehicle management system of a vehicle management device in a parking lot, and the vehicle often enters and exits the parking lot. The vehicle management device in the vehicle management system continuously sends a wireless communication broadcast. For example, BLE communication with a mobile phone is still used as an example herein for description. When the vehicle management device detects that a distance between the vehicle management device and the vehicle reaches a specific distance, a terminal device (for example, a navigator or a mobile phone) inside the vehicle may establish a BLE connection to the vehicle management device. When detecting that the distance between the vehicle management device and the vehicle (that is, the mobile phone) reaches an imperceptible authentication distance, the vehicle management device sends an imperceptible authentication request to the mobile phone, and the mobile phone performs authentication according to an anti-relay rule. The anti-relay rule described in the foregoing embodiment is also applicable to this embodiment. Therefore, details are not described herein again. The reference location may be a location obtained by the mobile phone through a positioning service such as satellite positioning or network positioning when the vehicle management device sends a positioning request to the mobile phone in the vehicle after the mobile phone in the vehicle completes imperceptible payment last time. The foregoing flameout positioning policy is also applicable to this embodiment. Details are not described herein again.

For example, the mobile phone starts to compare, through satellite positioning, a current location of the mobile phone with a reference location stored in the mobile phone when the vehicle is away from the vehicle management device last time. If the comparison succeeds, the mobile phone sends a message indicating that imperceptible authentication succeeds to the vehicle management device. When detecting that the distance between the vehicle management device and the vehicle (that is, the mobile phone in the vehicle) is less than a predetermined distance, the vehicle management device opens a barrier rod on the vehicle management device to allow the vehicle to enter or leave the parking lot. If the vehicle leaves the parking lot, fees can be automatically deducted when the barrier rod on the vehicle management device is opened.

After the vehicle leaves the parking lot or enters the parking lot, the vehicle management device may send a positioning request to the mobile phone in the vehicle, to request the mobile phone to obtain a reference location according to a positioning policy.

In addition, it may be understood that although the mobile phone and the vehicle are used as examples in the foregoing embodiments to describe the unlock service in this application, the technical solutions in this application are applicable to various terminal devices, including but not limited to an electronic device such as a mobile phone, a tablet computer, a laptop computer, a vehicle-mounted navigator, a desktop computer, a wearable device, a head-mounted display, a mobile email device, a portable game console, a portable music player, a reader device, a personal digital assistant, a virtual reality device or an augmented reality device, or a television embedded with or coupled to one or more processors.

Figure 20:
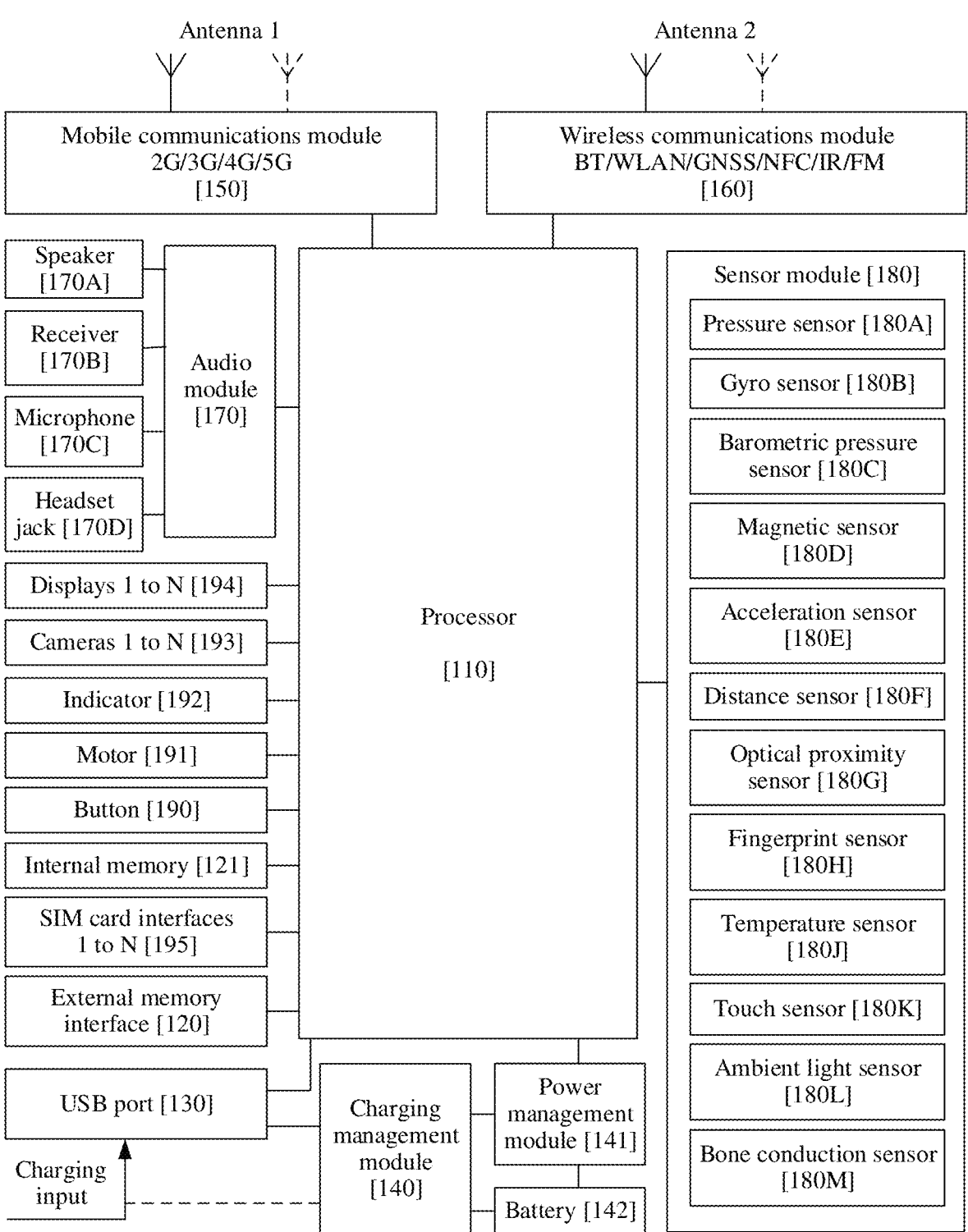
FIG. 20 is a schematic diagram of a structure of an electronic device according to some embodiments of this application.

FIG. 20 is a schematic diagram of a structure of an electronic device 100. The structure of the mobile phone 10 in the foregoing embodiment may be the same as that of the electronic device 100. Details are as follows:

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The processor may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access and reduces a waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and/or a subscriber identification module (subscriber identity module, SIM) interface.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, and samples, quantizes, and codes an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset, to play audio by using the headset. The port may be further configured to connect to another electronic device such as an AR device.

It may be understood that an interface connection relationship between the modules that is shown in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset, to play audio through the headset. The port may be further configured to connect to another electronic device such as an AR device.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more devices that integrate at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, BLE, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and an address book) and the like created during use of the electronic device 100. In addition, the internal memory 121 may include a high-speed random access memory, or may include a nonvolatile memory such as at least one disk storage device, a flash memory, or a universal flash storage (universal flash storage, UFS). The processor 110 runs instructions stored in the internal memory 121 and/or instructions stored in the memory disposed in the processor, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may listen to music or answer a call in a hands-free mode by using the speaker 170A.

The receiver 170B, also referred to as an "earpiece", is configured to convert an electrical audio signal into a sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed on a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the electronic device 100. In some embodiments, an angular velocity of the electronic device 100 around three axes (that is, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a motion-sensing gaming scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to recognize a posture of the electronic device, and is used in an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a flip cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen. The touch sensor 180K is configured to detect a touch operation performed on or near the touch sensor 180K. The touch sensor may transfer the detected touch operation to the application processor to determine a type of a touch event. The display 194 may provide a visual output related to the touch operation. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In this embodiment of the present invention, an Android system of a layered architecture is used as an example to describe the software structure of the electronic device 100.

Figure 21:
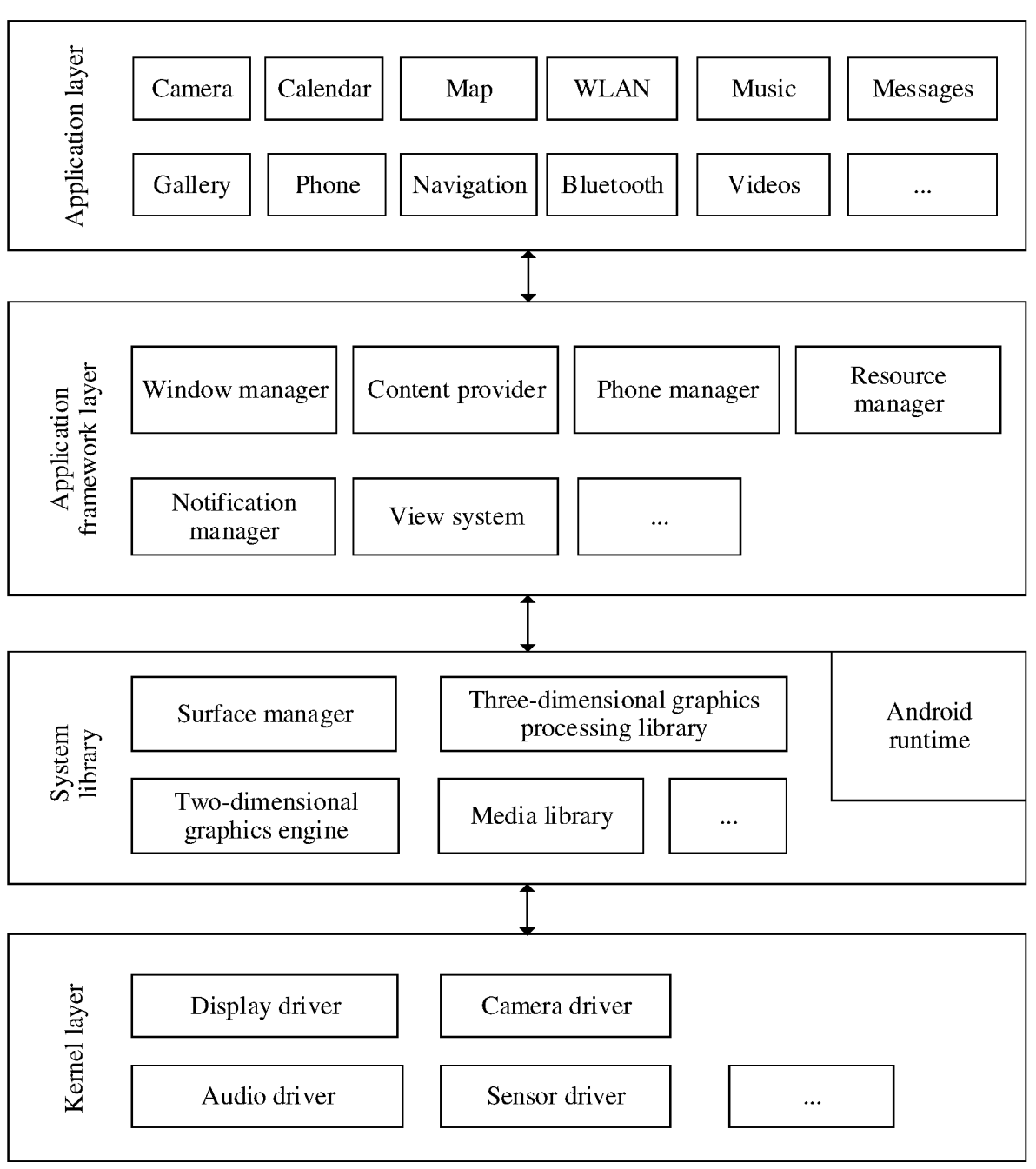
FIG. 21 is a block diagram of a software structure of the electronic device shown in FIG. 20 according to some embodiments of this application.

FIG. 21 is a block diagram of a software structure of an electronic device 100 according to an embodiment of the present invention.

In the layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 21, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 21, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a browsing bookmark, an address book, and the like.

The view system includes a visual control, such as a control for displaying a text or a control for displaying a picture. The view system can be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is played, the electronic device vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, so that the camera application is opened. Then, the camera driver is started by invoking the kernel layer, and a static image or a video is captured by using the camera 193.

Figure 22:
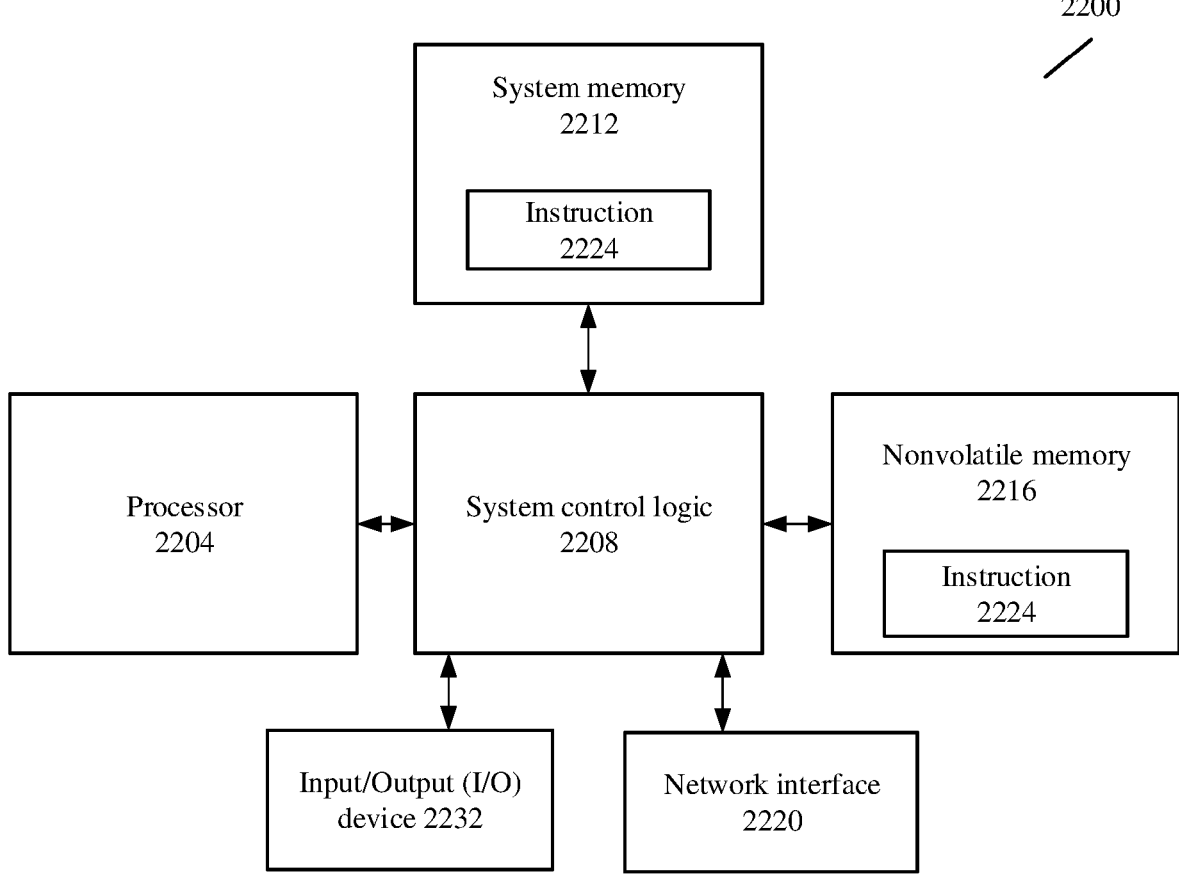
FIG. 22 is a schematic diagram of a structure of another electronic device according to some embodiments of this application.

FIG. 22 is a block diagram of an electronic device 2200 according to an embodiment of this application. FIG. 22 schematically shows an example of the electronic device 2200 according to a plurality of embodiments. In an embodiment, the electronic device 2200 may include one or more processors 2204, system control logic 2208 connected to at least one of the processors 2204, system memory 2212 connected to the system control logic 2208, a nonvolatile memory (NVM) 2216 connected to the system control logic 2208, and a network interface 2220 connected to the system control logic 2208.

In some embodiments, the processor 2204 may include one or more single-core or multi-core processors. In some embodiments, the processor 2204 may include any combination of a general-purpose processor and a dedicated processor (for example, a graphics processing unit, an application processor, or a baseband processor). In an embodiment in which the electronic device 2200 uses an eNB (Evolved NodeB, enhanced NodeB) or a RAN (Radio Access Network, radio access network) controller, the processor 2204 may be configured to perform various conforming embodiments, for example, one or more of the plurality of embodiments described above.

In some embodiments, the system control logic 2208 may include any proper interface controller, to provide any proper interface for the at least one of the processors 2204 and/or any proper device or component that communicates with the system control logic 2208.

In some embodiments, the system control logic 2208 may include one or more memory controllers, to provide an interface connected to the system memory 2212. The system memory 2212 may be configured to: load and store data and/or instructions. In some embodiments, the memory 2212 in the electronic device 2200 may include any proper volatile memory, for example, a proper dynamic random access memory (DRAM).

The NVM/memory 2216 may include one or more tangible non-transitory computer-readable media that are configured to store data and/or instructions. In some embodiments, the NVM/memory 2216 may include any proper nonvolatile memory such as a flash memory and/or any proper nonvolatile storage device such as at least one of an HDD (Hard Disk Drive, hard disk drive), a CD (Compact Disc, compact disc) drive, and a DVD (Digital Versatile Disc, digital versatile disc) drive.

The NVM/memory 2216 may include some storage resources on an apparatus installed on the electronic device 2200, or may be accessed by a device, but is not necessarily a part of the device. For example, the NVM/memory 2216 may be accessed over a network through the network interface 2220.

In particular, the system memory 2212 and the NVM/memory 2216 each may include a temporary copy and a permanent copy of an instruction 2224. The instruction 2224 may include an instruction that enables, when the instruction is executed by at least one of the processors 2204, the electronic device 2200 to implement the methods shown in FIG. 3, FIG. 5 to FIG. 7A and FIG. 7B, FIG. 9A-1, FIG. 9A-2, and FIG. 9A-3 to FIG. 10B, FIG. 13A, FIG. 13B, and FIG. 13C, FIG. 15A to FIG. 15D, and FIG. 17A, FIG. 17B, and FIG. 17C to FIG. 19A and FIG. 19B. In some embodiments, the instruction 2224, hardware, firmware, and/or software components thereof may additionally/alternatively be deployed in the system control logic 2208, the network interface 2220, and/or the processor 2204.

The network interface 2220 may include a transceiver, and is configured to provide a radio interface for the electronic device 2200 to communicate with any other proper device (for example, a front-end module or an antenna) through one or more networks. In some embodiments, the network interface 2220 may be integrated into another component of the electronic device 2200. For example, the network interface 2220 may be integrated into at least one of the processor 2204, the system memory 2212, the NVM/memory 2216, and a firmware device (not shown) including instructions. When at least one of the processors 2204 executes the instructions, the electronic device 2200 implements the methods shown in FIG. 3, FIG. 5 to FIG. 7A and FIG. 7B, FIG. 9A-1, FIG. 9A-2, and FIG. 9A-3 to FIG. 10B, FIG. 13A, FIG. 13B, and FIG. 13C, FIG. 15A to FIG. 15D, and FIG. 17A, FIG. 17B, and FIG. 17C to FIG. 19A and FIG. 19B.

The network interface 2220 may further include any proper hardware and/or firmware to provide a multiple-input multiple-output radio interface. For example, the network interface 2220 may be a network adapter, a wireless network adapter, a phone modem, and/or a wireless modem.

In an embodiment, at least one of the processors 2204 may be packaged together with logic of one or more controllers used for the system control logic 2208 to form a system in package (SiP). In an embodiment, at least one of the processors 2204 may be integrated on a same tube core with logic of one or more controllers used for the system control logic 2208, to form a system on a chip (SoC).

The electronic device 2200 may further include an input/output (I/O) device 2232. The I/O device 2232 may include a user interface, so that a user can interact with the electronic device 2200. A design of a peripheral component interface enables a peripheral component to also interact with the electronic device 2200. In some embodiments, the electronic device 2200 further includes a sensor. The sensor is configured to determine at least one of an environmental condition and location information that are related to the electronic device 2200.

In some embodiments, the user interface may include but is not limited to a display (for example, a liquid crystal display or a touchscreen display), a speaker, a microphone, one or more cameras (for example, a still image camera and/or a video camera), a flashlight (for example, a light-emitting diode flashlight), and a keyboard.

In some embodiments, the peripheral component interface may include but is not limited to a nonvolatile memory port, an audio jack, and a charging port.

In some embodiments, the sensor may include but is not limited to a gyro sensor, an accelerometer, a proximity sensor, an ambient light sensor, and a positioning unit. The positioning unit may alternatively be a part of the network interface 2220, or may interact with the network interface 2220, to communicate with a component (for example, a global positioning system (GPS) satellite) in a positioning network.

Embodiments of mechanisms disclosed in this application may be implemented in hardware, software, firmware, or a combination of these implementation methods. Embodiments of this application may be implemented as a computer program or program code executed on a programmable system, and the programmable system includes at least one processor, a storage system (including volatile and/or nonvolatile memory and/or storage elements), at least one input device, and at least one output device.

The program code may be applied to input instructions, to perform functions described in this application and generate output information. The output information may be applied to one or more output devices in a known manner. For a purpose of this application, a processing system includes any system with a processor such as a digital signal processor (DSP), a microcontroller, an application-specific integrated circuit (ASIC), or a microprocessor.

The program code can be implemented in a high-level programming language or an object-oriented programming language, to communicate with the processing system. The program code may alternatively be implemented by using an assembly language or a machine language as required. Actually, the mechanism described in this application is not limited to a scope of any particular programming language. In any case, the language may be a compiled language or an interpretive language.

In some cases, the disclosed embodiments may be implemented by hardware, firmware, software, or any combination thereof. The disclosed embodiments may alternatively be implemented as instructions carried by or stored on one or more transitory or non-transitory machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer) readable form, including but not limited to a floppy disk, a compact disc, an optical disc, a read-only memory (CD-ROMs), a magnetic optical disk, a read-only memory (ROM), a random access memory (RAM), an erasable programmable read-only memory (EPROM), an electrically erasable programmable read-only memory (EEPROM), a magnetic card, an optical card, a flash memory, or a tangible machine-readable memory used to transmit information (for example, a carrier, an infrared signal, or a digital signal) by using a propagating signal in an electrical, optical, acoustic, or another form over the Internet. Therefore, the machine-readable medium includes any type of machine-readable medium suitable for storing or transmitting electronic instructions or information in a machine (for example, a computer) readable form.

In the accompanying drawings, some structural or method features may be shown in a particular arrangement and/or order. However, it should be understood that such a particular arrangement and/or order may not be required. In some embodiments, these features may be arranged in a manner and/or order different from that shown in the descriptive accompanying drawings. In addition, inclusion of the structural or method features in a particular figure does not imply that such features are required in all embodiments, and in some embodiments, these features may not be included or may be combined with other features.

It should be noted that, in the examples and specification of this patent, relational terms such as first and second are only used to distinguish one entity or operation from another entity or operation, and do not necessarily require or imply that any actual relationship or sequence exists between these entities or operations. Moreover, the terms "include" or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

Although this application has been illustrated and described with reference to some preferred embodiments of this application, a person of ordinary skill in the art should understand that various changes may be made to this application in form and detail without departing from the spirit and scope of this application.

What is claimed is:

1. An authentication method, comprising:
sending, by a first device, in response to the first device determining that a distance between the first device and a second device reaches a first preset distance, a first authentication request to the second device, wherein the first authentication request requests that the second device determine whether wireless communication between the first device and the second device is subject to a relay attack according to a duration of an anti-relay determination exceeding a time threshold and before the first device performs a service agreed on with the second device, wherein the anti-relay determination comprises simultaneously performing satellite positioning and network positioning to determine a height and position of the second device and further comprises determining, in a trusted execution environment (TEE), whether the second device is rooted, wherein the second device being rooted comprises the second device being subject to malicious control;
determining, by the first device, in response to determining that the distance between the first device and the second device reaches a second preset distance, whether a first authentication success ciphertext sent by the second device is received, wherein the first authentication success ciphertext is sent by the second device in response to the second device determining that wireless communication between the first device and the second device is not subject to the relay attack, and further in response to the second preset distance being less than the first preset distance; and
performing, by the first device, the service agreed on with the second device in response to the first device determining that the first authentication success ciphertext sent by the second device is received, and further in response to verification performed by the first device on the first authentication success ciphertext succeeding.

2. The method according to claim 1, further comprising:
sending, by the first device, a second authentication request to the second device, in response to the first device determining that the distance between the first device and the second device reaches the second preset distance, and further in response to the first authentication success ciphertext sent by the second device being not received or verification on the received first authentication success ciphertext failing, wherein the second authentication request requests that the second device perform biometric verification on a user of the second device; and
performing, by the first device, the service agreed on with the second device in response to the first device receiving a second authentication success ciphertext sent by the second device and further in response to verification performed by the first device on the second authentication success ciphertext succeeding, wherein the second authentication success ciphertext is sent by the second device after the biometric verification performed by the second device on the user succeeds.

3. The method according to claim 2, further comprising performing, before the performing, by the first device, the service agreed on with the second device:
determining, by the first device, whether the distance between the first device and the second device is less than a third preset distance, wherein the third preset distance is less than the second preset distance; and
performing, by the first device, the service agreed on with the second device, in response to the first device determining that the distance between the first device and the second device is less than the third preset distance.

4. The method according to claim 2, further comprising:
performing, by the first device, verification on the second authentication success ciphertext in response to the distance between the first device and the second device being less than the third preset distance, further in response to the first device receiving the second authentication success ciphertext, and further in response to determining that the distance between the first device and the second device is less than the third preset distance.

5. The method according to claim 1, further comprising:
performing, by the first device, verification on the first authentication success ciphertext or the second authentication success ciphertext in response to receiving the first authentication success ciphertext or the second authentication success ciphertext.

6. The method according to claim 1, further comprising:
performing, by the first device, verification on the first authentication success ciphertext, in response to the distance between the first device and the second device being less than the second preset distance, further in response to the first device receiving the first authentication success ciphertext, and further in response to the distance between the first device and the second device reaching the second preset distance.

7. The method according to claim 1, wherein the agreed service is an unlock service or a payment service.

8. The method according to claim 7, wherein when the agreed service is the unlock service, the second device is a mobile terminal, and the first device is a vehicle or a lock.

9. The method according to claim 7, wherein when the agreed service is the payment service, the second device is a mobile terminal, and the first device is a tolling terminal.

10. An authentication method, comprising:

receiving, by a second device, a first authentication request from a first device, wherein the first authentication request is sent by the first device in response to a distance between the second device and the first device reaching a first preset distance;

determining, by the second device in response to the received first authentication request, whether wireless communication between the second device and the first device is subject to a relay attack according to a duration of an anti-relay determination exceeding a time threshold, wherein the anti-relay determination comprises simultaneously performing satellite positioning and network positioning to determine a height and position of the second device and further comprises determining, in a trusted execution environment (TEE), whether the second device is rooted, wherein the second device being rooted comprises the second device being subject to malicious control; and sending, by the second device, a first authentication success ciphertext to the first device in response to determining that wireless communication between the second device and the first device is not subject to the relay attack, wherein the first authentication success ciphertext is associated with performance, by the first device, of a service agreed on between the first device and the second device.

11. The method according to claim 10, further comprising performing, after the receiving the first authentication request:

receiving, by the second device, a second authentication request from the first device, wherein the second authentication request is sent by the first device in response to the first device determining that the distance between the first device and the second device reaches a second preset distance, and further in response to the first authentication success ciphertext sent by the second device not being received or verification performed by the first device on the received first authentication success ciphertext failing, and further in response to the second preset distance being less than the first preset distance;

performing, by the second device, biometric verification on a user of the second device in response to the received second authentication request; and sending, by the second device, a second authentication success ciphertext to the first device in response to the biometric verification succeeding.

12. The method according to claim 11, further comprising performing, before the receiving the first authentication request from the first device:

receiving, by the second device, a wireless communication broadcast sent by the first device;

establishing, by the second device, wireless communication with the first device;

receiving, by the second device, a data obtaining request from the first device; and sending, by the second device in response to the data obtaining request being received from the first device, data required for authentication to the first device, wherein the data required for authentication comprises the first preset distance and the second preset distance.

13. The method according to claim 10, wherein the agreed service is an unlock service or a payment service.

14. The method according to claim 13, wherein when the agreed service is the unlock service, the second device is a mobile terminal, and the first device is a vehicle or a lock.

15. The method according to claim 13, wherein when the agreed service is the payment service, the second device is a mobile terminal, and the first device is a tolling terminal.

16. A non-transitory, non-volatile computer-readable medium, wherein the non-transitory, non-volatile computer-readable medium stores instructions, and when the instructions are executed on a computer associated with a first device, the first device is enabled to perform the authentication method according to claim 1.

17. A first device, comprising:

one or more processors; and at least one non-transitory memory; and at least one non-transitory computer readable memory connected to the one or more processors and including computer program code, wherein the at least one non-transitory computer readable memory and the computer program code are configured, with the one or more processors, to cause the first device to perform at least:

sending, in response to determining that a distance between the first device and a second device reaches a first preset distance, a first authentication request to the second device, wherein the first authentication request requests that the second device determine whether wireless communication between the first device and the second device is subject to a relay attack according to a duration of an anti-relay determination exceeding a time threshold and before the first device performs a service agreed on with the second device, wherein the anti-relay determination comprises simultaneously performing satellite positioning and network positioning to determine a height and position of the second device and further comprises determining, in a trusted execution environment (TEE), whether the second device is rooted, wherein the second device being rooted comprises the second device being subject to malicious control;

determining in response to determining that the distance between the first device and the second device reaches a second preset distance, whether a first authentication success ciphertext sent by the second device is received, wherein the first authentication success ciphertext is sent by the second device in response to the second device determining that wireless communication between the first device and the second device is not subject to the relay attack, and further in response to the second preset distance being less than the first preset distance; and performing the service agreed on with the second device in response to the first device determining that the first authentication success ciphertext sent by the second device is received, and further in response to verification performed by the first device on the first authentication success ciphertext succeeding.

* * * * *